United States Patent
Yamada

(10) Patent No.: US 9,639,164 B2
(45) Date of Patent: May 2, 2017

(54) GESTURE INPUT METHOD

(71) Applicant: FUJITSU LIMITED, Kawasaki-shi, Kanagawa (JP)

(72) Inventor: Moyuru Yamada, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 141 days.

(21) Appl. No.: 14/471,485

(22) Filed: Aug. 28, 2014

(65) Prior Publication Data

US 2015/0089455 A1 Mar. 26, 2015

(30) Foreign Application Priority Data

Sep. 26, 2013 (JP) ................................. 2013-199135
Apr. 21, 2014 (JP) ................................. 2014-087684

(51) Int. Cl.
*G06F 3/033* (2013.01)
*G06F 3/01* (2006.01)
*G06K 9/00* (2006.01)

(52) U.S. Cl.
CPC ......... *G06F 3/017* (2013.01); *G06K 9/00382* (2013.01)

(58) Field of Classification Search
CPC .................................................. G06F 3/017
USPC ........................................................ 715/863
See application file for complete search history.

(56) References Cited

U.S. PATENT DOCUMENTS

| | | | |
|---|---|---|---|
| 5,594,469 A | 1/1997 | Freeman et al. | |
| 6,515,669 B1 * | 2/2003 | Mohri | G06F 3/017 345/418 |
| 6,577,998 B1 * | 6/2003 | Yamamoto | G10L 21/06 704/205 |
| 8,624,836 B1 * | 1/2014 | Miller | G06F 1/163 345/157 |
| 9,261,967 B2 * | 2/2016 | Aliakseyeu | G06F 3/015 |
| 9,329,673 B2 * | 5/2016 | Kurokawa | G06F 3/005 |
| 2002/0024500 A1 * | 2/2002 | Howard | G06F 3/014 345/158 |
| 2004/0064195 A1 * | 4/2004 | Herr | A61F 2/66 623/24 |
| 2005/0063564 A1 * | 3/2005 | Yamamoto | B60R 25/2045 382/104 |
| 2005/0070834 A1 * | 3/2005 | Herr | A61B 5/1038 602/28 |

(Continued)

FOREIGN PATENT DOCUMENTS

| | | |
|---|---|---|
| JP | 8-315154 | 11/1996 |
| JP | 9-311759 | 12/1997 |

(Continued)

OTHER PUBLICATIONS

Kim et al., "The Gesture Watch: A Wireless Contact-free Gesture based Wrist Interface", In Proceedings of the *2007 11th IEEE International Symposium on Wearable Computers (ISWC '07)*, 2007, pp. 1-8, IEEE Computer Society, Washington, DC, USA.

(Continued)

*Primary Examiner* — William Titcomb
(74) *Attorney, Agent, or Firm* — Staas & Halsey LLP

(57) ABSTRACT

A gesture input method includes: observing a wrist; outputting state information indicating a state of the wrist; determining, by a processor, according to the state information whether the wrist is in a dorsiflexion state; and performing, by the processor, a predetermined process in accordance with whether the wrist is in the dorsiflexion state.

9 Claims, 85 Drawing Sheets

(56) References Cited

U.S. PATENT DOCUMENTS

| | | | |
|---|---|---|---|
| 2007/0162152 A1* | 7/2007 | Herr | A61F 2/60 623/24 |
| 2008/0262635 A1* | 10/2008 | Moser | A61F 2/6607 623/47 |
| 2008/0300692 A1* | 12/2008 | Moser | A61F 2/6607 623/55 |
| 2009/0167698 A1* | 7/2009 | Altas | G06F 3/0488 345/173 |
| 2009/0204229 A1* | 8/2009 | Mosler | A61F 2/6607 623/26 |
| 2009/0264803 A1* | 10/2009 | Darby, II | A61F 5/019 602/27 |
| 2010/0152619 A1* | 6/2010 | Kalpaxis | A61B 5/0002 600/592 |
| 2010/0324699 A1* | 12/2010 | Herr | A61F 2/66 623/27 |
| 2011/0043496 A1* | 2/2011 | Ray Avalani | B60R 1/00 345/204 |
| 2011/0080339 A1* | 4/2011 | Sun | G06F 3/017 345/157 |
| 2011/0199292 A1* | 8/2011 | Kilbride | G06F 3/017 345/156 |
| 2011/0257764 A1* | 10/2011 | Herr | A61F 2/60 623/24 |
| 2011/0319799 A1* | 12/2011 | Silva | A61F 5/0127 602/16 |
| 2012/0127070 A1* | 5/2012 | Ryoo | G06F 3/014 345/156 |
| 2012/0130508 A1* | 5/2012 | Harris | A61F 2/6607 623/50 |
| 2012/0214594 A1* | 8/2012 | Kirovski | A63F 13/06 463/36 |
| 2012/0256820 A1* | 10/2012 | Uppuluri | G06K 9/00221 345/156 |
| 2012/0259429 A1* | 10/2012 | Han | A61F 5/0127 623/24 |
| 2012/0259430 A1* | 10/2012 | Han | A61F 2/60 623/24 |
| 2012/0319940 A1* | 12/2012 | Bress | G06F 3/017 345/156 |
| 2013/0079686 A1* | 3/2013 | Sessions | A61H 1/0266 601/27 |
| 2013/0110256 A1* | 5/2013 | Herr | A61F 2/60 623/24 |

FOREIGN PATENT DOCUMENTS

| | | |
|---|---|---|
| JP | 2001-216069 | 8/2001 |
| JP | 2005-63090 | 3/2005 |
| JP | 2007-87089 | 4/2007 |
| JP | 2009-37434 | 2/2009 |
| JP | 5024495 | 9/2012 |

OTHER PUBLICATIONS

Somehara, "Waving a hand or thrusting the hand forward—a TV which can be operated by gestures from Hitachi", *PC Online Weekly*, Oct. 2008, pp. 1-4, last accessed Feb. 24, 2014, (URL: http://pc.nikkeibp.co.jp/article/news/20081001/1008385/?rt=nocnt).

"Operating a picture on a screen with gestures: A new technology of Panasonic Corporation", *CEATEC Japan 2008*, Oct. 3, 2008, pp. 1-5, last accessed Feb. 24, 2014 (URL: http://www.itmedia.co.jp/news/articles/0810/03/news006.html).

"Operate a TV with only hand movements: Gesture User Interface", *Hitachi, Ltd.*, 2011, pp. 1-2, last accessed Feb. 24, 2014, (URL: http://www.hitachi.co.jp/design/field/communication/gesture/).

Ren et al., "Robust hand gesture recognition based on finger-earth mover's distance with a commodity depth camera", In Proceedings of the 19th ACM international conference on Multimedia (MM '11), Nov.-Dec. 2011, pp. 1093-1096, ACM, New York, NY, USA.

Hisashi et al., "A proposal and Evaluation for Hand Gesture Interaction with Isolated Non-speech Sound", *Human Interface Symposium Collected Papers (1533D)*, 2012, pp. 355-358.

"LED TV user manual", *Samsung Smart TV ES8000 QuickGuide-ES8000*, 2012, pp. 1-42.

Sato et al., "A proposal and Evaluation for Hand Gesture Interaction with Isolated Non-speech Sound", *Human Interface Symposium Collected Papers (1533D)*, 2012, pp. 355-358.

* cited by examiner

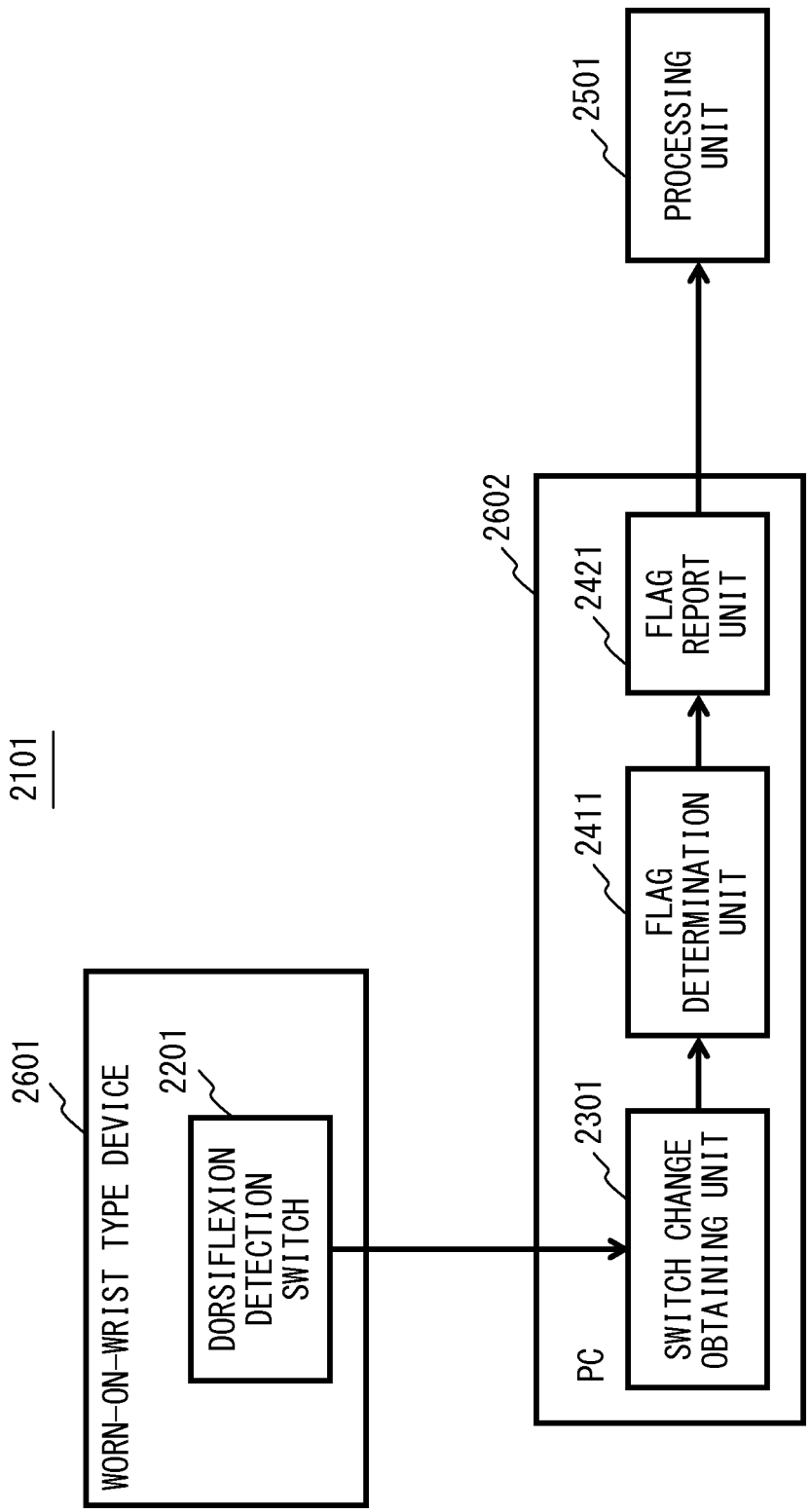

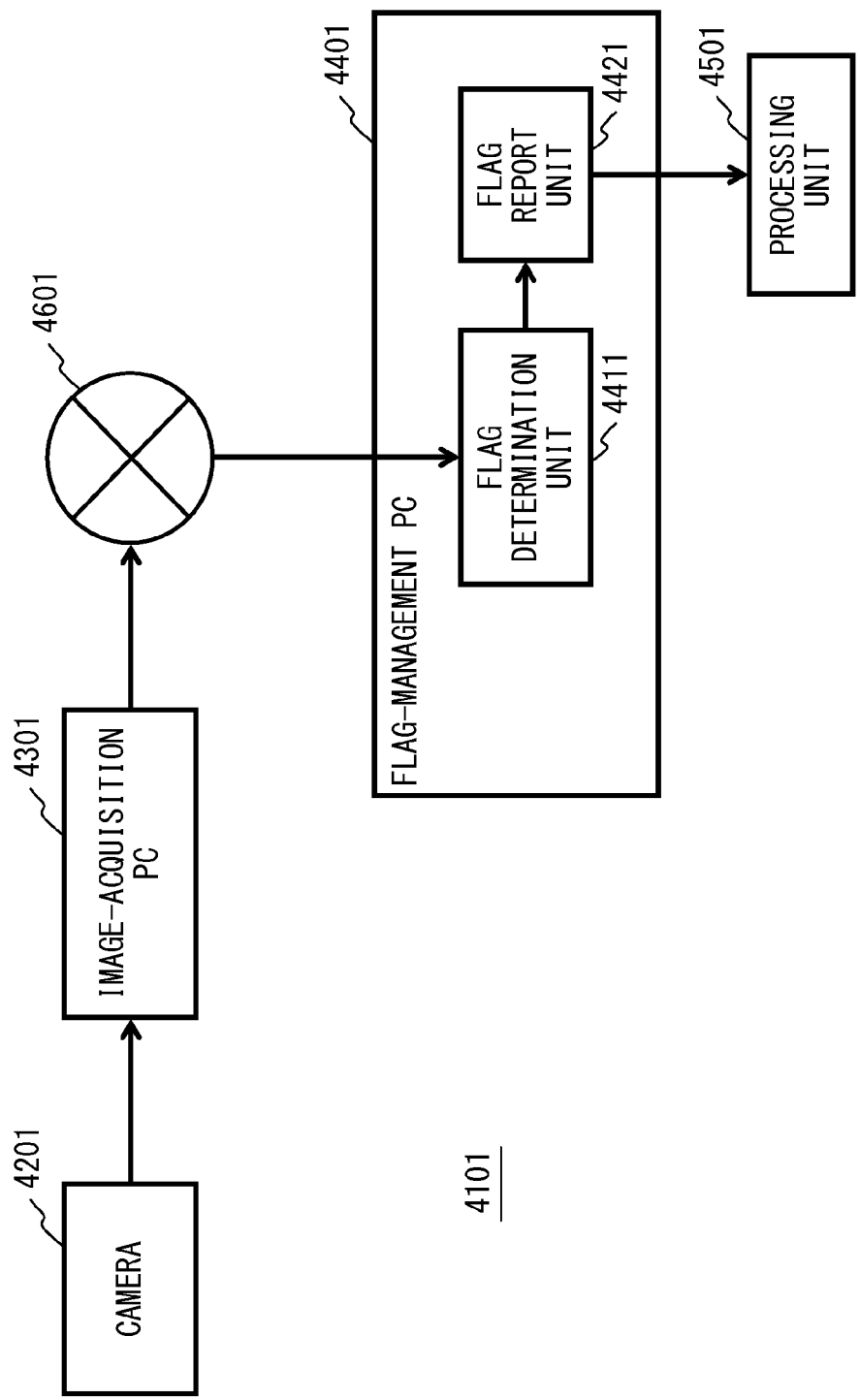
F I G. 5

| SUBJECT | RELAX | VOLUNTARY MOVEMENT | ANGULAR DIFFERENCE |
|---|---|---|---|
| A | 40 | 60 | 20 |
| B | 36 | 65 | 29 |
| C | 48 | 67 | 19 |
| D | 41 | 75 | 34 |
| E | 44 | 60 | 16 |
| F | 45 | 60 | 15 |
| G | 48 | 62 | 14 |
| MAXIMUM | 48 | 75 | 34 |
| MINIMUM | 36 | 60 | 14 |
| AVERAGE | 43.1 | 64.1 | 21.0 |

F I G. 1 6

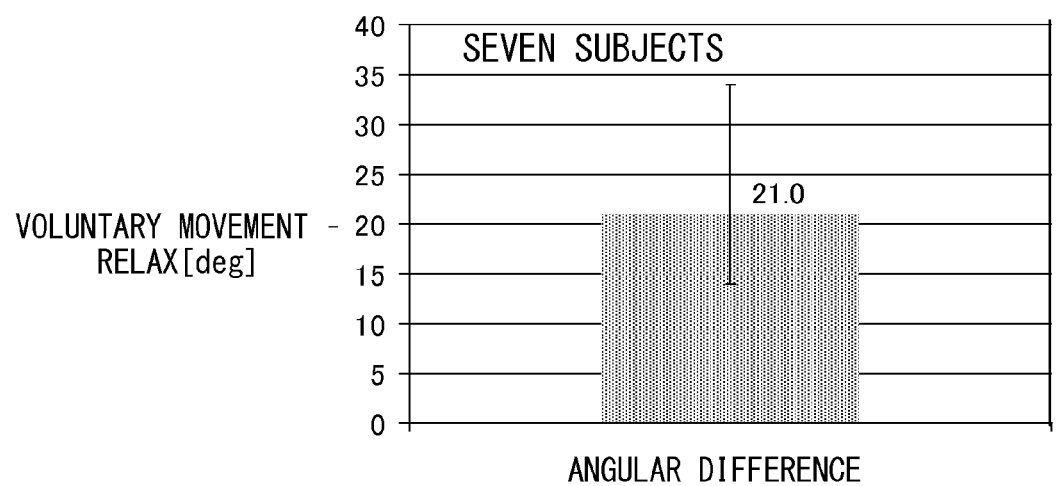
F I G. 1 8

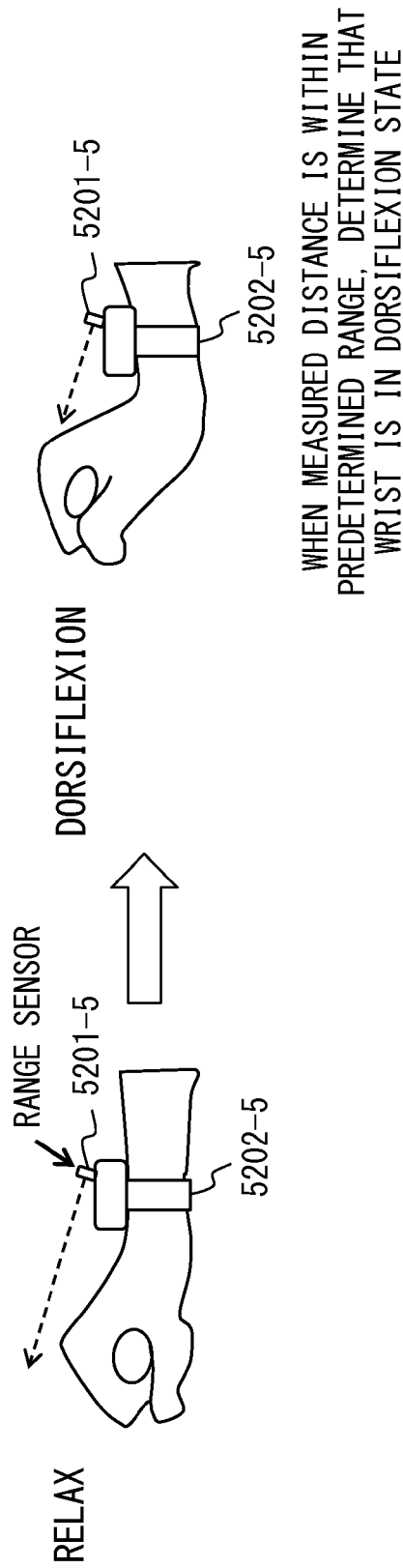
F I G. 2 3

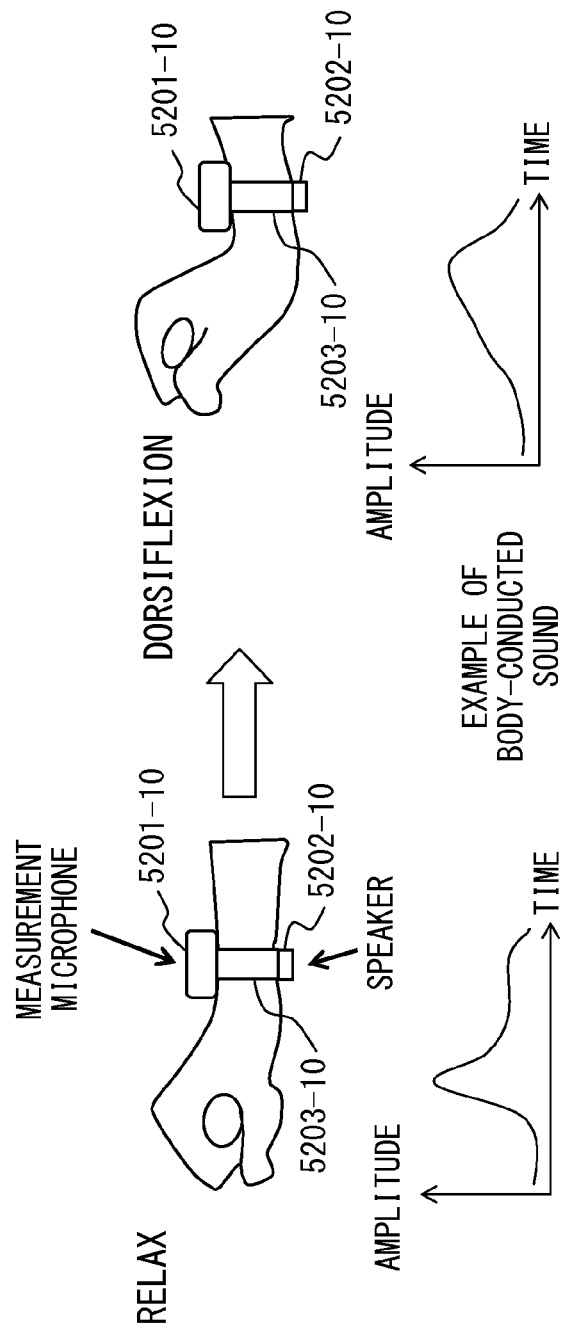

F I G. 2 8

MEASUREMENT EXAMPLE 1: GENERATE SOUND USING SPEAKER, AND DETERMINE DORSIFLEXION ACCORDING TO DIFFERENCE IN CHARACTERISTIC OF SOUND TRANSMITTED TO MICROPHONE

MEASUREMENT EXAMPLE 2: OBSERVE BODY-CONDUCTED SOUND (≠SPEAKER SOUND) GENERATED FROM DORSIFLEXING MOVEMENT USING MICROPHONE, AND DETERMINE DORSIFLEXION ACCORDING TO CHARACTERISTIC OF THAT SOUND (SPEAKER IS NOT NEEDED)

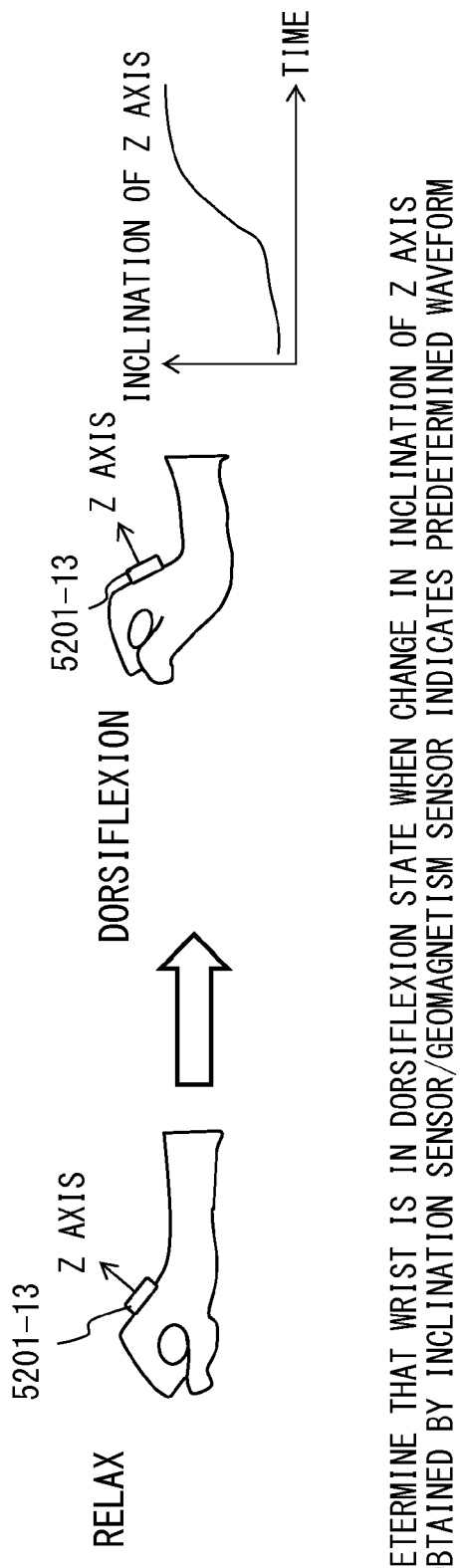
F I G. 3 1

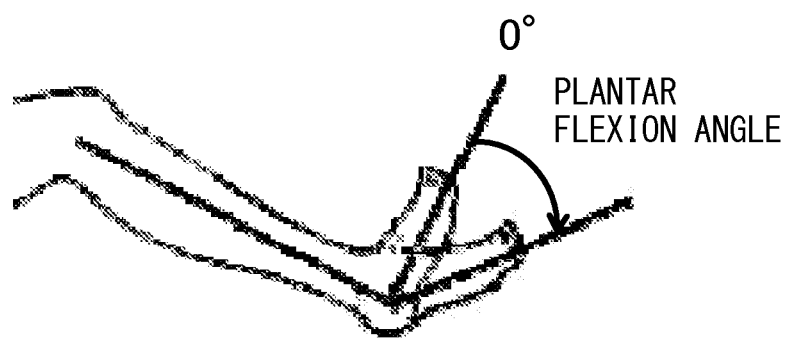
F I G. 3 8

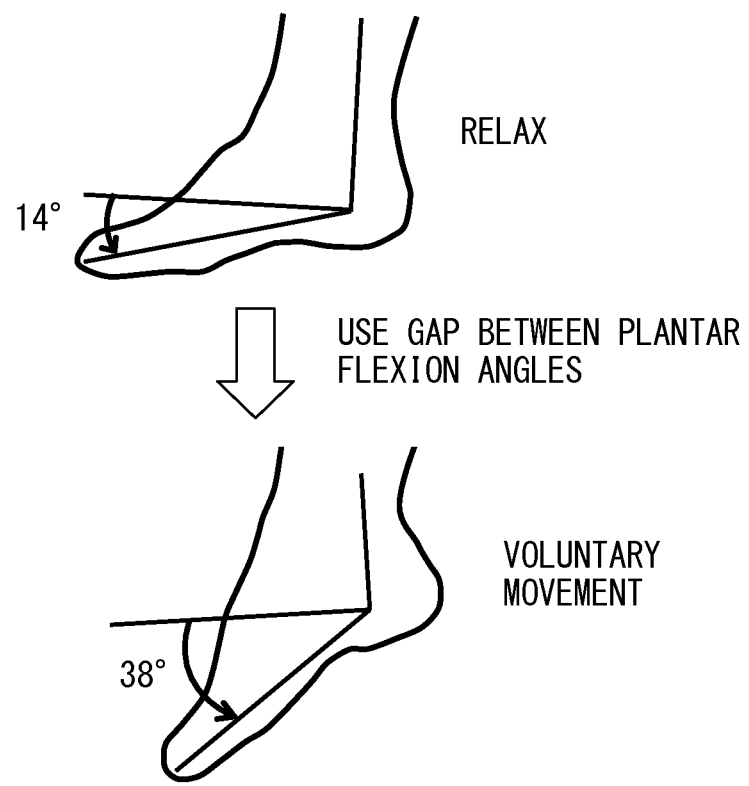
F I G. 3 9

BEND SENSOR
(ESTIMATE PLANTAR FLEXION ANGLE ACCORDING TO CHANGE
IN OHMIC VALUE CAUSED BY PLANTAR FLEXION)

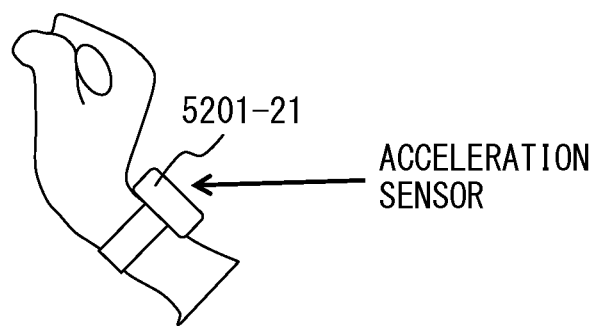
F I G. 4 4

OK

Cancel

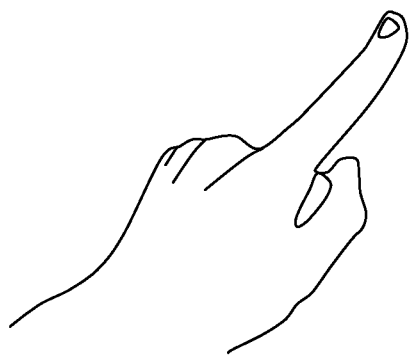
GO TO NEXT PAGE
F I G. 4 6 C

GO TO THE PAGE TWO PAGES AFTER

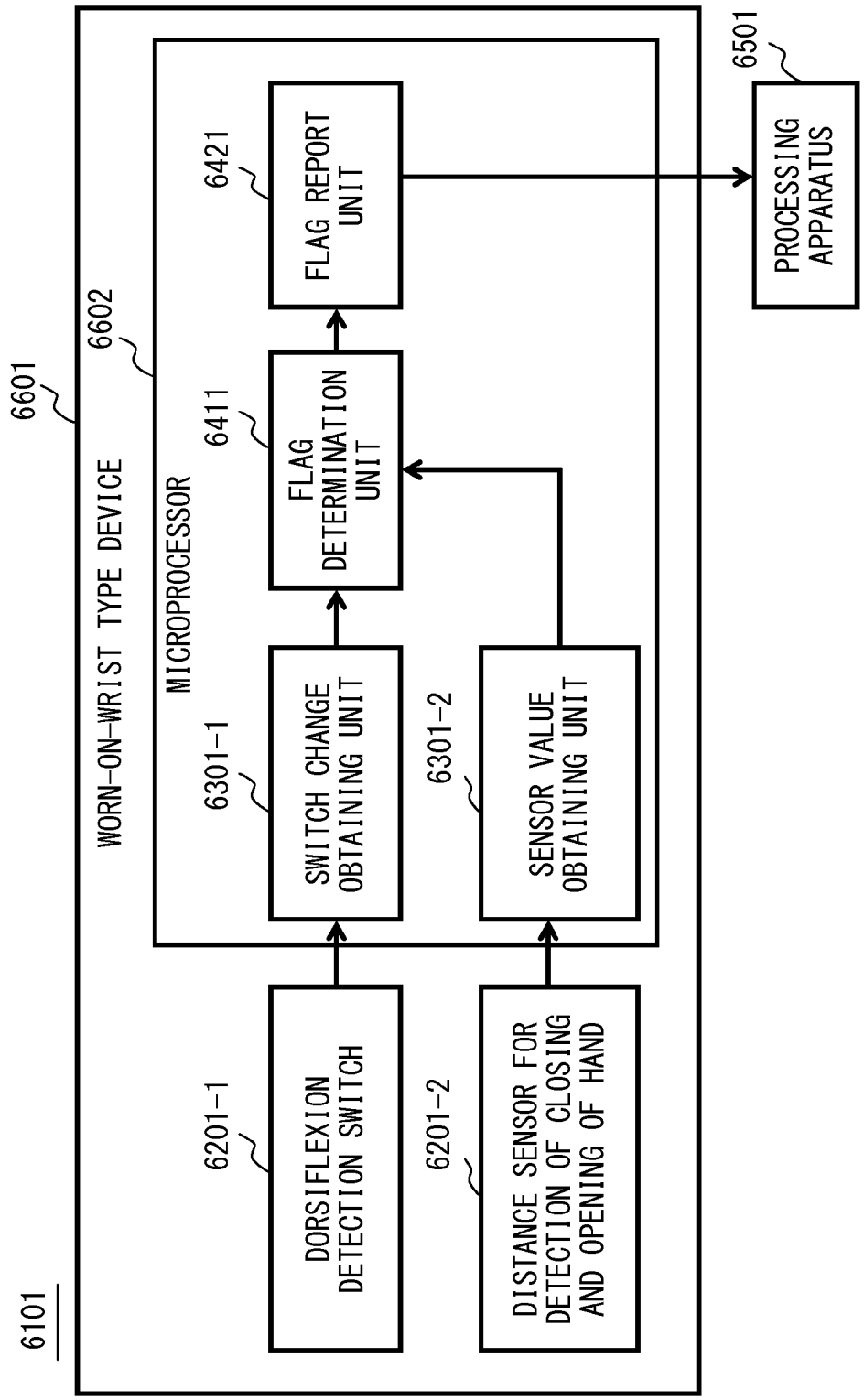
F I G. 51

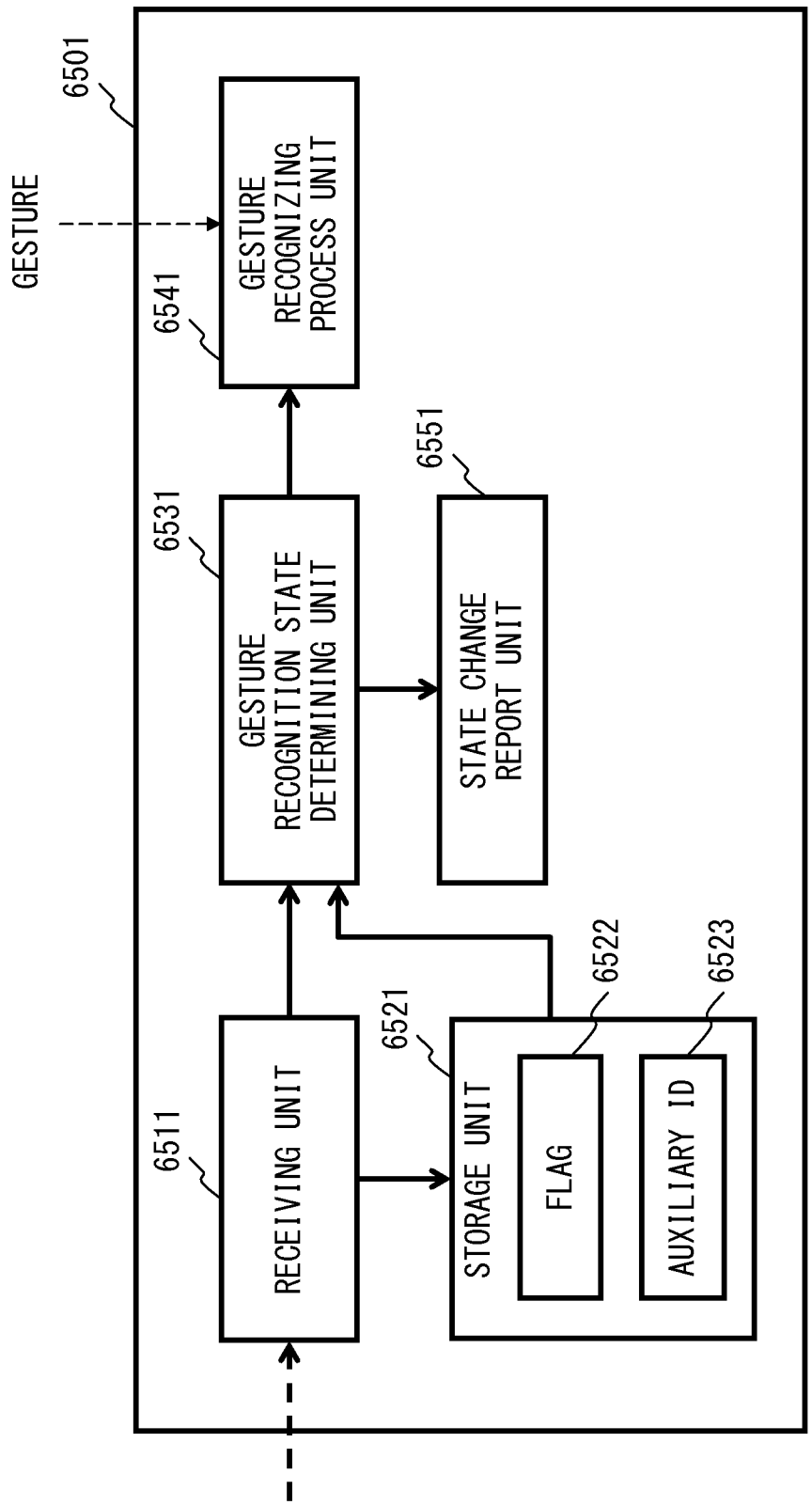
F I G. 5 2

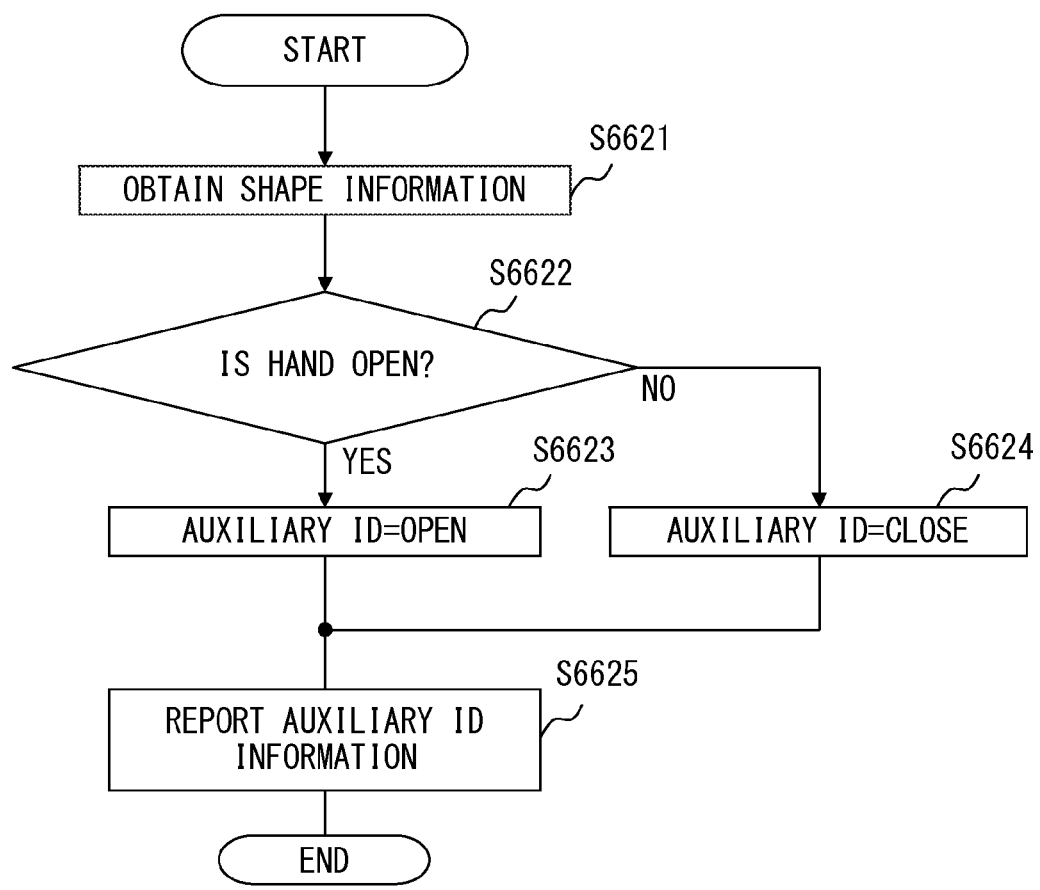
F I G. 5 4

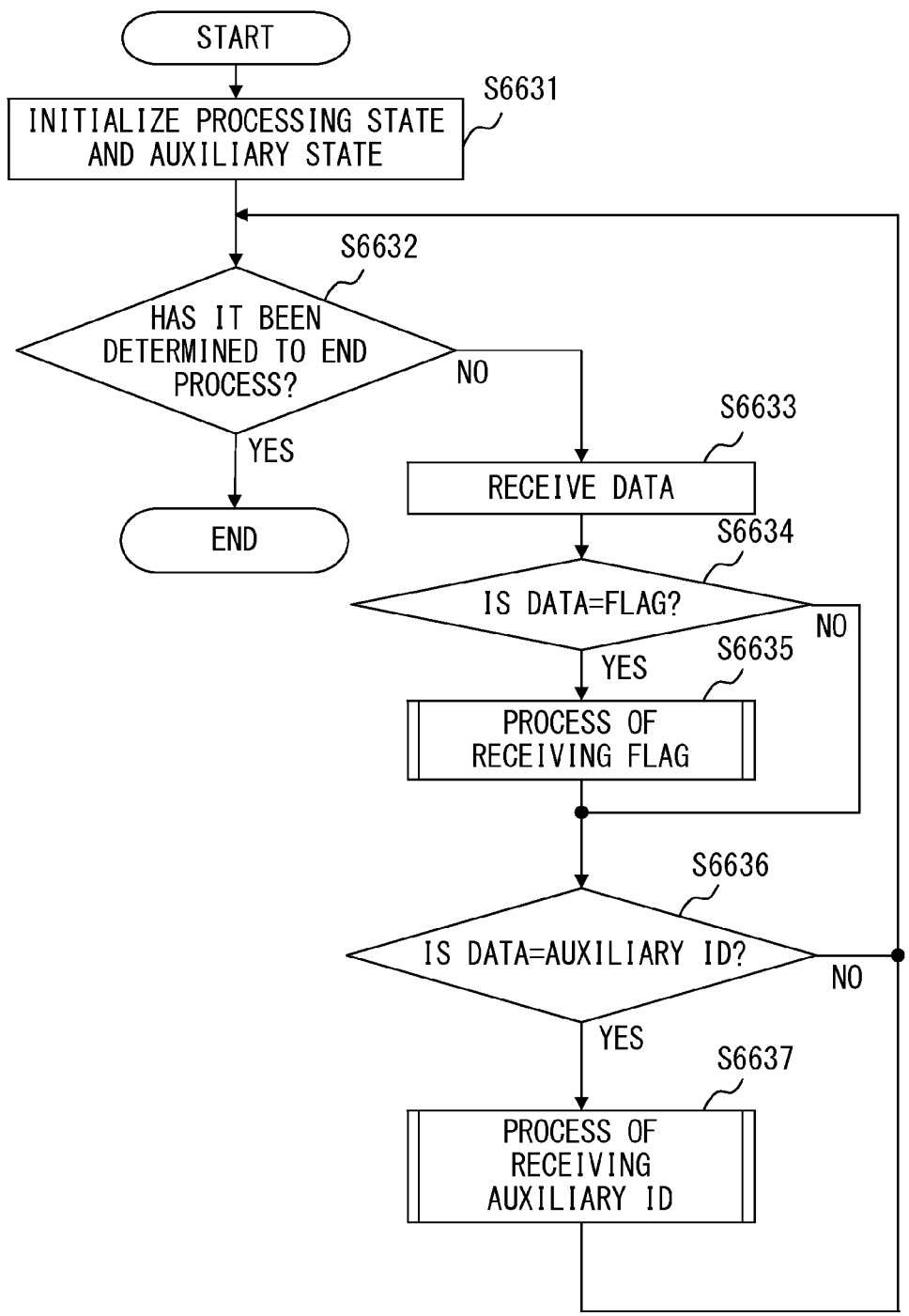
F I G. 5 5

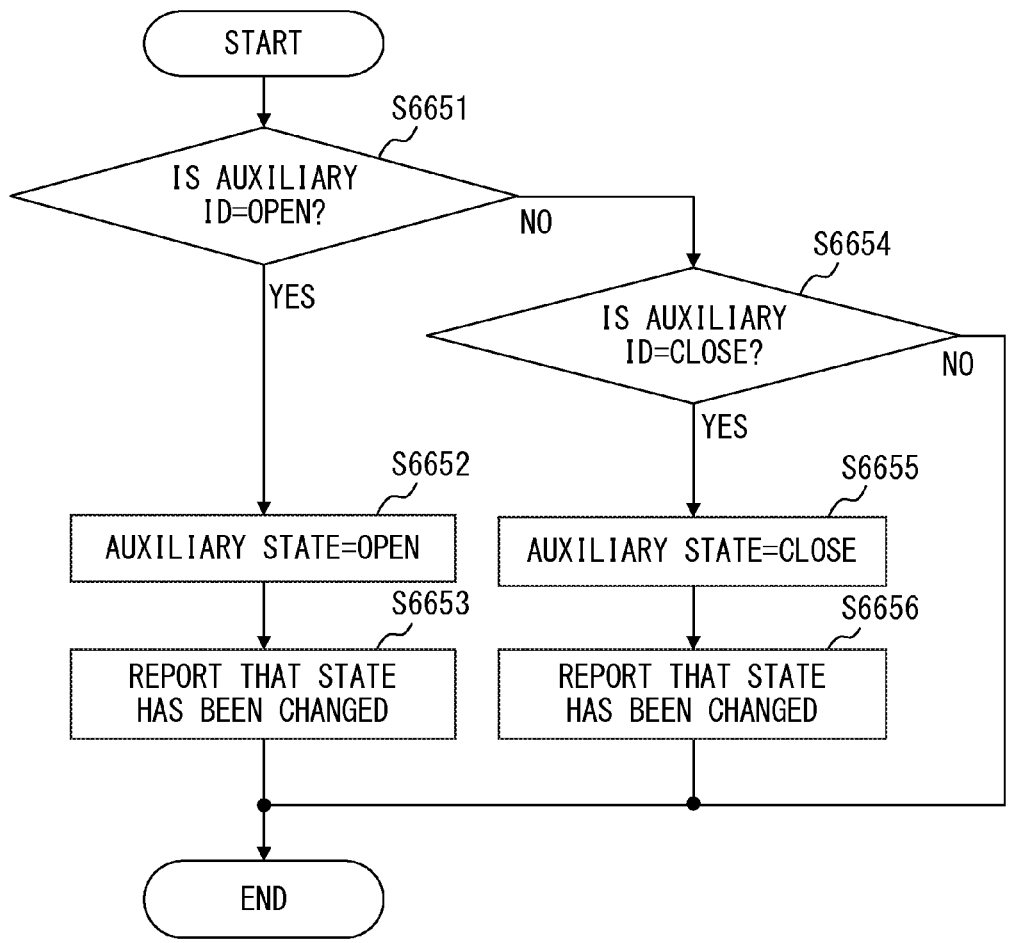
F I G. 5 7

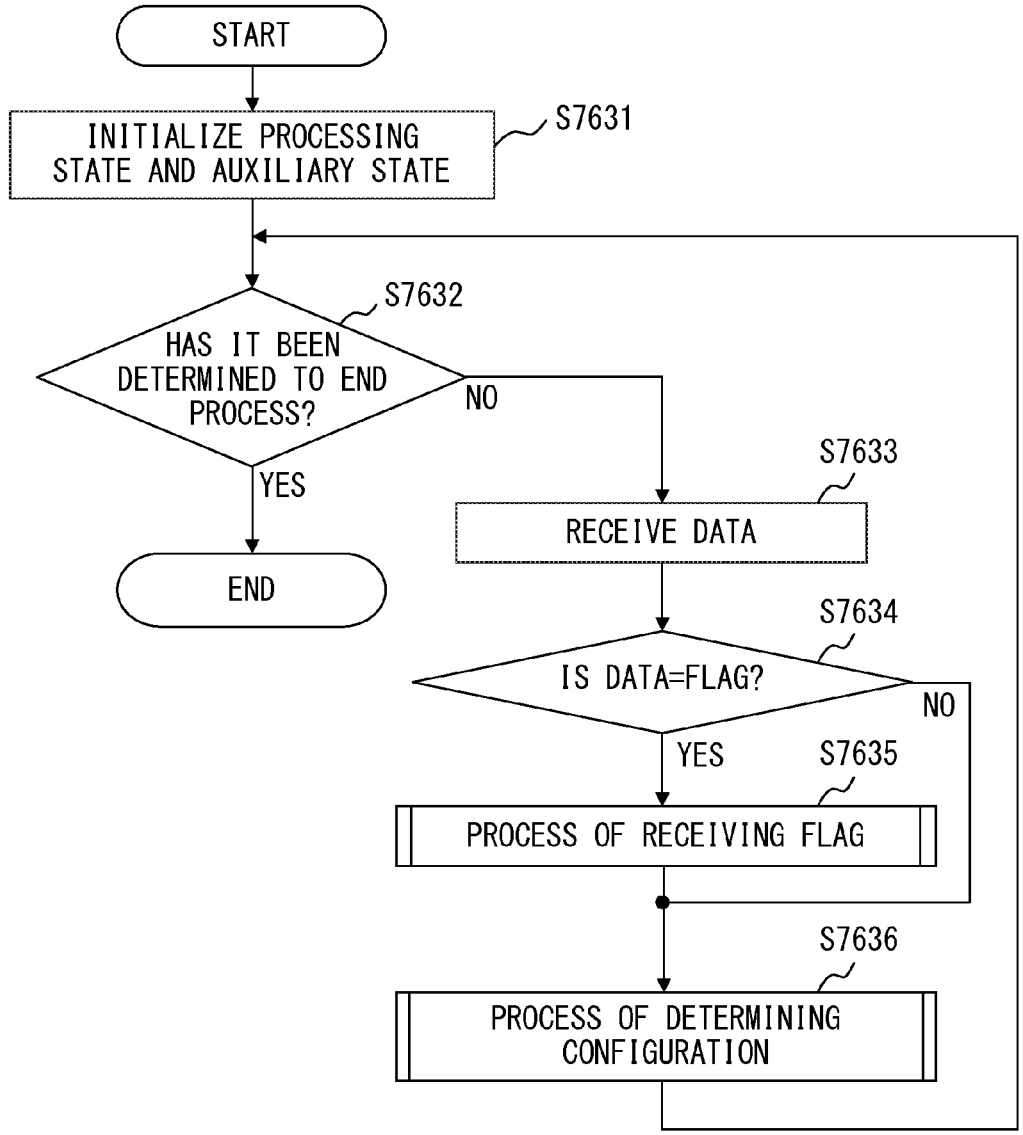
F I G. 5 9

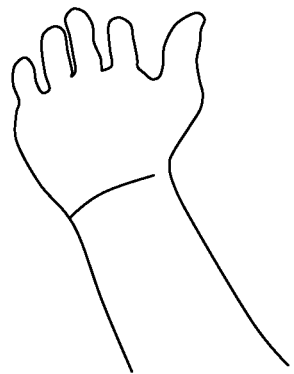
OK
F I G. 6 1 A

Cancel

GO TO NEXT PAGE

GO TO THE PAGE TWO PAGES AFTER

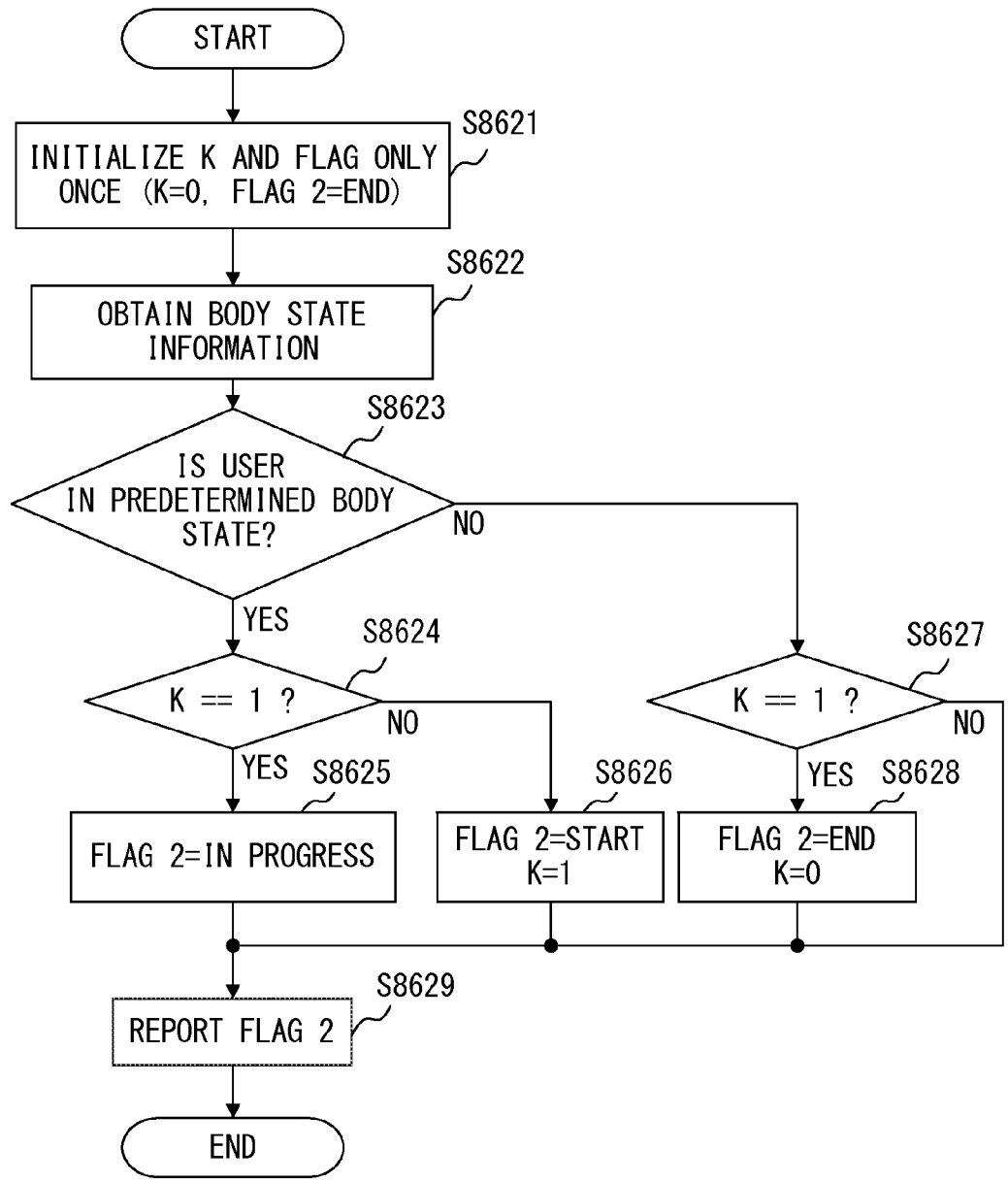
F I G. 6 7

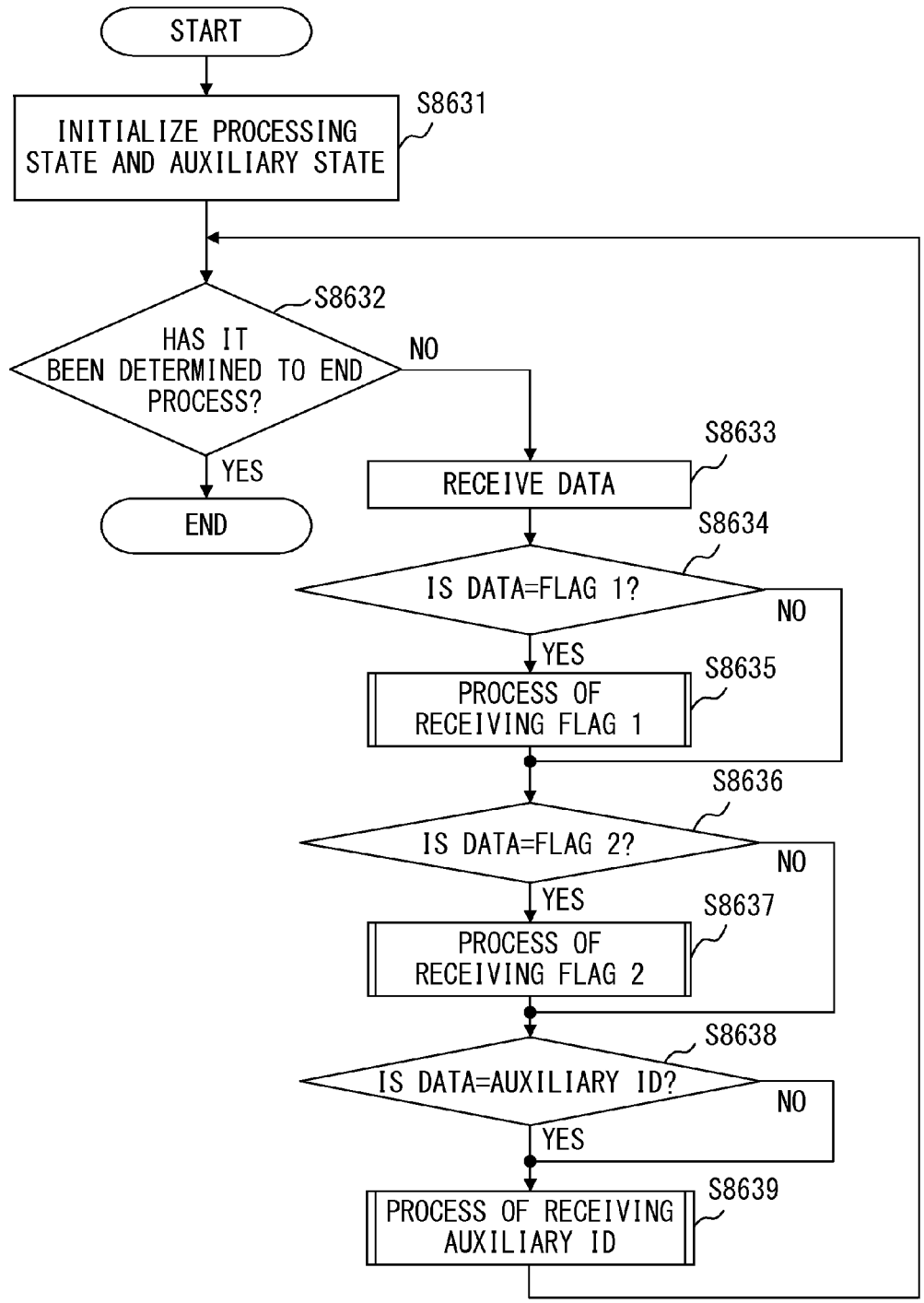
F I G. 6 8

GESTURE INPUT METHOD

CROSS-REFERENCE TO RELATED APPLICATIONS

This application is based upon and claims the benefit of priority of the prior Japanese Patent Application No. 2013-199135, filed on Sep. 26, 2013, and Japanese Patent Application No. 2014-087684, filed on Apr. 21, 2014, the entire contents of which are incorporated herein by reference.

FIELD

The embodiments discussed herein are related to a gesture input method.

BACKGROUND

Recently, the configuration or movement (gestures) of a user's body or the user's voice has been able to be recognized using an apparatus equipped with a sensor, and apparatuses such as televisions, game consoles, and personal computers (PCs) have been able to be operated using, for example, gestures or sounds.

Wearable apparatuses (wearable devices) attached to, for example, the head or wrist of a person, such as smart glasses and wristwatch-type devices, have been introduced.

For an apparatus that recognizes gestures, it is difficult to judge whether a movement from a user should be recognized as a movement for operating the apparatus.

Hence, there is a problem wherein a daily-life movement such as the lowering of the arm when the user is tired or the scratching of the body due to itching is recognized as an operation of the apparatus, causing unintended operation of the apparatus.

Patent document 1: Japanese Laid-open Patent Publication No. 2005-63090
Patent document 2: Japanese Laid-open Patent Publication No. 8-315154
Patent document 3: Japanese Laid-open Patent Publication No. 2001-216069
Non-patent document 1: Jungsoo Kim, Jiasheng He, Kent Lyons, and Thad Starner, "The Gesture Watch: A Wireless Contact-free Gesture based Wrist Interface", *In Proceedings of the* 2007 11*th IEEE International Symposium on Wearable Computers* (ISWC '07). IEEE Computer Society, Washington, D.C., USA, pp. 1-8, 2007. Non-patent document 2: Zhou Ren, Junsong Yuan, and Zhengyou Zhang, "Robust hand gesture recognition based on finger-earth mover's distance with a commodity depth camera", *In Proceedings of the* 19*th ACM international conference on Multimedia* (MM '11), ACM, New York, N.Y., USA, pp. 1093-1096, 2011.
Non-patent document 3: Saito Hisashi, Akaike Hideo, Kakuda Hiroyasu, "Proposal and Evaluation of Single-Sound Based Hand Gesture Interaction", *Human Interface Symposium Collected Papers,* 1533D, pages 355-358, 2012.

SUMMARY

According to an aspect of the invention, a gesture input method includes observing a wrist, outputting state information indicating a state of the wrist, determining, by a processor, according to the state information whether the wrist is in a dorsiflexion state, and performing, by the processor, a predetermined process in accordance with whether the wrist is in the dorsiflexion state.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 3 illustrates a second exemplary configuration of a system in accordance with an embodiment;
FIG. 5 illustrates a fourth exemplary configuration of a system in accordance with an embodiment;
FIG. 16 illustrates data indicating dorsiflexion angles at the time of relaxation and the time of voluntary movement;
FIG. 18 is a graph indicating an average difference between a dorsiflexion angle at the time of relaxation and a dorsiflexion angle at the time of voluntary movement.

FIG. 23 illustrates a method for detecting a dorsiflexion state of the wrist (example 5);

FIG. 28 illustrates a method for detecting a dorsiflexion state of the wrist (example 10);

FIG. 31 illustrates a method for detecting a dorsiflexion state of the wrist (example 13);

FIG. 38 illustrates a plantar flexion angle of the ankle;

FIG. 39 illustrates the states of the ankle at the time of relaxation and the time of voluntary movement;

FIG. 44 illustrates a method for detecting the state of the hand (example 1);

FIG. 46C illustrates a configuration of the hand;

FIG. 51 illustrates a fifth configuration example of a system in accordance with an embodiment;

FIG. 52 is a configuration diagram of a processing apparatus in accordance with the fifth exemplary configuration;

FIG. 54 is a flowchart illustrating details of processes for an auxiliary ID;

FIG. 55 is a flowchart of a flag controlling process performed by a processing apparatus of the fifth exemplary configuration;

FIG. 57 is a flowchart illustrating details of a process of receiving an auxiliary ID;

FIG. 59 is a flowchart of a flag controlling process performed by a processing apparatus of the sixth exemplary configuration;

FIG. 61A illustrates an orientation of the wrist;

FIG. 67 is a flowchart illustrating details of processes for palmar flexion;

FIG. 68 is a flowchart illustrating a flag management process performed by a system using a dorsiflexion state and a palmar flexion state;

DESCRIPTION OF EMBODIMENTS

The following will describe embodiments with reference to the drawings.

Figure 1:
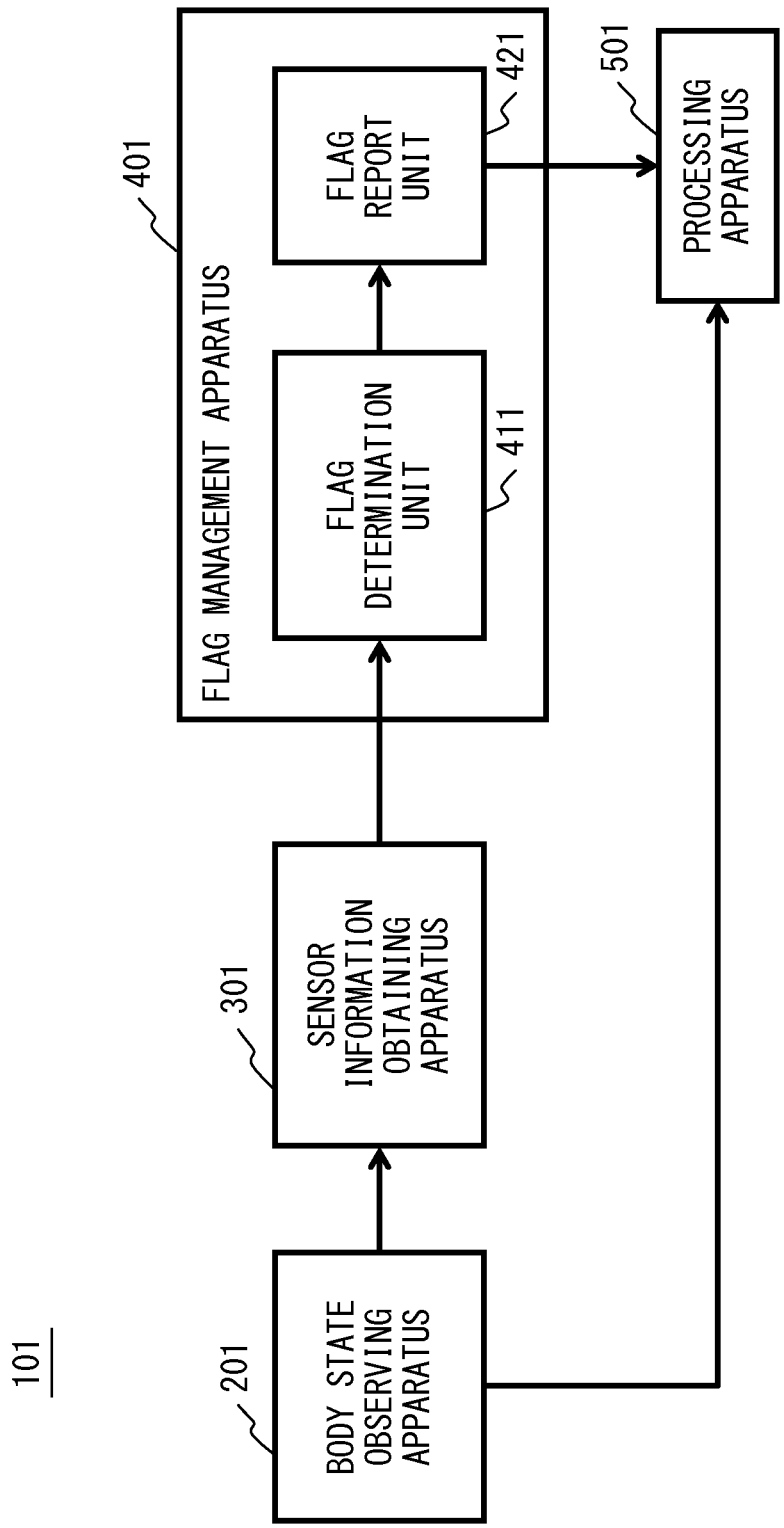
FIG. 1 is a configuration diagram of a system in accordance with an embodiment.

FIG. 1 is a configuration diagram of a system in accordance with an embodiment.

A system 101 includes a body state observing apparatus 201, a sensor information obtaining apparatus 301, a flag management apparatus 401, and a processing apparatus 501.

The body state observing apparatus 201 observes a predetermined site of the body of a user (operator) and transmits body information to the sensor information obtaining apparatus 301 and the processing apparatus 501. The body state information indicates, for example, the state (configuration) of a predetermined site of the body.

The body state observing apparatus 201 is connected to and can communicate with the sensor information obtaining apparatus 301 and the processing apparatus 501 wirelessly or by a wired link.

The body state observing apparatus 201 is, for example, a push switch, a camera, a temperature sensor, or a range sensor.

The body state observing apparatus 201 observes, for example, the wrist, ankle, or head and transmits a piece of body state information indicating the configuration or state thereof. The body state observing apparatus 201 also measures the posture of a predetermined site or an external force applied to the predetermined site, and transmits another piece of body state information indicating the posture of a predetermined site or an external force applied to the predetermined site. The body state observing apparatus 201 observes the hand or foot and transmits configuration information indicating the configuration of the hand or the configuration of a toe.

The sensor information obtaining apparatus 301 obtains a piece of body state information from the body state observing apparatus 201 and transmits this piece of information to the flag management apparatus 401. The sensor information obtaining apparatus 301 obtains another piece of body state information from the body state observing apparatus 201 and transmits this piece of information to the flag management apparatus 401. The sensor information obtaining apparatus 301 is connected to and can communicate with the body state observing apparatus 201 and the flag management apparatus 401 wirelessly or by a wired link.

The flag management apparatus 401 includes a flag determination unit 411 and a flag report unit 421.

The flag management apparatus 401 is connected to and can communicate with the sensor information obtaining apparatus 301 and the processing apparatus 501 wirelessly or by a wired link.

The flag determination unit 411 receives a piece of body state information and another piece of body state information from the sensor information obtaining apparatus 301 and determines according to these pieces of information whether the user is in a predetermined body state. The flag determination unit 411 sets the state of a flag according to the result of the determination and transmits the flag to the flag report unit 421. The flag determination unit 411 determines the configuration of the hand according to configuration information and sets and transmits an auxiliary ID to the flag report unit 421.

A flag is control information used to judge whether the processing apparatus 501 needs to perform a predetermined process.

The flag report unit 421 receives the result of the determination from the flag determination unit 411 and reports the flag to the processing apparatus 501 according to the result of the determination. The flag report unit 421 receives the auxiliary ID from the flag determination unit 411 and reports this auxiliary ID to the processing apparatus 501.

The processing apparatus 501 receives the flag from the flag report unit 421 and performs a predetermined process according to the flag. The processing apparatus 501 also receives body state information from the body state observing apparatus 201 and performs a predetermined process according to the body state information, the auxiliary ID, and the flag.

The processing apparatus 501 is connected to and can communicate with the body state observing apparatus 201 and the flag management apparatus 401 wirelessly or by a wired link.

The processing apparatus 501 is, for example, a gesture recognition apparatus or a display apparatus. The processing apparatus 501 is, for example, a Personal Computer (PC), a smartphone, a Head Mounted Display (HMD), a wristwatch-type device, a household appliance, a lighting apparatus, or a game console.

The number of processing apparatuses 501 is not limited to one, and there may be any number of processing apparatuses 501.

The body state observing apparatus 201, the sensor information obtaining apparatus 301, the flag management apparatus 401, and the processing apparatus 501 may be physically different apparatuses or may be incorporated into an integrated apparatus.

The following will describe exemplary configurations of a plurality of systems.

Figure 2:
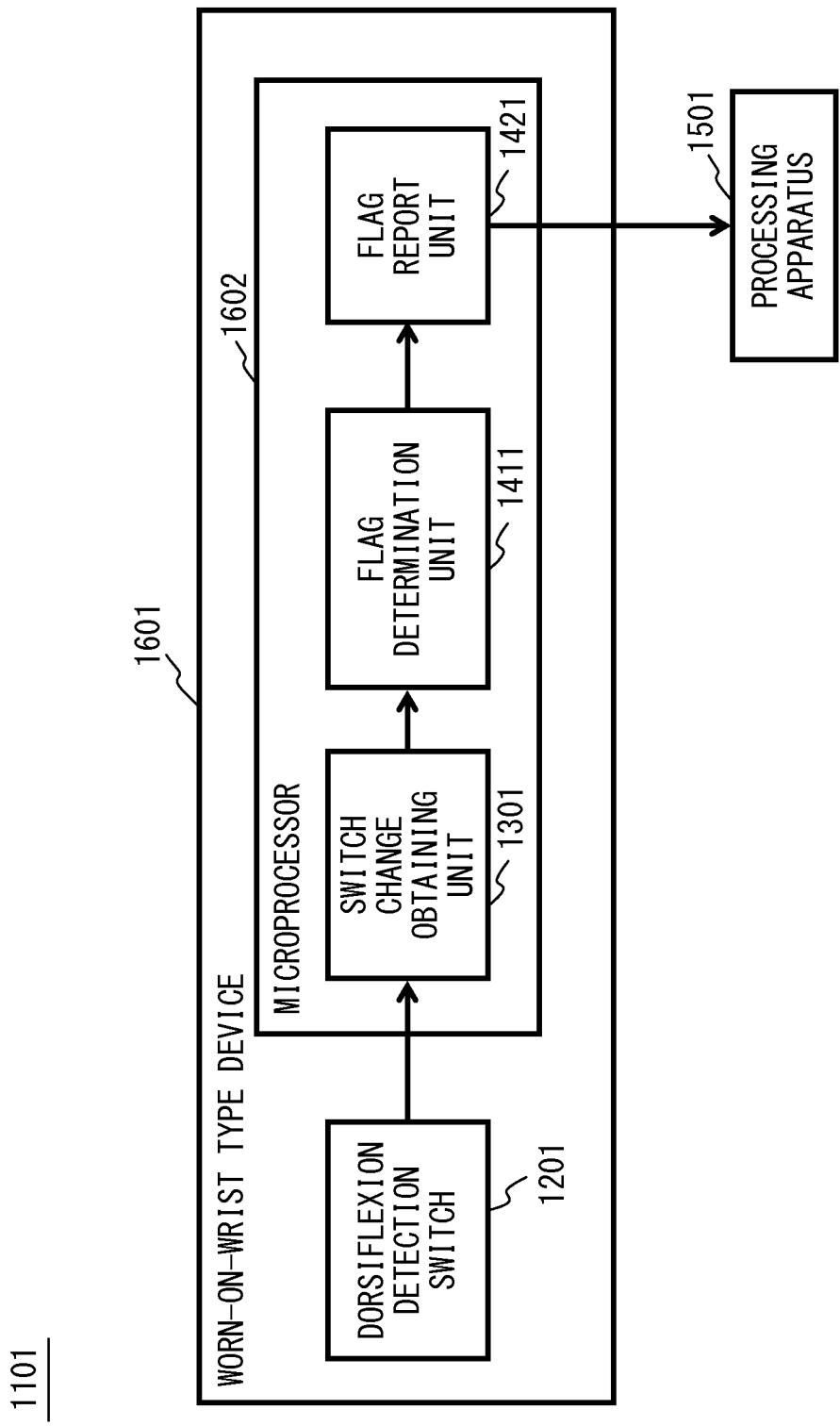
FIG. 2 illustrates a first exemplary configuration of a system in accordance with an embodiment.

FIG. 2 illustrates a first exemplary configuration of a system in accordance with an embodiment.

A system 1101 includes a worn-on-wrist type device 1601 and a processing apparatus 1501.

The worn-on-wrist type device 1601 includes a dorsiflexion detection switch 1201 and a microprocessor 1602. The worn-on-wrist type device 1601 is an apparatus worn on the wrist when used.

The dorsiflexion detection switch 1201 is a switch to detect dorsiflexion of the wrist. The dorsiflexion detection switch 1201 outputs a signal indicating whether the wrist is being dorsiflexed (body state information) to the microprocessor 1602. The dorsiflexion detection switch 1201 corresponds to the body state observing apparatus 201 in FIG. 1.

The microprocessor 1602 includes a switch change obtaining unit 1301, a flag determination unit 1411, and a flag report unit 1421.

The switch change obtaining unit 1301 receives body state information from the dorsiflexion detection switch 1201 and transmits this information to the flag determination unit 1411. The switch change obtaining unit 1301 corresponds to the sensor information obtaining apparatus 301 in FIG. 1.

The flag determination unit 1411 and the flag report unit 1421 correspond to the flag determination unit 411 and the flag report unit 421 in FIG. 1 and have functions similar to the functions of these units in FIG. 1, and hence descriptions of the flag determination unit 1411 and the flag report unit 1421 are omitted herein.

The processing apparatus 1501 corresponds to the processing apparatus 501 in FIG. 1 and has functions similar to those of the processing apparatus 501, and hence descriptions of the processing apparatus 1501 are omitted herein.

In the first exemplary configuration of the system, the dorsiflexion detection switch (body state observing apparatus), the switch change obtaining unit (sensor information obtaining apparatus), the flag determination unit, and the flag report unit (flag management apparatus) are included in the same apparatus (a worn-on-wrist type device).

FIG. 3 illustrates a second exemplary configuration of a system in accordance with an embodiment.

A system 2101 includes a worn-on-wrist type device 2601, a PC 2602, and a processing apparatus 2501.

The worn-on-wrist type device 2601 includes a dorsiflexion detection switch 2201. The worn-on-wrist type device 2601 is an apparatus worn on the wrist when used.

The dorsiflexion detection switch 2201 is a switch to detect dorsiflexion of the wrist. The dorsiflexion detection switch 2201 outputs a signal indicating whether the wrist is being dorsiflexed (body state information) to the PC 2602. The dorsiflexion detection switch 2201 corresponds to the body state observing apparatus 201 in FIG. 1.

The PC 2602 includes a switch change obtaining unit 2301, a flag determination unit 2411, and a flag report unit 2421.

The switch change obtaining unit 2301 receives body state information from the dorsiflexion detection switch 2201 and transmits this information to the flag determination unit 2411. The switch change obtaining unit 2301 corresponds to the sensor information obtaining apparatus 301 in FIG. 1.

The flag determination unit 2411 and the flag report unit 2421 correspond to the flag determination unit 411 and the flag report unit 421 in FIG. 1 and have functions similar to the functions of these units in FIG. 1, and hence descriptions of the flag determination unit 2411 and the flag report unit 2421 are omitted herein.

The processing apparatus 2501 corresponds to the processing apparatus 501 in FIG. 1 and has functions similar to those of the processing apparatus 501, and hence descriptions of the processing apparatus 2501 are omitted herein.

In the second exemplary configuration of the system, the switch change obtaining unit (sensor information obtaining apparatus), the flag determination unit, and the flag report unit (flag management apparatus) are included in the same apparatus (worn-on-wrist type device).

Figure 4:
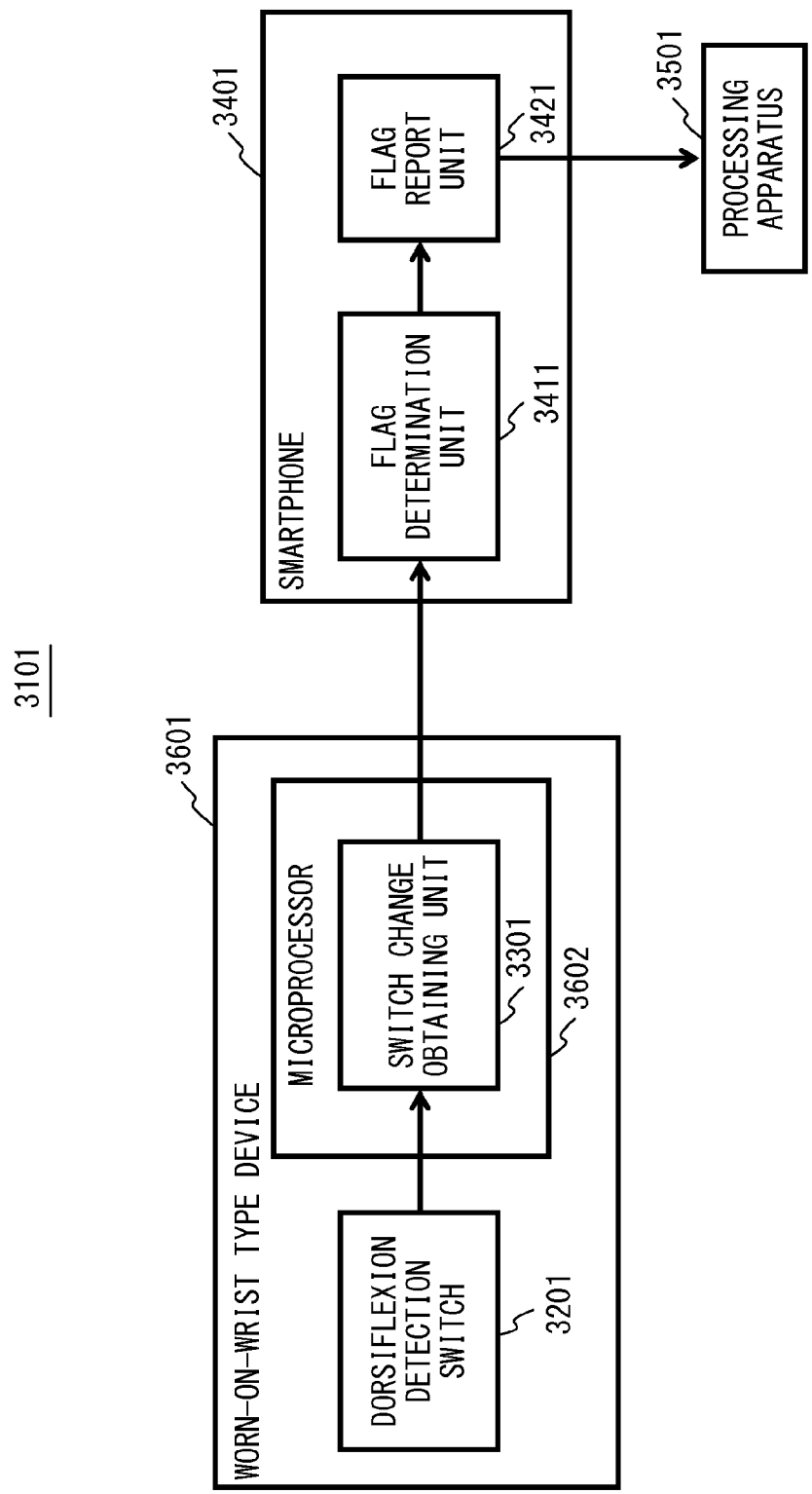
FIG. 4 illustrates a third exemplary configuration of a system in accordance with an embodiment.

FIG. 4 illustrates a third exemplary configuration of a system in accordance with an embodiment.

A system 3101 includes a worn-on-wrist type device 3601, a smartphone 3401, and a processing apparatus 3501.

The worn-on-wrist type device 3601 includes a dorsiflexion detection switch 3201 and a microprocessor 3602. The worn-on-wrist type device 3601 is an apparatus worn on the wrist when used.

The dorsiflexion detection switch 3201 is a switch to detect dorsiflexion of the wrist. The dorsiflexion detection switch 3201 outputs a signal indicating whether the wrist is being dorsiflexed (body state information) to the microprocessor 3602. The dorsiflexion detection switch 3201 corresponds to the body state observing apparatus 201 in FIG. 1.

The microprocessor 3602 includes a switch change obtaining unit 3301.

The switch change obtaining unit 3301 receives body state information from the dorsiflexion detection switch 3201 and transmits this information to the smartphone 3401. The switch change obtaining unit 3301 corresponds to the sensor information obtaining apparatus 301 in FIG. 1.

The smartphone 3401 includes a flag determination unit 3411 and a flag report unit 3421. The smartphone 3401 corresponds to the flag management apparatus 401 in FIG. 1.

The flag determination unit 3411 and the flag report unit 3421 correspond to the flag determination unit 411 and the flag report unit 421 in FIG. 1 and have functions similar to the functions of these units in FIG. 1, and hence descriptions of the flag determination unit 3411 and the flag report unit 3421 are omitted herein.

The processing apparatus 3501 corresponds to the processing apparatus 501 in FIG. 1 and has functions similar to those of the processing apparatus 501, and hence descriptions of the processing apparatus 3501 are omitted herein.

In the third exemplary configuration of the system, the dorsiflexion detection switch (body state observing apparatus) and the switch change obtaining unit (sensor information obtaining apparatus) are included in the same apparatus (worn-on-wrist type device).

FIG. 5 illustrates a fourth exemplary configuration of a system in accordance with an embodiment.

A system 4101 includes a camera 4201, an image-acquisition PC 4301, a flag-management PC 4401, and a processing apparatus 4501.

The camera 4201 is a photographing apparatus that shoots an image of the hand and, in particular, shoots an image of a dorsiflexion of the wrist. The camera 4201 transmits the shot image (body state information) to the image-acquisition PC 4301. The camera 4201 corresponds to the body state observing apparatus 201 in FIG. 1.

The image-acquisition PC 4301 receives the body state information from the camera 4201 and transmits this information to the flag-management PC 4401. The image-acquisition PC 4301 corresponds to the sensor information obtaining apparatus 301 in FIG. 1. The image-acquisition PC 4301 is connected to the flag-management PC 4401 over a network (e.g., Wide Area Network (WAN) or Local Area Network (LAN)).

The flag-management PC 4401 includes a flag determination unit 4411 and a flag report unit 4421. The flag-management PC 4401 corresponds to the flag management apparatus 401 in FIG. 1.

The flag determination unit 4411 and the flag report unit 4421 correspond to the flag determination unit 411 and the flag report unit 421 in FIG. 1 and have functions similar to the functions of these units in FIG. 1, and hence descriptions of the flag determination unit 4411 and the flag report unit 4421 are omitted herein.

The processing apparatus 4501 corresponds to the processing apparatus 501 in FIG. 1 and has functions similar to those of the processing apparatus 501, and hence descriptions of the processing apparatus 4501 are omitted herein.

In the fourth exemplary configuration of the system, the camera (body state observing apparatus), the image-acquisition PC (sensor information obtaining apparatus), the flag-management PC (flag management apparatus), and the processing apparatus are physically different apparatuses.

Figure 6:
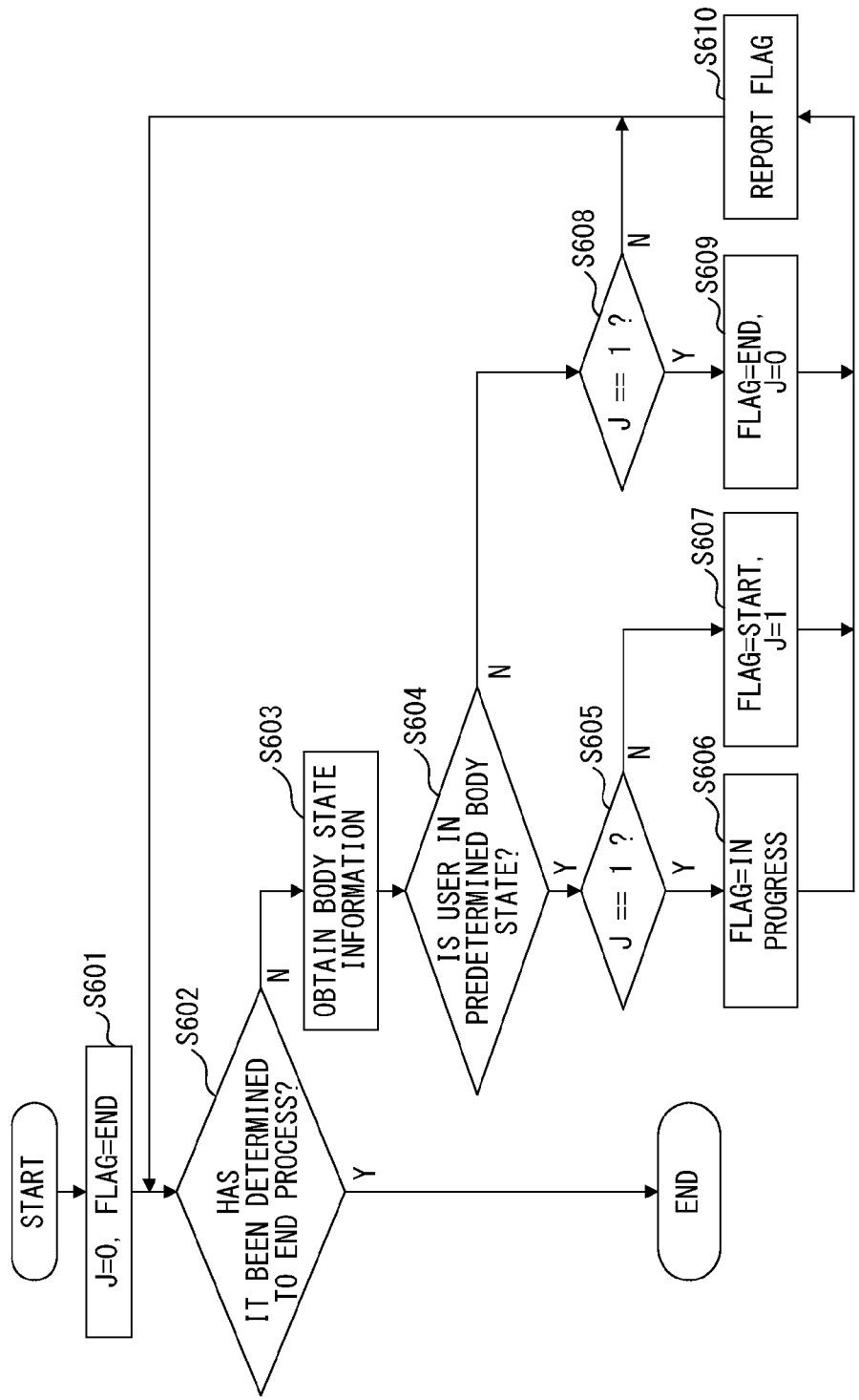
FIG. 6 is a flowchart of a flag management process in accordance with an embodiment.

FIG. 6 is a flowchart of a flag management process in accordance with an embodiment.

In step S601, the flag determination unit 411 sets variable j=0 and flag=end as initial values.

In step S602, the flag management process may end; alternatively, the flow may shift to step S603. As an example, the flag management process ends when an instruction to end the process is received from an external element or when the sensor information obtaining apparatus 301 or the processing apparatus 501 is turned off.

In step S603, the flag determination unit 411 receives body state information from the sensor information obtaining apparatus 301.

In step S604, the flag determination unit 411 determines according to the body state information whether the user is in a predetermined body state. When the user is in the predetermined body state, the flow shifts to step S605; when the user is not in the predetermined body state, the flow shifts to step S608. When, for example, the user's wrist is in a dorsiflexion state, the user's ankle is in a plantar flexion state, or the user's lips are in a rolled inward state, the flag determination unit 411 judges that the user is in the predetermined body state. Details of the dorsiflexion state, the plantar flexion state, and the rolled inward state will be described hereinafter.

In step S605, the flag determination unit 411 determines whether j=1. When j=1 is satisfied, the flow shifts to step S606; when j=1 is not satisfied, the flow shifts to step S607.

In step S606, the flag determination unit 411 sets flag=in-progress. The flag determination unit 411 transmits the flag to the flag report unit 421.

In step S607, the flag determination unit 411 sets flag=start and j=1. The flag determination unit 411 transmits the flag to the flag report unit 421.

In step S608, the flag determination unit 411 determines whether j=1. When j=1 is satisfied, the flow shifts to step S609; when j=1 is not satisfied, the flow returns to step S602.

In step S609, the flag determination unit 411 sets flag=end and j=0. The flag determination unit 411 transmits the flag to the flag report unit 421.

In step S610, the flag report unit 421 transmits the flag to the processing apparatus 501. Note that an arrangement may be made such that the flag report unit 421 transmits a flag only when flag=start or flag=end.

Figure 7:
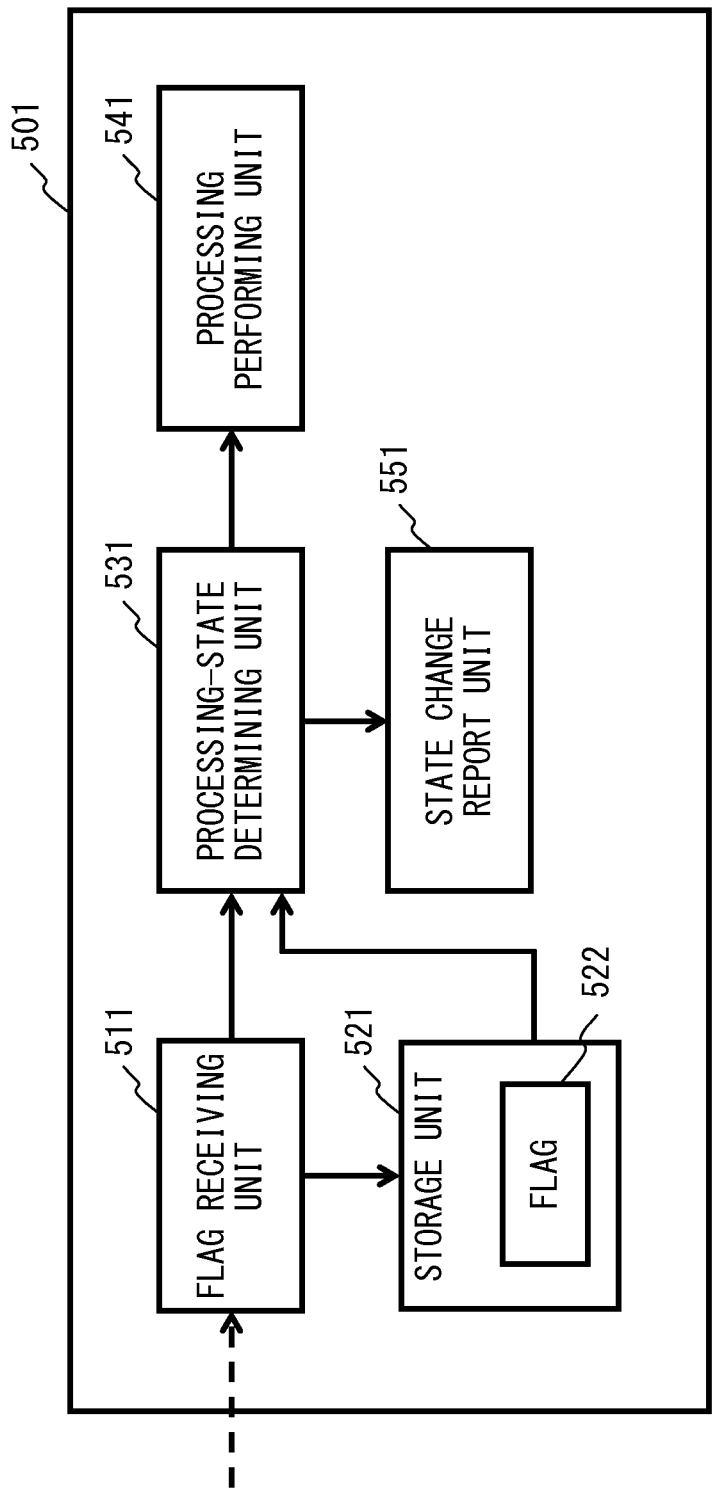
FIG. 7 is a configuration diagram of a processing apparatus in accordance with an embodiment.

FIG. 7 is a configuration diagram of a processing apparatus in accordance with an embodiment.

The processing apparatus 501 includes a flag receiving unit 511, a storage unit 521, a processing-state determining unit 531, a processing performing unit 541, and a state change report unit 551.

The flag receiving unit 511 receives a flag 522 from the flag report unit 421 and stores this flag in the storage unit 521.

The storage unit 521 is a storage apparatus to store data. The storage unit 521 is, for example, a Random Access Memory (RAM), a magnetic disk apparatus, or a nonvolatile memory.

The storage unit 521 stores the flag 522.

The processing-state determining unit 531 determines a processing state according to the flag 522 and reports the processing state to the processing performing unit 541 and the state change report unit 551. The processing-state determining unit 531 determines, for example, that processing state=start is satisfied when flag=start is satisfied.

The processing performing unit 541 performs a predetermined process according to the reported processing state. For example, when processing state=start, the processing performing unit 541 performs the predetermined process, such as a process of recognizing a gesture or a process of displaying information on the screen of a display apparatus (not illustrated) included in or connected to the processing apparatus 501.

Processing state=start is satisfied when flag=start, and flag=start is satisfied when the body is in the predetermined state (when the user's wrist is in the dorsiflexion state or the palmar flexion state, the user's ankle is in the plantar flexion state, or the user's lips are in the rolled inward state). Thus, processing state=start is satisfied when the body is in the predetermined state. Accordingly, the performing of the predetermined process may be controlled in accordance with whether the user puts the body in the predetermined state (whether the user's wrist is in the dorsiflexion state or the palmar flexion state, the user's ankle is in the plantar flexion state, or the user's lips are in the rolled inward state).

The predetermined process includes the following, (1)-(5).

(1) Controlling of Hardware

The processing apparatus 501 is turned on or off. A wireless communication (e.g., Bluetooth or Wireless Fidelity (Wi-Fi)) is established.

(2) Outputting of Information

Information is displayed on a screen. A sound is emitted. Vibrations are caused. A sheet is printed out. Information is transmitted to an external apparatus wirelessly or by a wired link.

(3) Changing of State

The transmittance of an icon is changed. The volume is changed. Vibration intensity is changed. A shape is changed. Information is initialized. The origin of coordinates is defined. An operational object is changed. A timer is started or stopped. The operator is switched.

(4) Inputting of Information

A Near-Field Communication (NFC) tag, barcode, or two-dimensional code is read. Gestures made with an identical site are recognized. A sound is recognized. Handwritten characters are recognized. Inputs provided using a touch panel or a button are recognized. A person is authenticated.

(5) Updating of Information

News, positional information, weather, or traffic information is updated. An electronic mail is received.

The state change report unit 551 sends a report to the user in response to a change in a processing state. For example, the state change report unit 551 vibrates the processing apparatus 501 or blinks the screen of a display apparatus (not illustrated) included in or connected to the processing apparatus 501. The state change report unit 551 may obtain a flag and perform a predetermined process according to the state of the flag.

The processing apparatus 501 may perform any of the following processes in accordance with whether the wrist is in the dorsiflexion state, i.e., whether processing state=start is satisfied.

Recognize sound input only when the wrist is in the dorsiflexion state.

Recognize hand-written characters only when the wrist is in the dorsiflexion state.

Read an RFID tag only when the wrist is in the dorsiflexion state.

Recognize sounds, hand-written characters, and tag-based instructions only when the wrist is in the dorsiflexion state. Select execution or cancellation of the instruction using the following body movement. Select cancellation when the dorsiflexion ends without a body movement being made.

Display information on an HMD or a wristwatch-type device only for a certain period of time after the wrist has been put in the dorsiflexion state. Shaking the wrist during the dorsiflexion state causes the information to be displayed for a longer time.

Decrease the transmittance of the information displayed on the HMD only when the wrist is in the dorsiflexion state. The transmittance is decreased in accordance with the number of times the wrist is shaken (the view becomes clearer).

Turn on the processing apparatus only when the wrist is in the dorsiflexion state.

Figure 8:
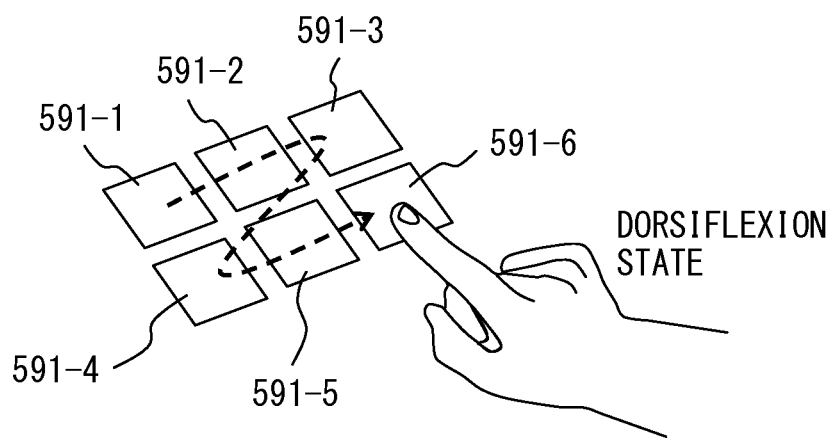
FIG. 8 illustrates detection of an NFC tag.

Set a plurality of detected NFC tags 591-1 to 591-6 as one group by touching these tags while the wrist is in the dorsiflexion state, as illustrated in FIG. 8.

Set, as one group, a switch, two-dimensional code, and so on detected while the wrist is in the dorsiflexion state.

Make the touch panel of the wristwatch-type device operable only when the wrist is in the dorsiflexion state.

Next, a plurality of examples of the display apparatus will be described.

As described above, the display apparatus may be installed on the processing apparatus 501 or may be connected to the processing apparatus 501 wirelessly or by a wired link. The display apparatus is, for example, a liquid crystal display, electronic paper, or a light-emitting diode (LED). The display apparatus may have a planar shape or may have a curved surface shape. The display apparatus displays information indicating the state of the user, e.g., information indicating whether the wrist is in the dorsiflexion state.

FIGS. 9A-9G illustrate display apparatuses in accordance with embodiments.

Figure 9A:
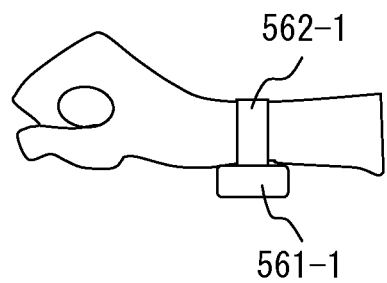
FIG. 9A illustrates a display apparatus in accordance with an embodiment.

In FIG. 9A, a display apparatus 561-1 is attached to the inner surface of the wrist by a belt 562-1.

Figure 9B:
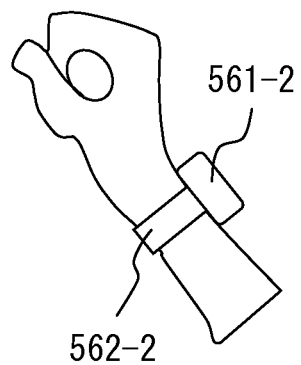
FIG. 9B illustrates a display apparatus in accordance with an embodiment.

In FIG. 9B, a display apparatus 561-2 is attached to the outer surface of the wrist by a belt 562-2.

Figure 9C:
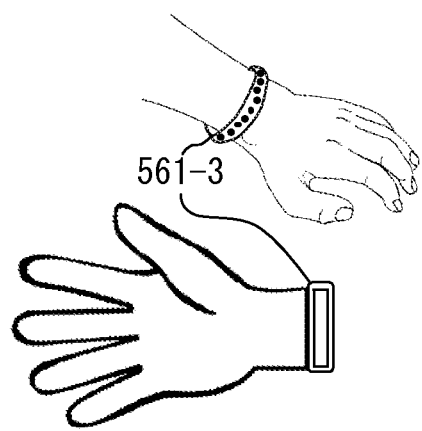
FIG. 9C illustrates a display apparatus in accordance with an embodiment.

In FIG. 9C, an arm-ring type display apparatus 561-3 is attached to the wrist. A display part on which information is displayed may be provided on the entirety of the external surface of the arm-ring type display apparatus 561-3 or may be provided on a portion thereof.

Figure 9D:
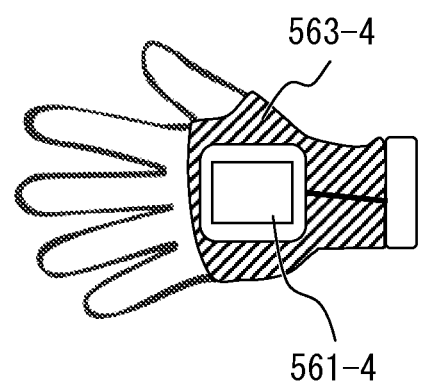
FIG. 9D illustrates a display apparatus in accordance with an embodiment.

In FIG. 9D, a display apparatus 561-4 is provided on a palm side of a glove 563-4.

Figure 9E:
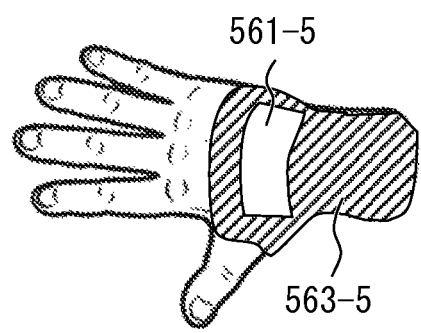
FIG. 9E illustrates a display apparatus in accordance with an embodiment.

In FIG. 9E, a display apparatus 561-5 is provided on a back side of the glove 563-4.

Figure 9F:
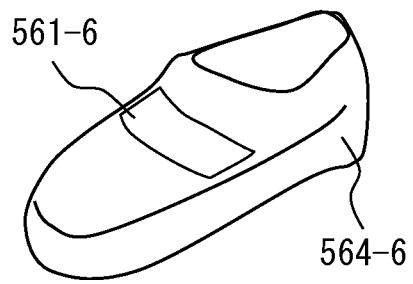
FIG. 9F illustrates a display apparatus in accordance with an embodiment.

In FIG. 9F, a display apparatus 561-6 is provided on the instep of a shoe 564-6. Note that the shoe 564-6 corresponds to the processing apparatus 501.

Figure 9G:
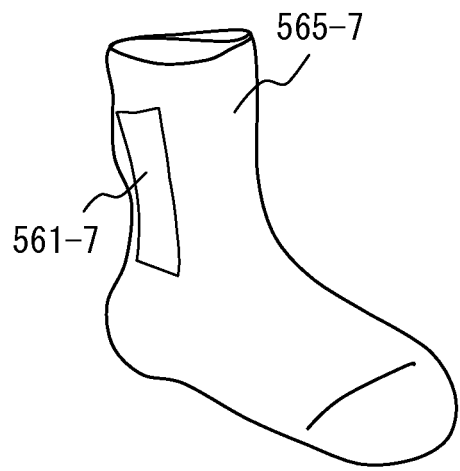
FIG. 9G illustrates a display apparatus in accordance with an embodiment.

In FIG. 9G, a display apparatus 561-7 is provided on an ankle portion of a sock 565-7. Note that the sock 565-7 corresponds to the processing apparatus 501.

The display apparatus 561 may be provided at the foot as depicted in FIGS. 9F and 9G in addition to the hand or wrist as depicted in FIGS. 9A-9E.

The following will describe two exemplary configurations of the processing apparatus.

Figure 10:
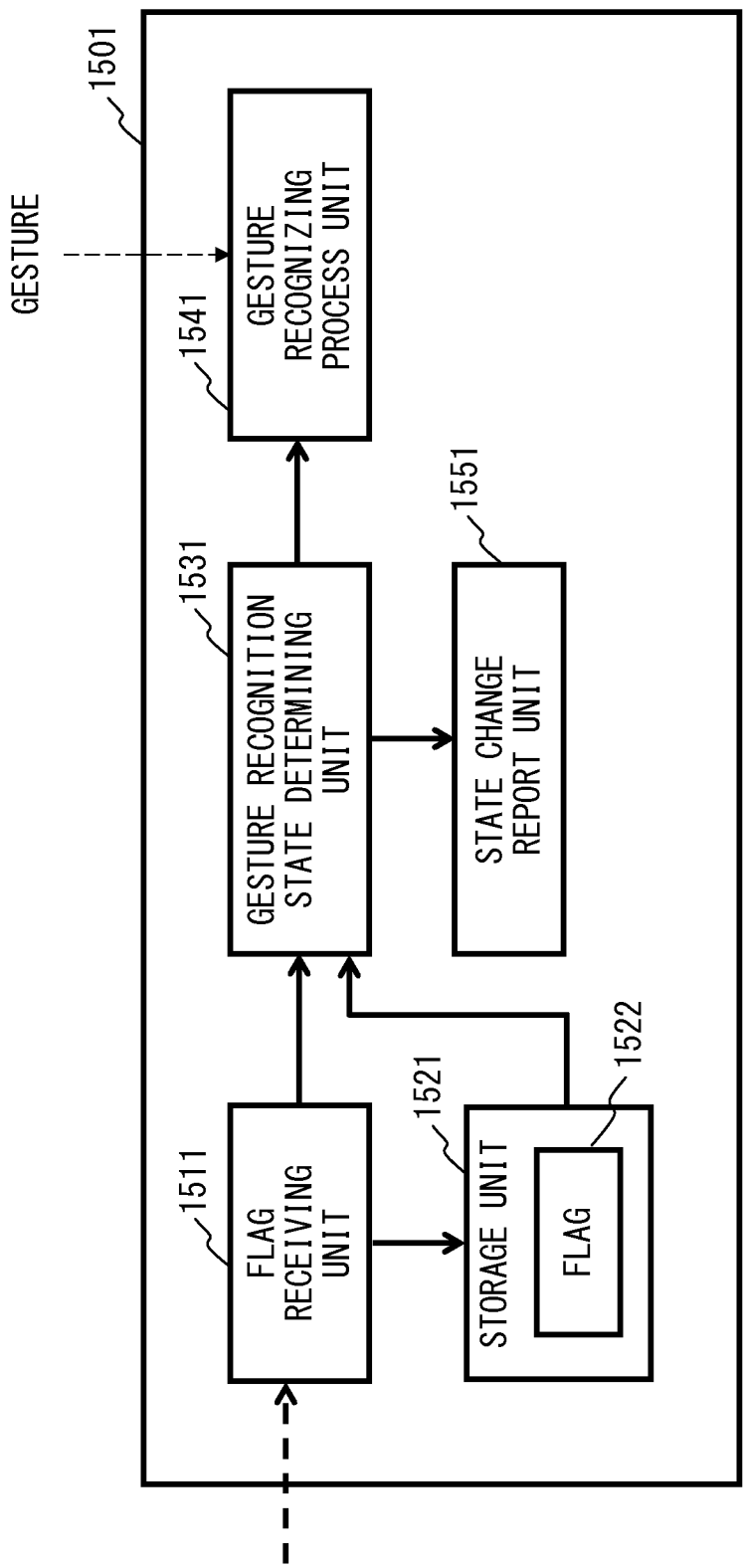
FIG. 10 illustrates a first exemplary configuration of a processing apparatus in accordance with an embodiment.

FIG. 10 depicts a first exemplary configuration of a processing apparatus in accordance with an embodiment.

FIG. 10 indicates a configuration for a situation in which the processing apparatus is an apparatus that recognizes a gesture.

The processing apparatus 1501 includes a flag receiving unit 1511, a storage unit 1521, a gesture recognition state determining unit 1531, a gesture recognizing process unit 1541, and a state change report unit 1551.

The flag receiving unit 1511 receives a flag 1522 from the flag report unit 421 and stores this flag in the storage unit 1521. The flag receiving unit 1511 corresponds to the flag receiving unit 511 in FIG. 7.

The storage unit 1521 is a storage apparatus to store data. The storage unit 1521 is, for example, a Random Access Memory (RAM), a magnetic disk apparatus, or a nonvolatile memory.

The storage unit 1521 stores the flag 1522. The storage unit 1521 corresponds to the storage unit 521 in FIG. 7.

The gesture recognition state determining unit 1531 determines according to the flag 1522 which of "start" or "end" the processing state corresponds to, and reports the processing state for which the determination has been made to the gesture recognizing process unit 1541 and the state change report unit 1551.

The gesture recognition state determining unit 1531 corresponds to the processing-state determining unit 531 in FIG. 7.

The gesture recognizing process unit 1541 recognizes a gesture according to the reported processing state. The gesture recognizing process unit 1541 receives information indicating the configuration, state, and/or movement of a predetermined site of the body (gesture) from the body state observing apparatus 201 or another apparatus (not illustrated). Body state information transmitted from the body state observing apparatus 201 may be used as a gesture.

As an example, when processing state=start, the gesture recognizing process unit 1541 recognizes the input gesture and performs a process corresponding to the result of the recognizing. When processing state=end, the input gesture is not recognized.

The gesture input to the gesture recognizing process unit 1541 is preferably one made with a body site that includes a site used to control a flag by the flag management apparatus 401.

When, for example, the flag management apparatus 401 controls a flag according to the dorsiflexion state of the right wrist, gestures made with the right hand, including a gesture made with the right wrist, are input to the gesture recognizing process unit 1541. The gesture recognizing process unit 1541 recognizes the gestures made with the right hand and performs a process corresponding to the result of the recognizing.

When, for example, the flag management apparatus 401 controls a flag according to the plantar flexion state of the right ankle, gestures made with the right foot, including a gesture made with the right ankle, are input to the gesture recognizing process unit 1541. The gesture recognizing process unit 1541 recognizes the gestures made with the right foot and performs a process corresponding to the result of the recognizing.

When, for example, the flag management apparatus 401 controls a flag according to the rolled inward state of the lips, gestures made with the head, including a gesture made with the lips, are input to the gesture recognizing process unit 1541. The gesture recognizing process unit 1541 recognizes the gestures made with the head and performs a process corresponding to the result of the recognizing.

Accordingly, the gesture recognizing process unit desirably performs a process corresponding to gestures made with a body site that includes a site used to control a flag.

As described above, in a case where a site used to control a flag is included in a site used for a controlling process based on a gesture, operations are facilitated, decreasing burdens on the user.

The gesture recognizing process unit 1541 corresponds to the processing performing unit 541 in FIG. 7.

The state change report unit 1551 corresponds to the state change report unit 551 in FIG. 7 and has functions similar to those of the state change report unit 551, and hence descriptions of the state change report unit 1551 are omitted herein.

Figure 11:
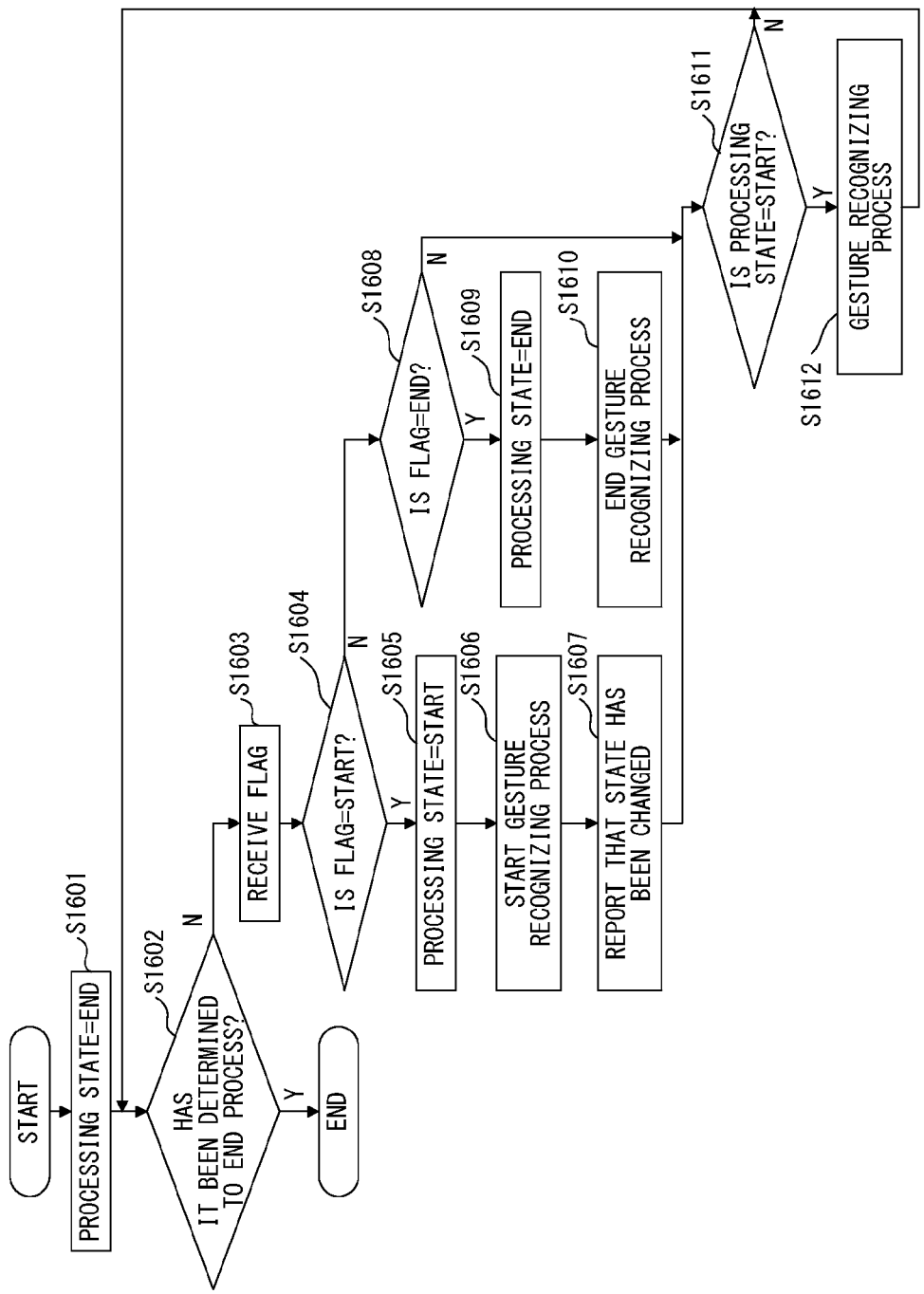
FIG. 11 is a flowchart of a flag controlling process performed by a processing apparatus of the first exemplary configuration.

FIG. 11 is a flowchart of a flag controlling process performed by the processing apparatus of the first exemplary configuration.

In step S1601, the gesture recognition state determining unit 1531 sets processing state=end as an initial state.

In step S1602, the flag management process may end; alternatively, the flow may shift to step S1603. As an example, the flag management process ends when an instruction to end the process is received from an external element or when the flag management apparatus 401 is turned off.

In step S1603, the flag receiving unit 1511 receives a flag 1522 from the flag report unit 421 and stores this flag in the storage unit 1521.

In step S1604, the gesture recognition state determining unit 1531 determines the state of the flag. When flag=start, the flow shifts to step S1605. When flag≠start, the flow shifts to step S1608.

In step S1605, the gesture recognition state determining unit 1531 sets processing state=start. The gesture recognition state determining unit 1531 reports the processing state to the gesture recognizing process unit 1541 and the state change report unit 1551.

In step S1606, the gesture recognizing process unit 1541 starts a gesture recognizing process. The gesture recognizing process unit 1541 can recognize gestures until processing state=end is satisfied.

In step S1607, the state change report unit 1551 reports to the user that gestures can be recognized. For example, the state change report unit 1551 vibrates the processing apparatus 1501 or blinks the screen of a display apparatus (not illustrated) included in or connected to the processing apparatus 1501.

In step S1608, the gesture recognition state determining unit 1531 determines the state of the flag. When flag=end, the flow shifts to step S1609. When flag≠end, the flow shifts to step S1611.

In step S1609, the gesture recognition state determining unit 1531 sets processing state=end. The gesture recognition state determining unit 1531 reports the processing state to the gesture recognizing process unit 1541. The gesture recognition state determining unit 1531 may further report the processing state to the state change report unit 1551. Receiving the report, the state change report unit 1551 reports to the user that gestures cannot be recognized.

In step S1610, the gesture recognizing process unit 1541 ends the gesture recognizing process.

In step S1611, when processing state=start, the flow shifts to step S1612, and, when processing state≠start, the flow returns to step S1602.

In step S1612, the gesture recognizing process unit 1541 performs the gesture recognizing process. That is, the gesture recognizing process unit 1541 recognizes an input gesture and performs processing in accordance with the result of the recognizing.

As described above, processing state=start is satisfied when flag=start, and flag=start is satisfied when the body is in the predetermined state (when the user's wrist is in the dorsiflexion state or the palmar flexion state, the user's ankle is in the plantar flexion state, or the user's lips are in the rolled inward state). Thus, processing state=start is satisfied when the body is in the predetermined state. Accordingly, the starting and the ending of the gesture recognizing process may be controlled in accordance with whether the user puts the body in the predetermined state (whether the user's wrist is in the dorsiflexion state or the palmar flexion state, the user's ankle is in the plantar flexion state, or the user's lips are in the rolled inward state).

In FIG. 11, the gesture recognizing process is performed only when processing state=start, i.e., only when the user puts the body in the predetermined state (when the user's wrist is in the dorsiflexion state or the palmar flexion state, the user's ankle is in the plantar flexion state, or the user's lips are in the rolled inward state). In this way, performing the gesture recognizing process only when the body is in the predetermined state may prevent unintended gestures from being recognized, thereby preventing a malfunction.

Figure 12:
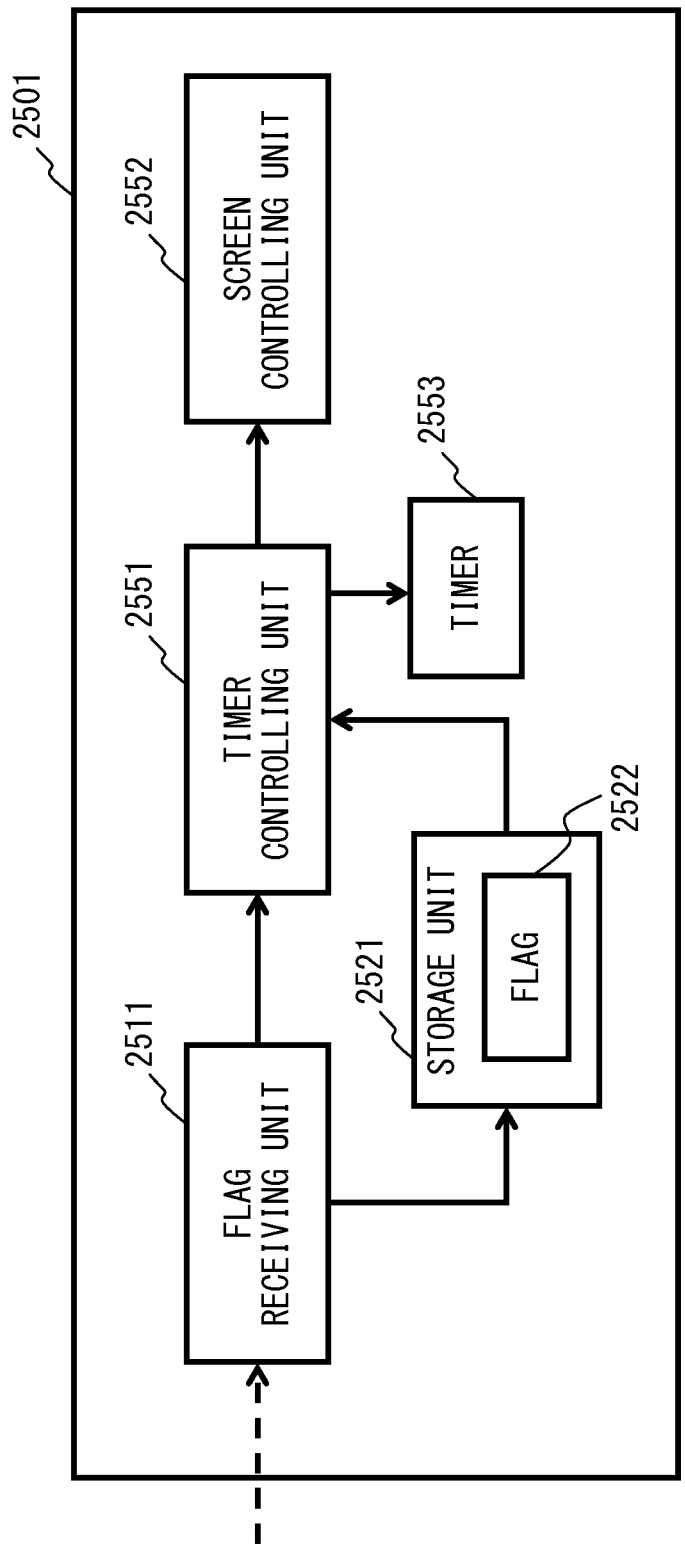
FIG. 12 illustrates a second exemplary configuration of a processing apparatus in accordance with an embodiment.

FIG. 12 depicts a second exemplary configuration of a processing apparatus in accordance with an embodiment.

FIG. 12 indicates a configuration for a situation in which the processing apparatus is an apparatus that performs a displaying controlling process corresponding to the state of a flag.

The processing apparatus 2501 includes a flag receiving unit 2511, a storage unit 2521, a timer controlling unit 2551, a screen controlling unit 2552, and a timer 2553.

The flag receiving unit 2511 receives a flag 2522 from the flag report unit 421 and stores this flag in the storage unit 2521. The flag receiving unit 2511 corresponds to the flag receiving unit 511 in FIG. 7.

The storage unit 2521 is a storage apparatus to store data. The storage unit 2521 is, for example, a Random Access Memory (RAM), a magnetic disk apparatus, or a nonvolatile memory.

The storage unit 2521 stores the flag 2522. The storage unit 2521 corresponds to the storage unit 521 in FIG. 7.

The timer controlling unit 2551 controls a timer 2553.

The screen controlling unit 2552 controls the screen of a display apparatus (not illustrated) included in or connected to the processing apparatus 2501.

The timer 2553 measures off a time that has elapsed since start of the timer.

The timer controlling unit 2551, the screen controlling unit 2552, and the timer 2553 respectively correspond to the processing-state determining unit 531, the processing performing unit 541, and the state change report unit 551 in FIG. 7.

Figure 13:
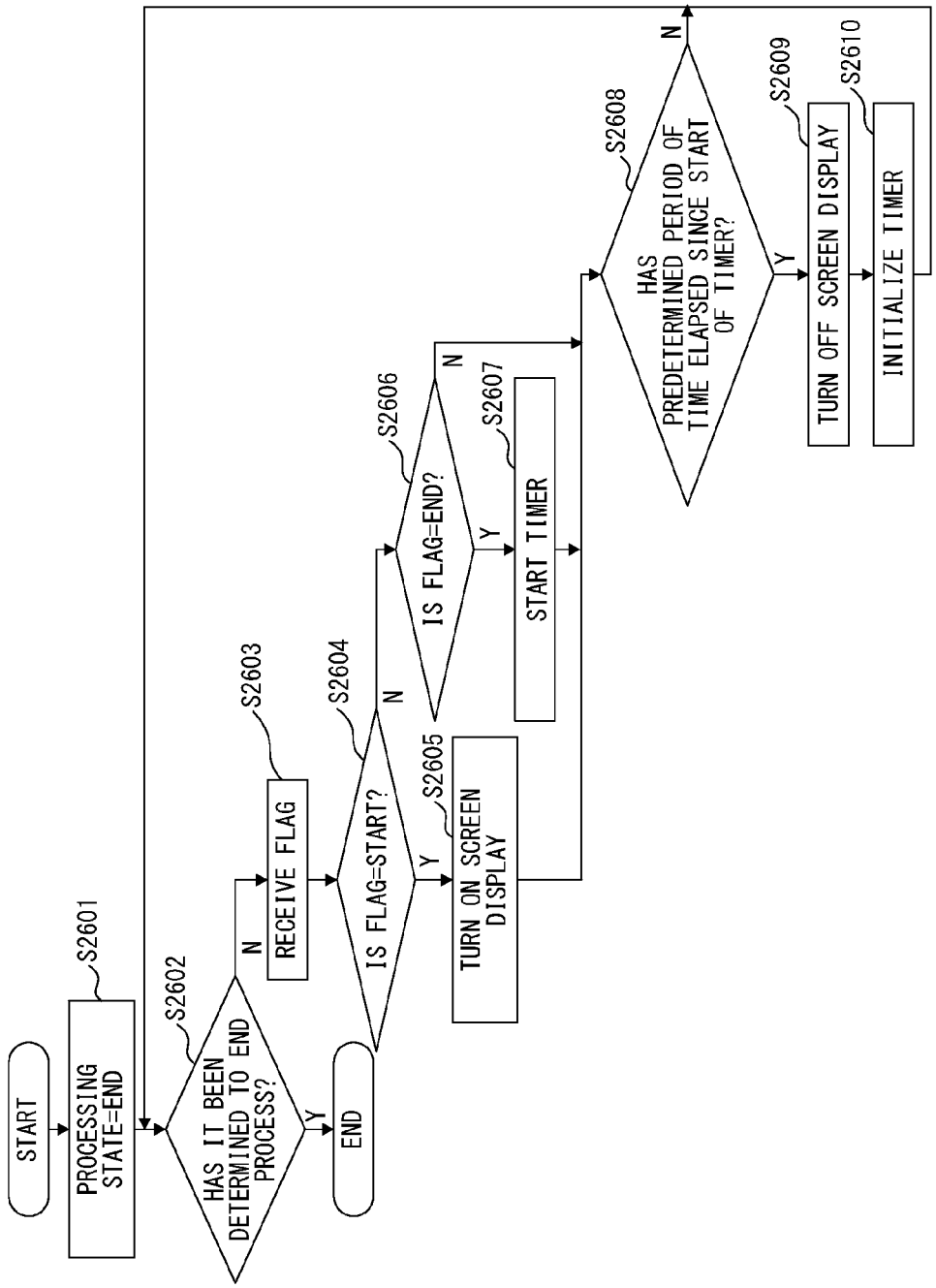
FIG. 13 is a flowchart of a flag controlling process performed by a processing apparatus of the second exemplary configuration.

FIG. 13 is a flowchart of a flag controlling process performed by a processing apparatus of the second exemplary configuration.

In the process of FIG. 13, a screen display is ON during a period from a time when a flag starts to indicate "start" to a time when a predetermined period of time has elapsed after that flag started to indicate "end".

In step S2601, the timer controlling unit 2551 sets processing state=end as an initial state.

In step S2602, the flag management process may end; alternatively, the flow may shift to step S2603. As an example, the flag management process ends when an instruction to end the process is received from an external element or when the flag management apparatus 401 is turned off.

In step S2603, the flag receiving unit 2511 receives a flag 2522 from the flag report unit 421 and stores this flag in the storage unit 2521.

In step S2604, the timer controlling unit 2551 determines the state of the flag. When flag=start, the flow shifts to step S2605. When flag≠start, the flow shifts to step S2606.

In step S2605, the screen controlling unit 2552 turns on the screen display of the display apparatus (not illustrated).

In step S2606, the timer controlling unit 2551 determines the state of the flag. When flag=end, the flow shifts to step S2607. When flag≠end, the flow shifts to step S2608.

In step S2607, the timer controlling unit 2551 starts the timer 2553.

In step S2608, the timer controlling unit 2551 determines whether a predetermined period of time has elapsed after the timer 2553 started. When the predetermined period of time has elapsed after the timer 2553 started, the flow shifts to step S2609. When the predetermined period of time has not elapsed after the timer 2553 started, the flow returns to step S2602.

In step S2609, the screen controlling unit 2552 turns off the screen display of the display apparatus (not illustrated).

In step S2610, the timer controlling unit 2551 initializes the timer 2553.

In an embodiment, the body state observing apparatus 201 observes the state of the wrist, ankle, or lips and transmits body state information to the flag determination unit 411. The flag determination unit 411 determines a flag according to the body state information.

That is, the flag determination unit 411 determines the flag according to the state of the wrist, ankle, or lips.

Thus, the user may change the state of the flag by changing the state of the wrist, ankle, or lips.

The following will describe the respective examples of the determining of a flag according to the state of the wrist, the state of the ankle, and the state of the lips.

(1-1) Use of the State of the Wrist (Dorsiflexion State)

In the case of determining a flag using the state of the wrist, a first method includes determining the flag in accordance with whether the wrist is in the dorsiflexion state.

In an embodiment, the dorsiflexion state indicates a situation in which the dorsiflexion angle of the wrist is equal to or greater than a threshold. Dorsiflexion refers to a motion to bend the wrist outward. A preset value is used as the threshold. The threshold may be a value corresponding to the flexibility of the user's wrist.

Figure 14:
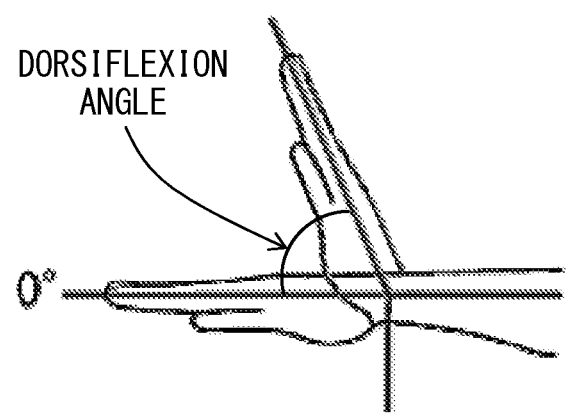
FIG. 14 illustrates a dorsiflexion angle of the wrist.

FIG. 14 illustrates the dorsiflexion angle of the wrist.

The dorsiflexion angle is an angle formed by the back of the hand with the wrist dorsiflexed relative to the back of the hand with the wrist straightened. That is, the dorsiflexion angle is 0° when the wrist is straightened.

Figure 15:
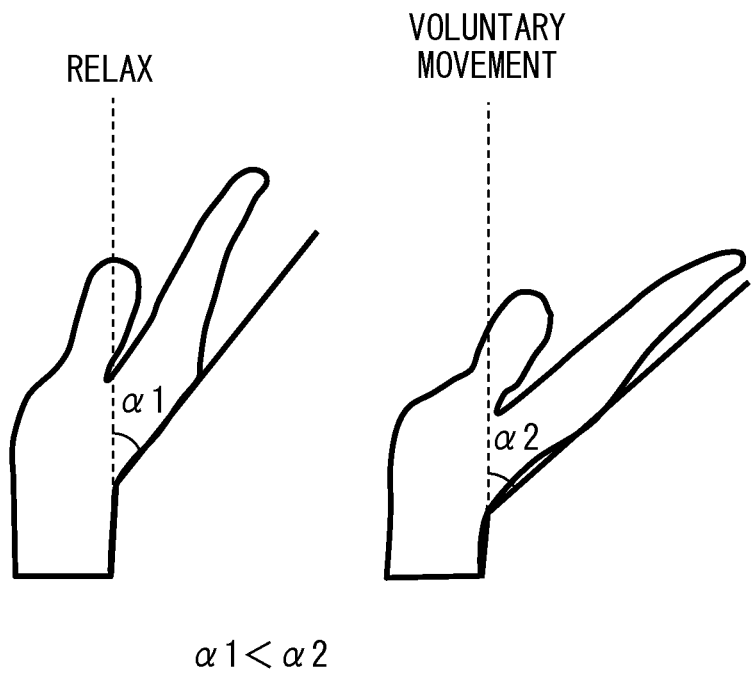
FIG. 15 illustrates the states of the wrist at the time of relaxation and the time of voluntary movement.

FIG. 15 illustrates the states of the wrist at the time of relaxation and the time of voluntary movement.

The left-hand side of FIG. 15 depicts the state of the wrist at the time of relaxation, and the right-hand side depicts the state of the wrist intentionally dorsiflexed to the limit (voluntary movement).

$\alpha 2$ is greater than $\alpha 1$, where $\alpha 1$ indicates the dorsiflexion angle formed at the time of relaxation, and $\alpha 2$ indicates the dorsiflexion angle formed at the time of voluntary movement.

FIG. 16 illustrates data indicating dorsiflexion angles at the time of relaxation and the time of voluntary movement.

Figure 17:
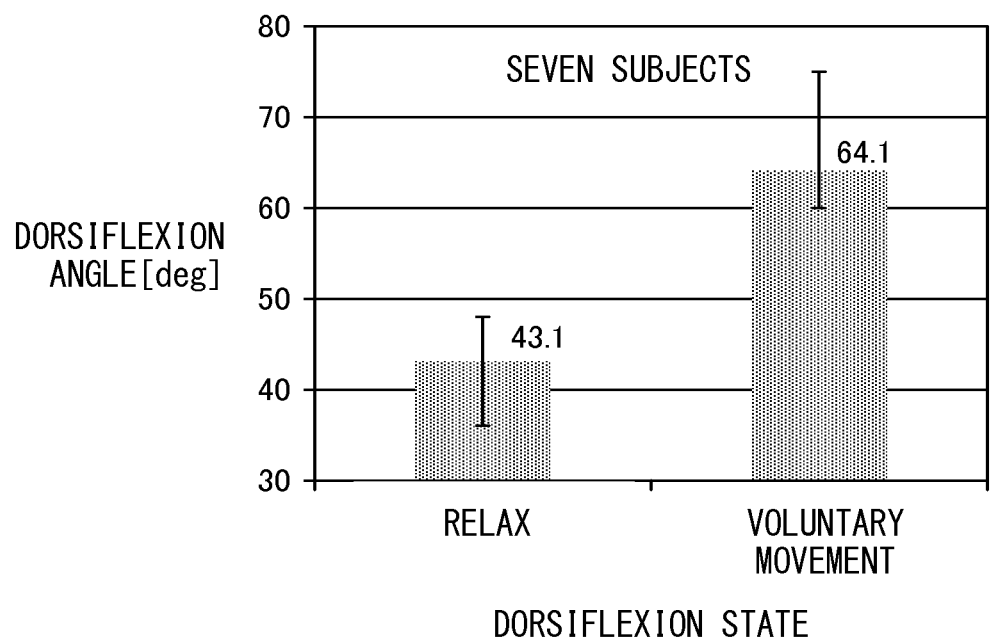
FIG. 17 is a graph indicating average dorsiflexion angles at the time of relaxation and the time of voluntary movement.

FIG. 17 is a graph indicating average dorsiflexion angles at the time of relaxation and the time of voluntary movement.

FIG. 18 is a graph indicating an average difference between a dorsiflexion angle at the time of relaxation and a dorsiflexion angle at the time of voluntary movement.

For each of the seven subjects A-G, FIG. 16 depicts the dorsiflexion angle at the time of relaxation, the dorsiflexion angle at the time of voluntary movement, and an angular difference between the dorsiflexion angle at the time of voluntary movement and the dorsiflexion angle at the time of relaxation. FIG. 16 further depicts the respective maximum values, the respective minimum values, and the respective average values of the dorsiflexion angles at the time of relaxation, the dorsiflexion angles at the time of voluntary movement, and the angular differences.

FIG. 17 depicts a graph indicating the average of the dorsiflexion angles at the time of relaxation and the average of the dorsiflexion angles at the time of voluntary movement.

FIG. 18 indicates a graph indicating the average of the angular differences.

As indicated by the data in FIG. 16, the average dorsiflexion angle at the time of relaxation is 43.1°; the average dorsiflexion angle at the time of voluntary movement, 64.1°; the average angular difference, 21.0°.

Accordingly, there are large gaps between the dorsiflexion angles at the time of relaxation and the dorsiflexion angles at the time of voluntary movement, and hence a large dorsiflexion angle may lead to the judgment that the user is intentionally dorsiflexing the wrist.

As long as the wrist is not intentionally dorsiflexed, the wrist is not put in the dorsiflexion state. Hence, the wrist is not put in the dorsiflexion state by a daily-life movement such as the lowering of the arm when the user is tired or the scratching of the body due to itching. Accordingly, control of flags unintended by the user can be prevented, i.e., unintended processes can be prevented from being performed.

Even when the wrist is in the dorsiflexion state, the arm can be freely moved so that gesture manipulations can be performed using arm movements with few limitations. The dorsiflexion-based flag control provides the advantage that the range of movement or degree of freedom of the body sites other than the wrist is not limited.

Since the dorsiflexion of the wrist is used to control flags without using a finger, the flags can be controlled while holding an object.

The following will describe a plurality of examples of methods for detecting the dorsiflexion state of the wrist.

Figure 19:
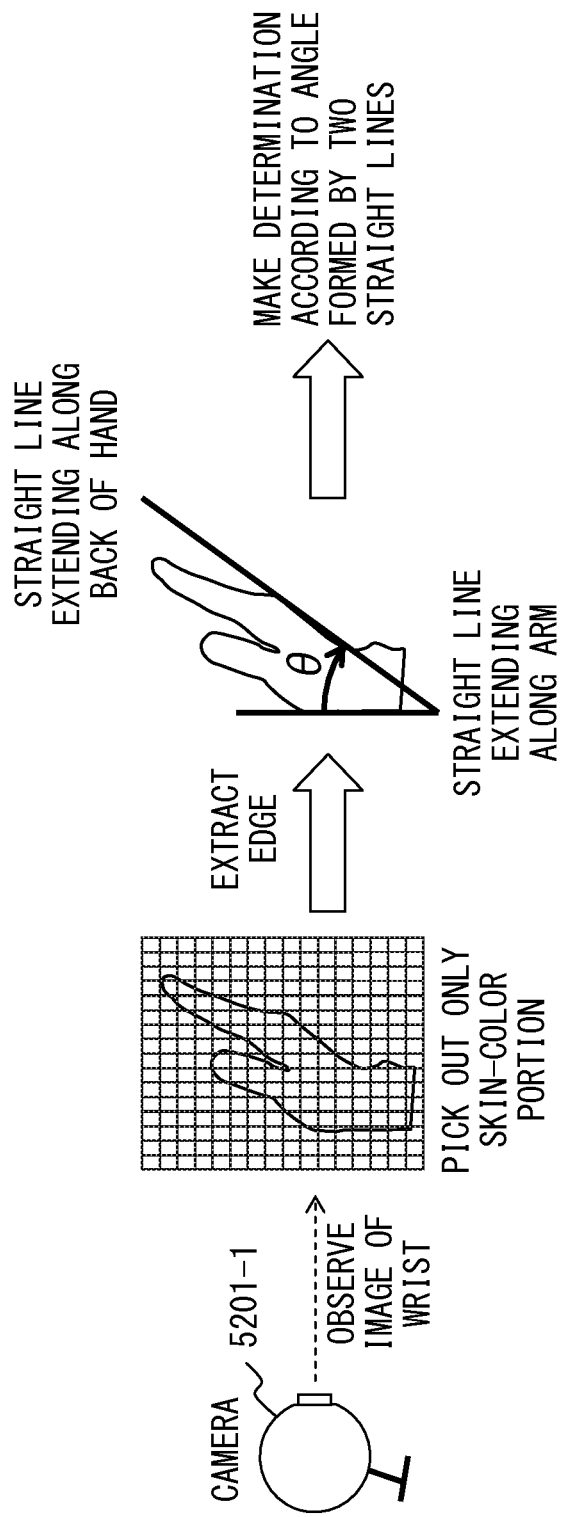
FIG. 19 illustrates a method for detecting a dorsiflexion state of the wrist (example 1)

FIG. 19 illustrates a method for detecting the dorsiflexion state of the wrist (example 1).

In FIG. 19, the dorsiflexion state is detected using a camera 5201-1. The camera 5201-1 corresponds to the body state observing apparatus 201 in FIG. 1.

The camera 5201-1 shoots and outputs an image of the hand to the flag determination unit 411 via the sensor information obtaining apparatus 301.

The flag determination unit 411 picks out only a skin-color portion of the shot image and performs an edge extracting process to extract a straight line extending along the arm and a straight line extending along the back of the hand. When the angle formed by the straight line extending along the arm and the straight line extending along the back of the hand (dorsiflexion angle) is equal to or greater than a threshold, the flag determination unit 411 determines that the wrist is in the predetermined body state (i.e., dorsiflexion state).

Figure 20:
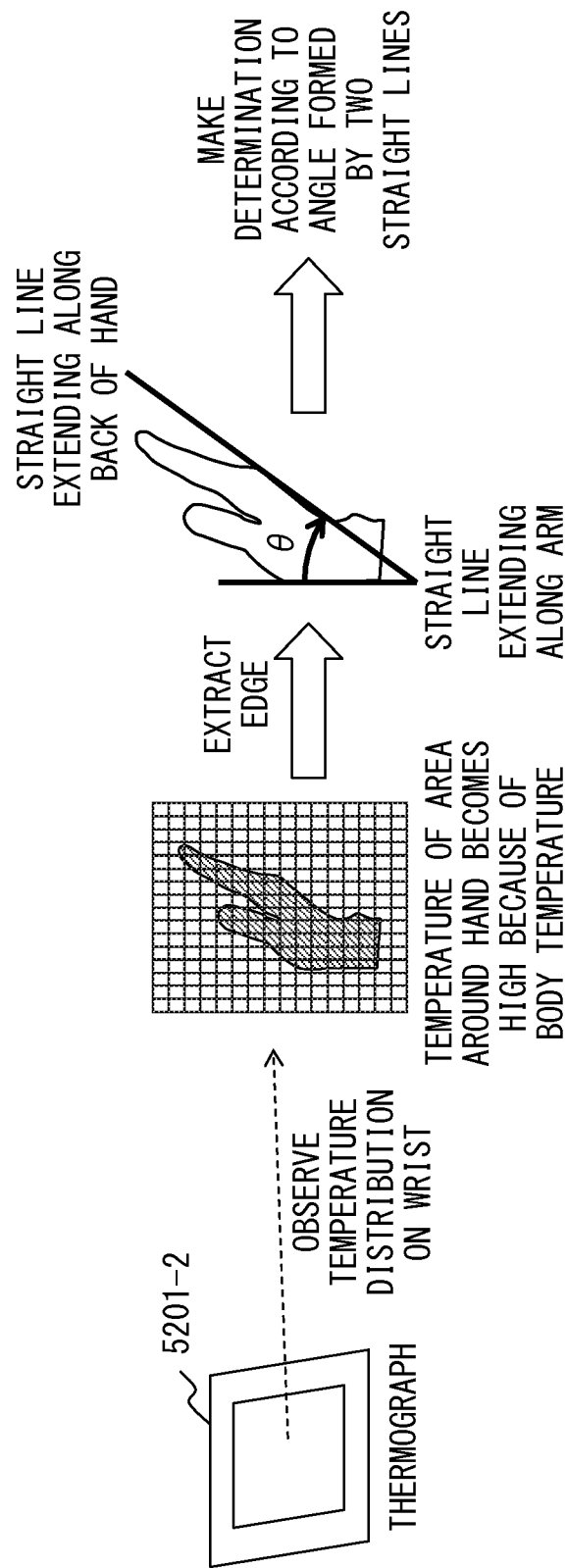
FIG. 20 illustrates a method for detecting a dorsiflexion state of the wrist (example 2)

FIG. 20 illustrates a method for detecting the dorsiflexion state of the wrist (example 2).

In FIG. 20, the dorsiflexion state is detected using a thermograph 5201-2. The thermograph 5201-2 corresponds to the body state observing apparatus 201 in FIG. 1.

The thermograph 5201-2 shoots and outputs an image of the wrist to the flag determination unit 411 via the sensor information obtaining apparatus 301.

The temperature of the hand is higher than the ambient temperature, and hence the configuration of the hand can be determined according to temperature distribution in the shot image.

The flag determination unit 411 picks out only a high-temperature portion of the shot image and performs an edge extracting process to extract a straight line extending along the arm and a straight line extending along the back of the hand. When the angle formed by the straight line extending along the arm and the straight line extending along the back of the hand (dorsiflexion angle) is equal to or greater than a threshold, the flag determination unit 411 determines that the wrist is in the predetermined body state (i.e., dorsiflexion state).

The camera 5201-1 and the thermograph 5201-2 are stationary apparatuses placed near the user. The camera 5201-1 and the thermograph 5201-2 may be wearable apparatuses attached to the head or chest of the user.

The following will describe an example wherein the dorsiflexion state is detected using a worn-on-wrist type device, i.e., a device worn on the user's wrist.

Figure 21:
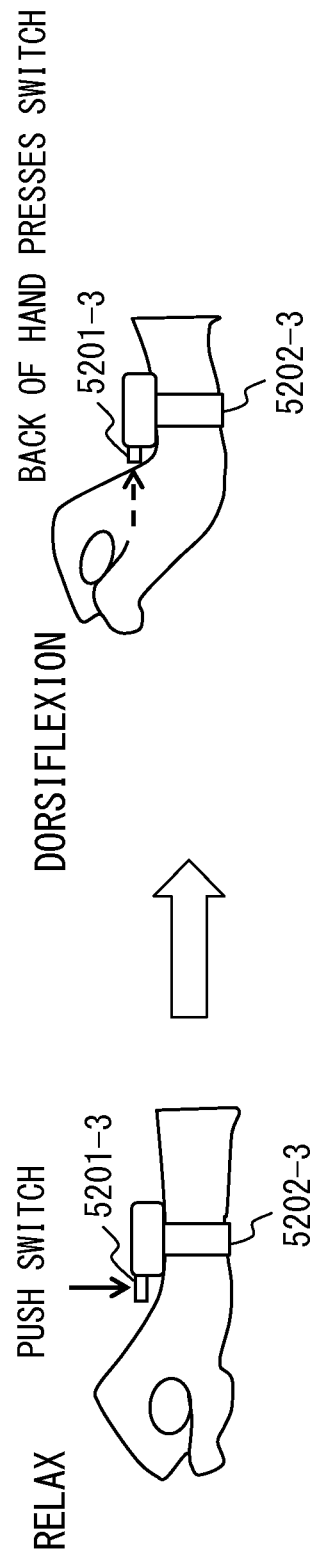
FIG. 21 illustrates a method for detecting a dorsiflexion state of the wrist (example 3)

FIG. 21 illustrates a method for detecting the dorsiflexion state of the wrist (example 3).

In FIG. 21, the dorsiflexion state is detected using a push switch 5201-3. The push switch 5201-3 is provided on a worn-on-wrist type device 5202-3 to be mounted on the wrist. The push switch 5201-3 and the worn-on-wrist type device 5202-3 correspond to the body state observing apparatus 201 in FIG. 1.

The push switch 5201-3 is attached to the outer surface of the wrist, and the button of the push switch 5201-3 faces the direction of the fingertips.

The left-hand side of FIG. 21 depicts the wrist at the time of relaxation, and the right-hand side depicts the wrist at the time of dorsiflexion.

As depicted at the left-hand side of FIG. 21, when the wrist is in a relaxed state, the button of the push switch 5201-3 is not pressed, and the push switch 5201-3 is in an off state.

As illustrated at the right-hand side of FIG. 21, when the dorsiflexion angle becomes equal to or greater than a threshold, the back of the hand presses the button of the push switch 5201-3, thereby putting the push switch 5201-3 in an on state.

The worn-on-wrist type device 5202-3 outputs the state of the push switch 5201-3 to the flag determination unit 411 via the sensor information obtaining apparatus 301.

When the push switch 5201-3 is in the on state, the flag determination unit 411 determines that the wrist is in the predetermined body state (i.e., dorsiflexion state).

Figure 22:
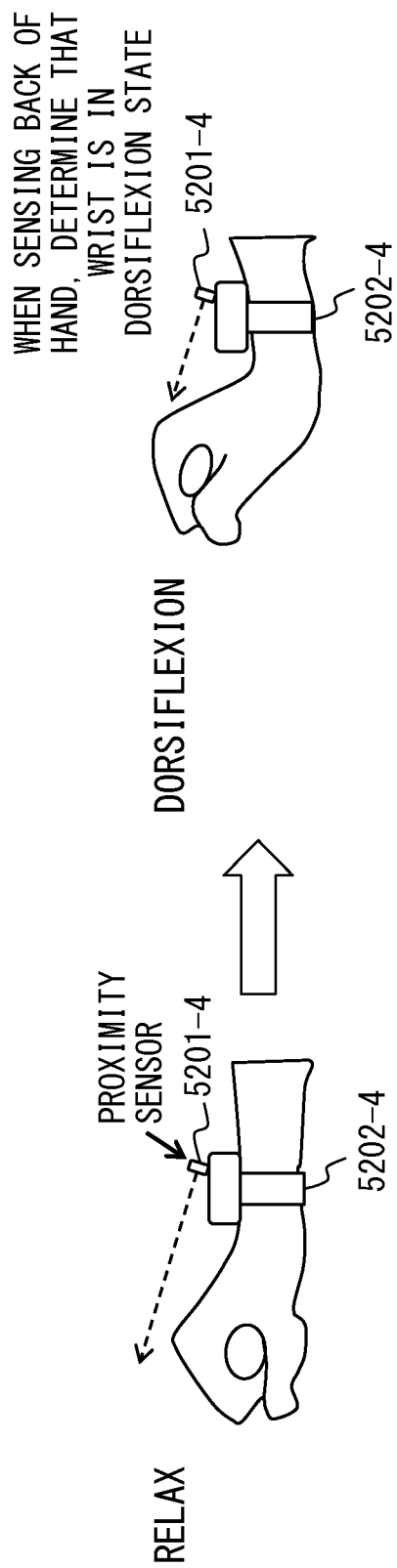
FIG. 22 illustrates a method for detecting a dorsiflexion state of the wrist (example 4)

FIG. 22 illustrates a method for detecting the dorsiflexion state of the wrist (example 4).

In FIG. 22, the dorsiflexion state is detected using a proximity sensor 5201-4. The proximity sensor 5201-4 is provided on a worn-on-wrist type device 5202-4 to be mounted on the wrist. The proximity sensor 5201-4 and the worn-on-wrist type device 5202-4 correspond to the body state observing apparatus 201 in FIG. 1.

The proximity sensor 5201-4 is attached to the outer surface of the wrist and has a detection region located slightly upward from the fingertip direction and extending from the proximity sensor 5201-4 to the base of the fingers. The proximity sensor 5201-4 detects the presence/absence of an object within the detection region.

The left-hand side of FIG. 22 depicts the wrist at the time of relaxation, and the right-hand side depicts the wrist at the time of dorsiflexion.

When the wrist is in the relaxed state, the proximity sensor 5201-4, as illustrated at the left-hand side of FIG. 22, does not detect the back of the hand, and hence a detection signal is in an off state.

When the dorsiflexion angle becomes equal to or greater than a threshold as illustrated at the right-hand side of FIG. 22, the proximity sensor 5201-4 detects the back of the hand, and hence the detection signal is in an on state.

The worn-on-wrist type device 5202-4 outputs the detection signal provided by the proximity sensor 5201-4 to the flag determination unit 411 via the sensor information obtaining apparatus 301.

When the detection signal is in the on state, the flag determination unit 411 determines that the wrist is in the predetermined body state (i.e., dorsiflexion state).

FIG. 23 illustrates a method for detecting the dorsiflexion state of the wrist (example 5).

In FIG. 23, the dorsiflexion state is detected using a range sensor 5201-5. The range sensor 5201-5 is provided on a worn-on-wrist type device 5202-5 to be mounted on the wrist. The range sensor 5201-5 and the worn-on-wrist type device 5202-5 correspond to the body state observing apparatus 201 in FIG. 1.

The range sensor 5201-5 is attached to the outer surface of the wrist and has a direction of measurement slightly upward from the fingertip direction. The range sensor 5201-5 measures the distance to an object in the direction of measurement.

The left-hand side of FIG. 23 depicts the wrist at the time of relaxation, and the right-hand side depicts the wrist at the time of dorsiflexion.

When the wrist is in the relaxed state, the range sensor 5201-5, as illustrated at the left-hand side of FIG. 23, does not detect the back of the hand, and hence a distance is not measured.

When the dorsiflexion angle becomes equal to or greater than a threshold, as illustrated at the right-hand side of FIG. 23, the range sensor 5201-5 detects the back of the hand and measures the distance from the range sensor 5201-5 to the back of the hand.

The worn-on-wrist type device 5202-5 outputs the measured distance to the flag determination unit 411 via the sensor information obtaining apparatus 301.

When the measured distance is less than or equal to a threshold, the flag determination unit 411 determines that the wrist is in the predetermined body state (i.e., dorsiflexion state).

Figure 24:
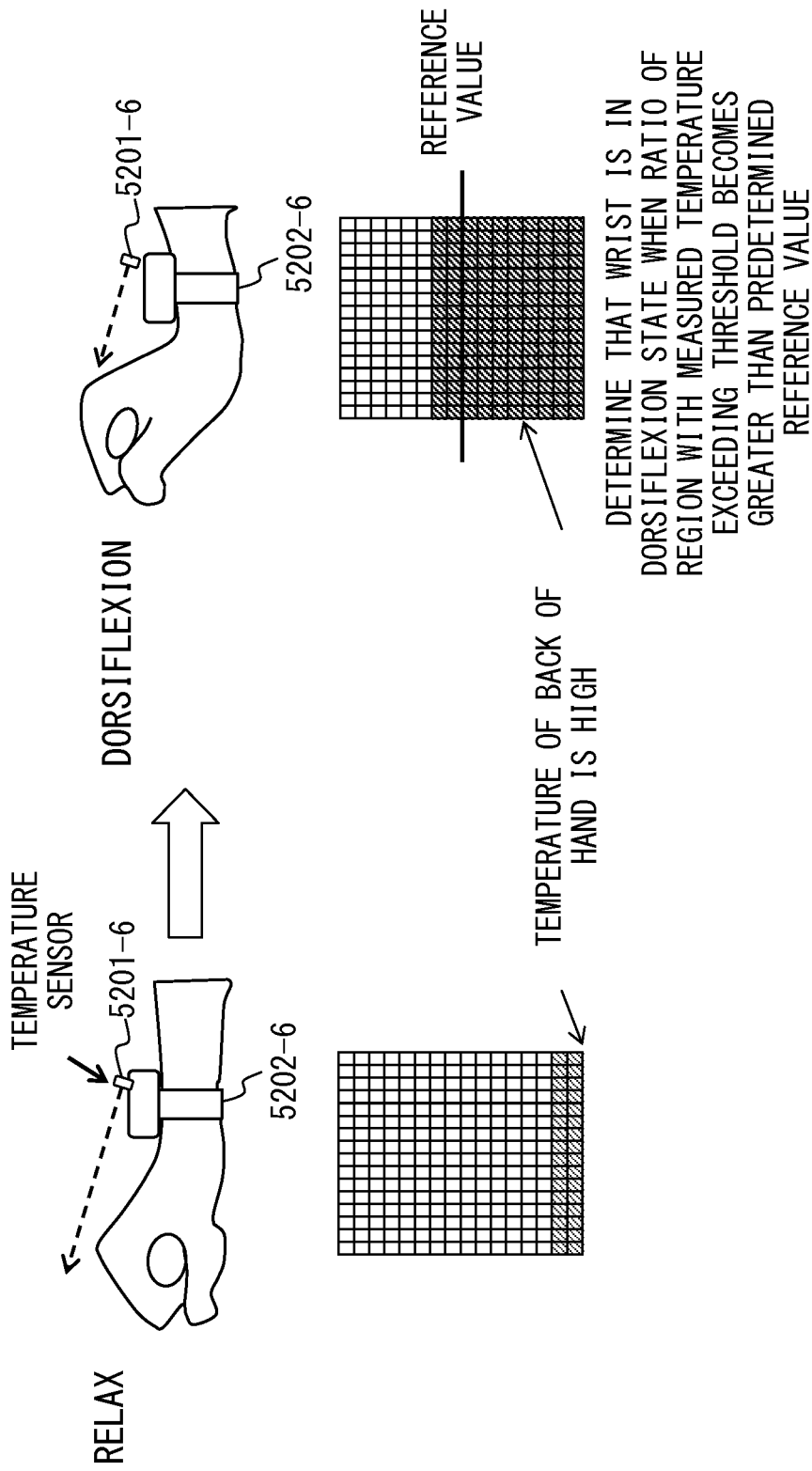
FIG. 24 illustrates a method for detecting a dorsiflexion state of the wrist (example 6)

FIG. 24 illustrates a method for detecting the dorsiflexion state of the wrist (example 6).

In FIG. 24, the dorsiflexion state is detected using a temperature sensor 5201-6. The temperature sensor 5201-6 is provided on a worn-on-wrist type device 5202-6 to be mounted on the wrist. The temperature sensor 5201-6 and the worn-on-wrist type device 5202-6 correspond to the body state observing apparatus 201 in FIG. 1.

The temperature sensor 5201-6 is attached to the outer surface of the wrist and has a measurement region slightly upward from the fingertip direction. The temperature sensor 5201-6 measures the temperature of an object within the measurement region.

The left-hand side of FIG. 24 depicts the wrist at the time of relaxation, and the right-hand side depicts the wrist at the time of dorsiflexion.

As depicted at the left-hand side of FIG. 24, the back of the hand is not present within the measurement region when the wrist is in the relaxed state, and hence the temperature data of the measurement region indicates the temperature of a space around the hand.

When the dorsiflexion angle becomes equal to or greater than a threshold as illustrated at the right-hand side of FIG. 24, the back of the hand enters the measurement region, and hence the temperature data of the measurement region indicates the temperature of the back of the hand. Making the dorsiflexion angle wider increases the portion of the back of the hand included in the measurement region.

The worn-on-wrist type device 5202-6 outputs the temperature data of the measurement region to the flag determination unit 411 via the sensor information obtaining apparatus 301.

When the temperature data indicates that the ratio of a region with a temperature exceeding a threshold is greater than a reference value, the flag determination unit 411 determines that the wrist is in the predetermined body state (i.e., dorsiflexion state). Note that the temperature of the back of the hand is higher than the temperature of the space around the hand and that the threshold is less than the temperature of the back of the hand and higher than the temperature of the space around the hand.

Figure 25:
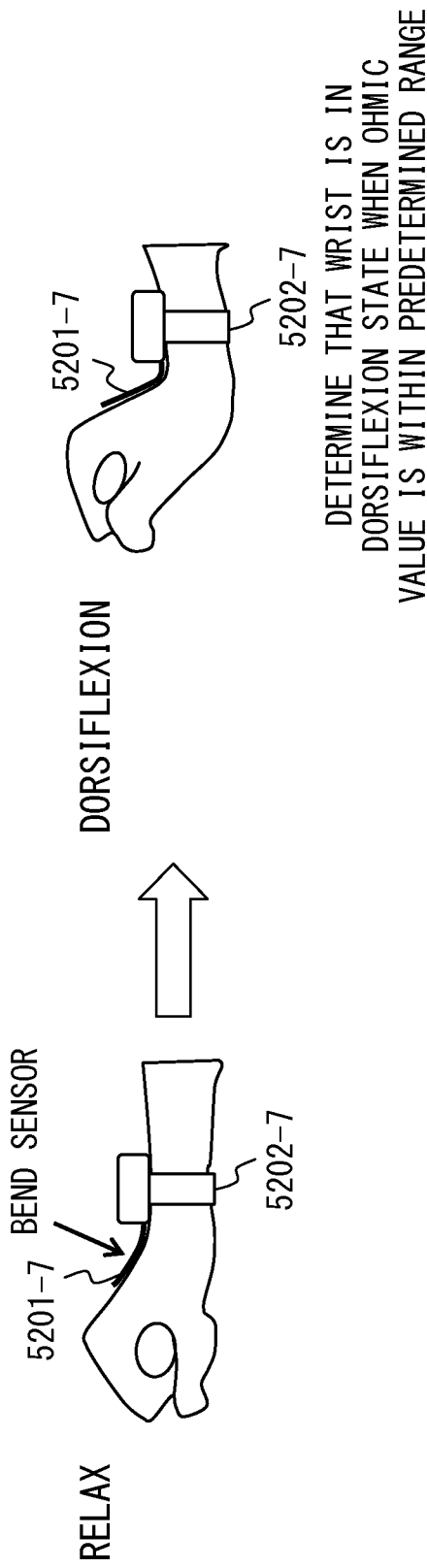
FIG. 25 illustrates a method for detecting a dorsiflexion state of the wrist (example 7)

FIG. 25 illustrates a method for detecting the dorsiflexion state of the wrist (example 7).

In FIG. 25, the dorsiflexion state is detected using a bend sensor 5201-7. The bend sensor 5201-7 is provided on a worn-on-wrist type device 5202-7 to be mounted on the wrist. The bend sensor 5201-7 and the worn-on-wrist type device 5202-7 correspond to the body state observing apparatus 201 in FIG. 1.

The bend sensor 5201-7 is attached to the outer surface of the wrist and is bent according to dorsiflexion of the wrist. The bend sensor 5201-7 indicates an ohmic value that changes with bending.

The left-hand side of FIG. 25 depicts the wrist at the time of relaxation, and the right-hand side depicts the wrist at the time of dorsiflexion.

When the wrist is in the relaxed state as depicted at the left-hand side of FIG. 25, bending of the bend sensor 5201-7 is small.

Dorsiflexing the wrist more significantly makes the bending of the bend sensor 5201-7 greater as depicted at the right-hand side of FIG. 25, thereby changing the ohmic value.

The worn-on-wrist type device 5202-7 outputs the ohmic value of the bend sensor 5201-7 to the flag determination unit 411 via the sensor information obtaining apparatus 301.

When the ohmic value is within a predetermined range, the flag determination unit 411 determines that the wrist is in the predetermined body state (i.e., dorsiflexion state). Note that the values within the predetermined range, i.e., the reference values used to determine whether the wrist is in the dorsiflexion state, are set in advance.

Figure 26:
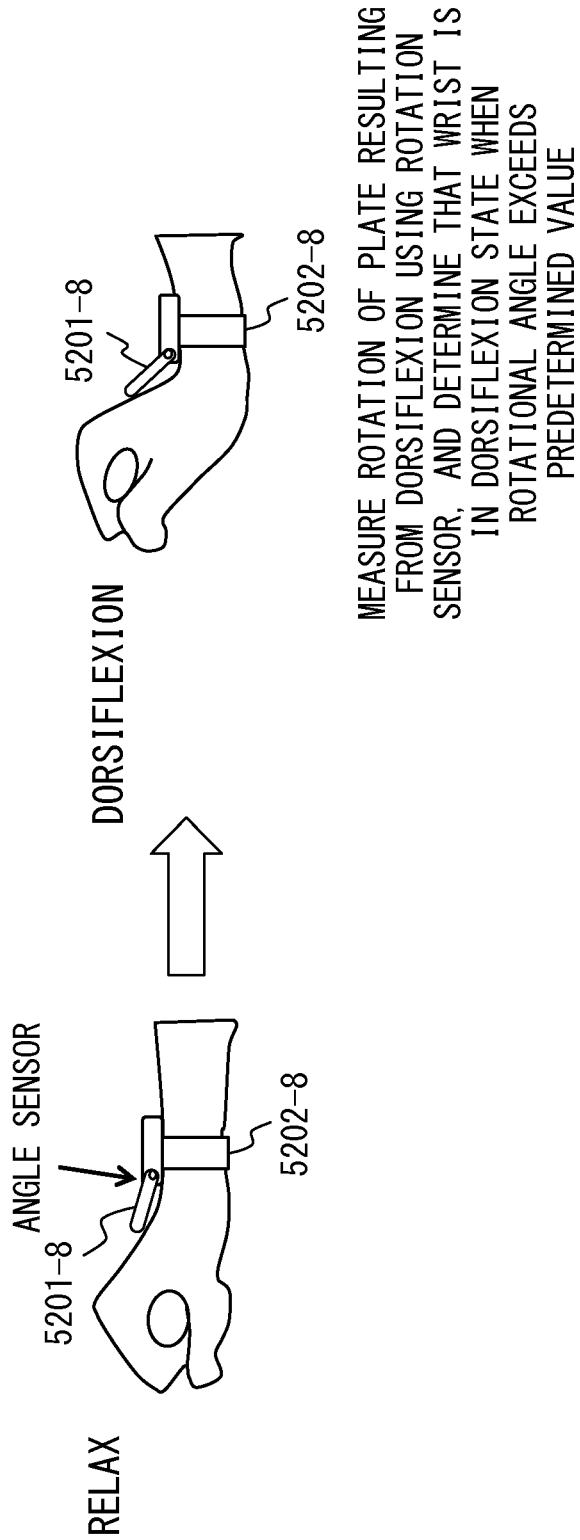
FIG. 26 illustrates a method for detecting a dorsiflexion state of the wrist (example 8)

FIG. 26 illustrates a method for detecting the dorsiflexion state of the wrist (example 8).

In FIG. 26, the dorsiflexion state is detected using an angle sensor 5201-8. The angle sensor 5201-8 is provided on a worn-on-wrist type device 5202-8 to be mounted on the wrist. The angle sensor 5201-8 and the worn-on-wrist type device 5202-8 correspond to the body state observing apparatus 201 in FIG. 1.

The angle sensor 5201-8 is attached to the outer surface of the wrist and includes a measurement plate provided along the back of the hand and used to measure an angle. The measurement plate of the angle sensor 5201-8 rotates about the wrist according to dorsiflexion of the wrist.

The angle sensor 5201-8 measures the rotational angle of the measurement plate using a rotation sensor.

The left-hand side of FIG. 26 depicts the wrist at the time of relaxation, and the right-hand side depicts the wrist at the time of dorsiflexion.

As depicted at the left-hand side of FIG. 26, when the wrist is in the relaxed state, the rotational angle of the measurement plate is small.

As depicted at the right-hand side of FIG. 26, dorsiflexing the wrist enlarges the rotational angle of the measurement plate.

The worn-on-wrist type device 5202-8 outputs the rotational angle of the measurement plate to the flag determination unit 411 via the sensor information obtaining apparatus 301.

When the rotational angle is greater than a threshold, the flag determination unit 411 determines that the wrist is in the predetermined body state (i.e., dorsiflexion state). Note that the threshold is set in advance.

Figure 27:
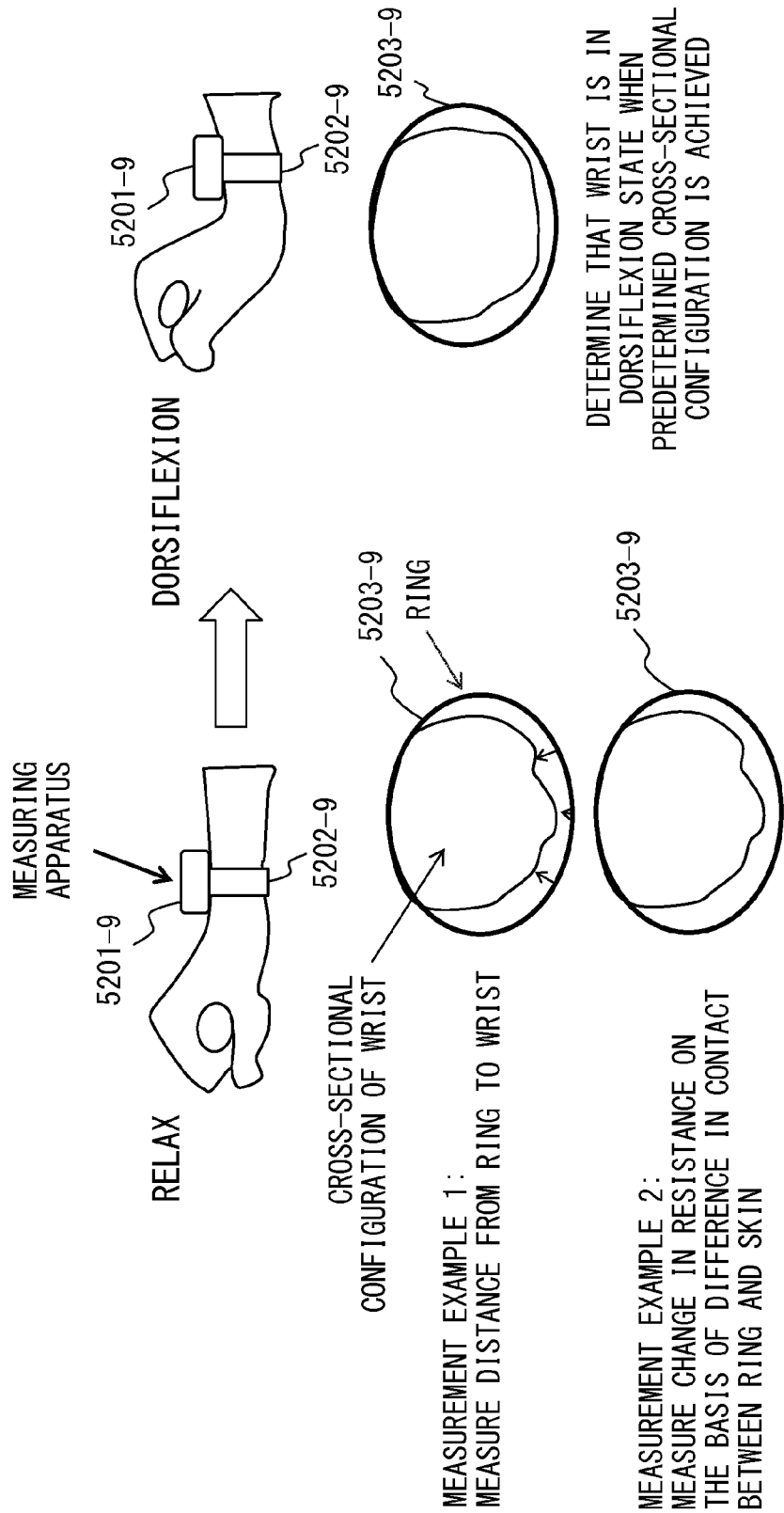
FIG. 27 illustrates a method for detecting a dorsiflexion state of the wrist (example 9)

FIG. 27 illustrates a method for detecting the dorsiflexion state of the wrist (example 9).

In FIG. 27, the dorsiflexion state is detected using a measurement apparatus 5201-9. The measurement apparatus 5201-9 is provided on a worn-on-wrist type device 5202-9 to be mounted on the wrist. The measurement apparatus 5201-9 includes a ring 5203-9 surrounding the wrist. The measurement apparatus 5201-9, the worn-on-wrist type device 5202-9, and the ring 5203-9 correspond to the body state observing apparatus 201 in FIG. 1.

The measurement apparatus 5201-9 measures the distance from the ring 5203-9 to the wrist. Alternatively, the measurement apparatus 5201-9 measures the ohmic value of the ring 5203-9.

The left-hand side of FIG. 27 depicts the wrist at the time of relaxation, and the right-hand side depicts the wrist at the time of dorsiflexion. The lower side of FIG. 27 depicts cross-sectional views of the wrist.

As depicted at the right-hand side of FIG. 27, dorsiflexing the wrist changes the configuration of the cross section of the wrist.

The worn-on-wrist type device 5202-9 outputs a distance or an ohmic value to the flag determination unit 411 via the sensor information obtaining apparatus 301.

The flag determination unit 411 determines according to the distance or the ohmic value whether the wrist is in the predetermined body state (i.e., dorsiflexion state). The ohmic values or range of distance judged to correspond to the predetermined body state (i.e., dorsiflexion state) is set in advance.

FIG. 28 illustrates a method for detecting the dorsiflexion state of the wrist (example 10).

In FIG. 28, the dorsiflexion state is detected using a measurement microphone 5201-10 and a speaker 5202-10. The measurement microphone 5201-10 and the speaker 5202-10 are provided on a worn-on-wrist type device 5203-10 to be mounted on the wrist.

The speaker 5202-10 outputs sounds. The measurement microphone 5201-10 measures sounds transmitted through the wrist.

Alternatively, the measurement microphone 5201-10 measures body-conducted sounds (*speaker sounds).

The left-hand side of FIG. 28 depicts the wrist at the time of relaxation, and the right-hand side depicts the wrist at the time of dorsiflexion. The lower side of FIG. 28 depicts graphs indicating a body-conducted sound.

The worn-on-wrist type device 5202-10 outputs data indicating a measured sound to the flag determination unit 411 via the sensor information obtaining apparatus 301.

The flag determination unit 411 determines according to the data indicating a measured sound whether the wrist is in the predetermined body state (i.e., dorsiflexion state).

Dorsiflexing the wrist changes the configuration of the wrist, thereby changing a sound transmitted from the speaker thorough the wrist. The flag determination unit 411 determines the dorsiflexion state in accordance with a characteristic of a sound transmitted through the wrist.

Dorsiflexing the wrist generates a body-conducted sound corresponding to the dorsiflexing movement. The flag determination unit 411 detects the body-conducted sound resulting from the dorsiflexing movement and determines the dorsiflexion state.

The detecting of the dorsiflexion state using a body-conducted sound does not require the speaker 5202-10.

Figure 29:
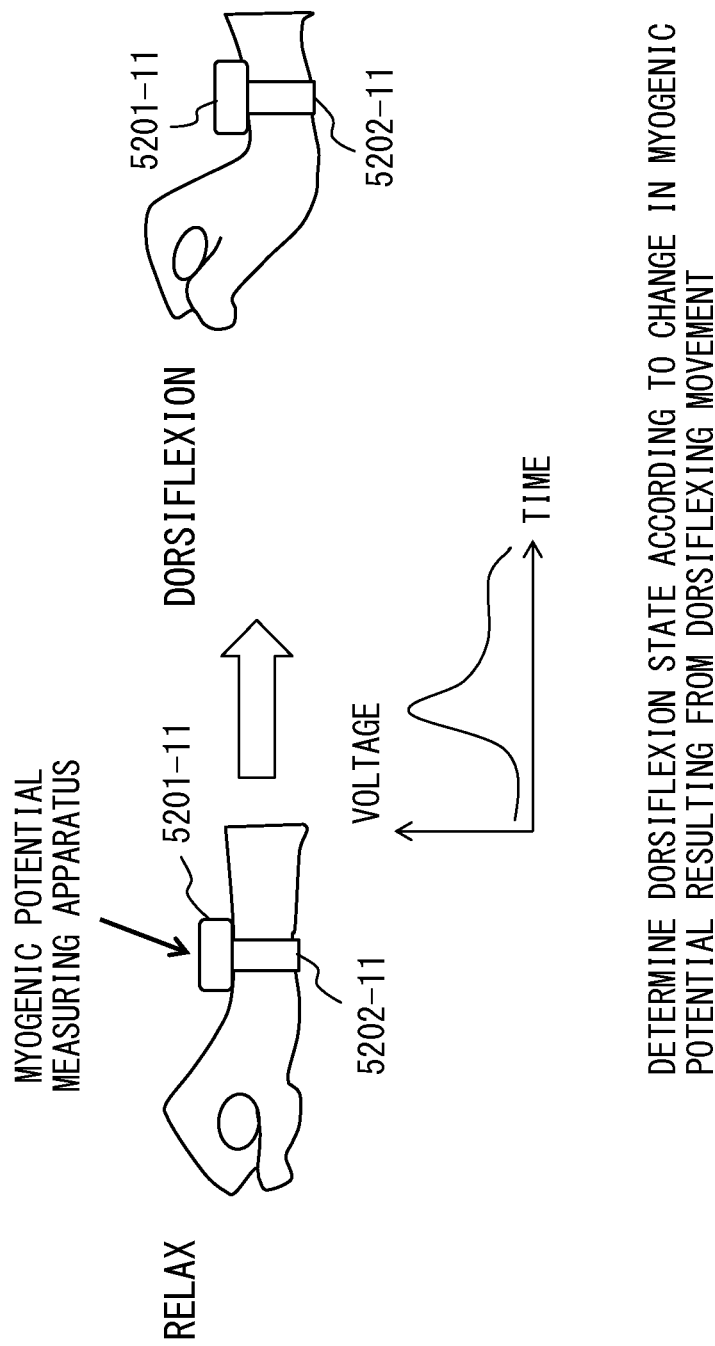
FIG. 29 illustrates a method for detecting a dorsiflexion state of the wrist (example 11)

FIG. 29 illustrates a method for detecting the dorsiflexion state of the wrist (example 11).

In FIG. 29, the dorsiflexion state is detected using a myogenic potential measuring apparatus 5201-11. The myogenic potential measuring apparatus 5201-11 is provided on a worn-on-wrist type device 5202-11 to be mounted on the wrist. The myogenic potential measuring apparatus 5201-11 and the worn-on-wrist type device 5202-11 correspond to the body state observing apparatus 201 in FIG. 1.

The myogenic potential measuring apparatus 5201-11 measures the myogenic potential of the muscles around the wrist.

The left-hand side of FIG. 29 depicts the wrist at the time of relaxation, and the right-hand side depicts the wrist at the time of dorsiflexion. The lower side of FIG. 29 depicts a graph indicating a myogenic potential. The graph indicates a situation in which the state of the wrist changes from the relaxed state to the dorsiflexion state.

As the graph indicates, changing the state of the wrist from the relaxed state to the dorsiflexion state changes the myogenic potential.

The worn-on-wrist type device 5202-11 outputs the measured myogenic potential to the flag determination unit 411 via the sensor information obtaining apparatus 301.

The flag determination unit 411 determines according to a change in the myogenic potential whether the wrist is in the predetermined body state (i.e., dorsiflexion state).

Figure 30:
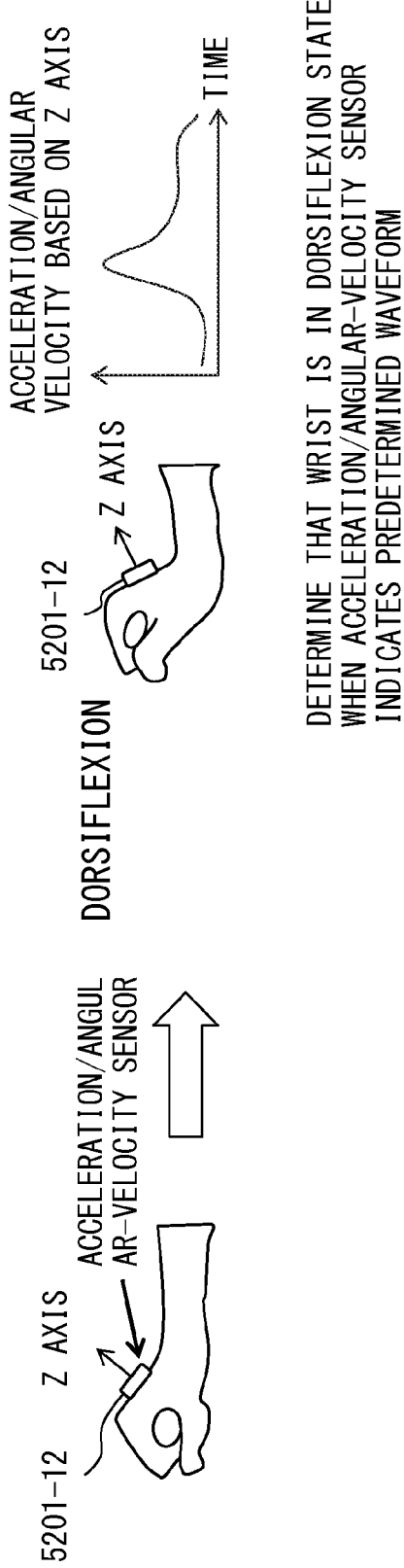
FIG. 30 illustrates a method for detecting a dorsiflexion state of the wrist (example 12)

FIG. 30 illustrates a method for detecting the dorsiflexion state of the wrist (example 12).

In FIG. 30, the dorsiflexion state is detected using an acceleration/angular-velocity sensor 5201-12. The acceleration/angular-velocity sensor 5201-12 is provided on the back of the hand. The acceleration/angular-velocity sensor 5201-12 corresponds to the body state observing apparatus 201 in FIG. 1.

Let a direction perpendicular to the back of the hand be a Z axis.

The acceleration/angular-velocity sensor 5201-12 measures an acceleration or angular velocity with reference to the Z axis.

The left-hand side of FIG. 30 depicts the wrist at the time of relaxation, and the center depicts the wrist at the time of dorsiflexion. The right-hand side of FIG. 30 depicts a graph indicating an acceleration or angular velocity with reference to the Z axis.

As the graph indicates, changing the state of the wrist from the relaxed state to the dorsiflexion state changes the acceleration or angular velocity with reference to the Z axis.

The acceleration/angular-velocity sensor 5201-12 outputs the acceleration or angular velocity determined with reference to the Z axis to the flag determination unit 411 via the sensor information obtaining apparatus 301.

According to a change in the acceleration or angular velocity determined with reference to the Z axis, the flag determination unit 411 determines whether the wrist is in the predetermined body state (i.e., dorsiflexion state). When the acceleration or angular velocity determined with reference to the Z axis indicates a predetermined waveform, the flag determination unit 411 determines that the wrist is in the predetermined body state (i.e., dorsiflexion state).

FIG. 31 illustrates a method for detecting the dorsiflexion state of the wrist (example 13).

In FIG. 31, the dorsiflexion state is detected using an inclination sensor/geomagnetism sensor 5201-13. The inclination sensor/geomagnetism sensor 5201-13 is provided on the back of the hand. The inclination sensor/geomagnetism sensor 5201-13 corresponds to the body state observing apparatus 201 in FIG. 1.

Let a direction perpendicular to the back of the hand be a Z axis.

The inclination sensor/geomagnetism sensor 5201-13 measures an inclination of the Z axis relative to the direction of gravitational force or an inclination of the Z axis relative to the direction of geomagnetism.

The left-hand side of FIG. 31 depicts the wrist at the time of relaxation, and the center depicts the wrist at the time of dorsiflexion. The right-hand side of FIG. 31 depicts a graph indicating the inclination of the Z axis.

As the graph indicates, changing the state of the wrist from the relaxed state to the dorsiflexion state changes the inclination of the Z axis.

The inclination sensor/geomagnetism sensor 5201-13 outputs the inclination of the Z axis to the flag determination unit 411 via the sensor information obtaining apparatus 301.

The flag determination unit 411 determines according to the inclination of the Z axis whether the wrist is in the predetermined body state (i.e., dorsiflexion state). When the waveform of the inclination of the Z axis indicates a predetermined waveform, the flag determination unit 411 determines that the wrist is in the predetermined body state (i.e., dorsiflexion state).

Figure 32:
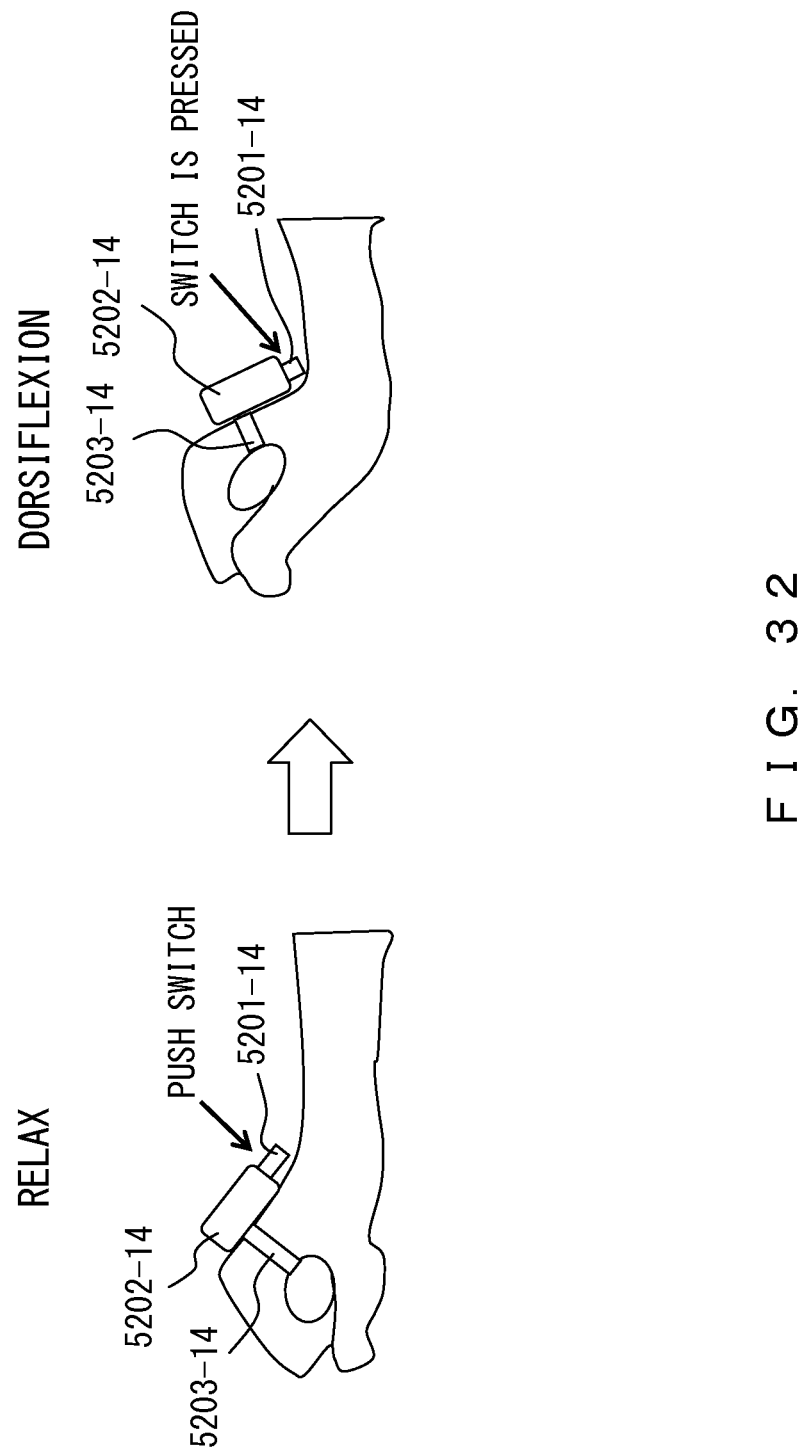
FIG. 32 illustrates a method for detecting a dorsiflexion state of the wrist (example 14)

FIG. 32 illustrates a method for detecting the dorsiflexion state of the wrist (example 14).

In FIG. 32, the dorsiflexion state is detected using a push switch 5201-14. The push switch 5201-14 is provided on a wearable device 5202-14 to be worn on the back of the hand. A belt 5203-14 is wrapped around the hand to mount the wearable device 5201-14 on the back of the hand. The push switch 5201-14, the wearable device 5202-14, and the belt 5203-14 correspond to the body state observing apparatus 201 in FIG. 1.

The push switch 5201-14 is attached to the back of the hand, and a button of the push switch 5201-14 faces the direction of the wrist.

The left-hand side of FIG. 32 depicts the wrist at the time of relaxation, and the right-hand side depicts the wrist at the time of dorsiflexion.

As depicted at the left-hand side of FIG. 32, when the wrist is in a relaxed state, the button of the push switch 5201-14 is not pressed, and the push switch 5201-14 is in an off state.

As illustrated at the right-hand side of FIG. 32, when the dorsiflexion angle becomes equal to or greater than a threshold, the wrist presses the button of the push switch 5201-14, thereby putting the push switch 5201-14 in an on state.

The wearable device 5202-14 outputs the state of the push switch 5201-14 to the flag determination unit 411 via the sensor information obtaining apparatus 301.

When the push switch 5201-14 is in the on state, the flag determination unit 411 determines that the wrist is in the predetermined body state (i.e., dorsiflexion state).

Figure 33:
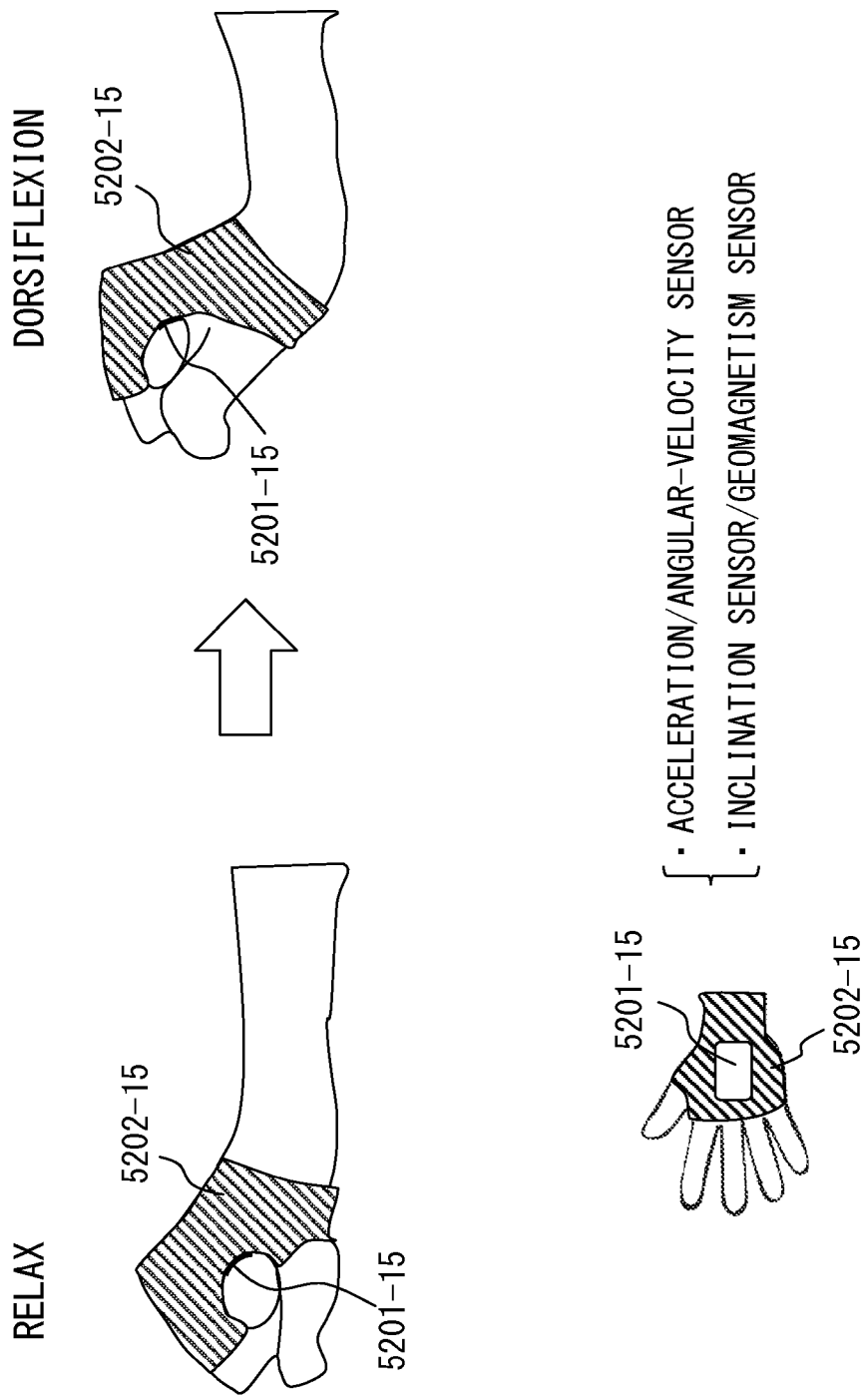
FIG. 33 illustrates a method for detecting a dorsiflexion state of the wrist (example 15)

FIG. 33 illustrates a method for detecting the dorsiflexion state of the wrist (example 15).

In FIG. 33, the dorsiflexion state is detected using a sensor 5201-15. The sensor 5201-15 is attached to a palm side of a glove 5202-15. The sensor 5201-15 and the glove 5202-15 correspond to the body state observing apparatus 201 in FIG. 1. In FIG. 33, the user wears the glove 5202-15 on the hand.

The lower portion of FIG. 33 depicts the glove 5202-15 as seen from the palm side.

As illustrated in the lower portion of FIG. 33, the sensor 5201-15 is attached to the palm side of the glove 5202-15.

The upper-left portion of FIG. 33 depicts the wrist at the time of relaxation, and the upper-right portion depicts the wrist at the time of dorsiflexion.

The sensor 5201-15 is an acceleration/angular-velocity sensor or an inclination sensor/geomagnetism sensor.

When the sensor 5201-15 is an acceleration/angular-velocity sensor, the dorsiflexion state is detected using a method similar to the one described with reference to FIG. 30.

When the sensor 5201-15 is an inclination sensor/geomagnetism sensor, the dorsiflexion state is detected using a method similar to the one described with reference to FIG. 31.

Figure 34A:
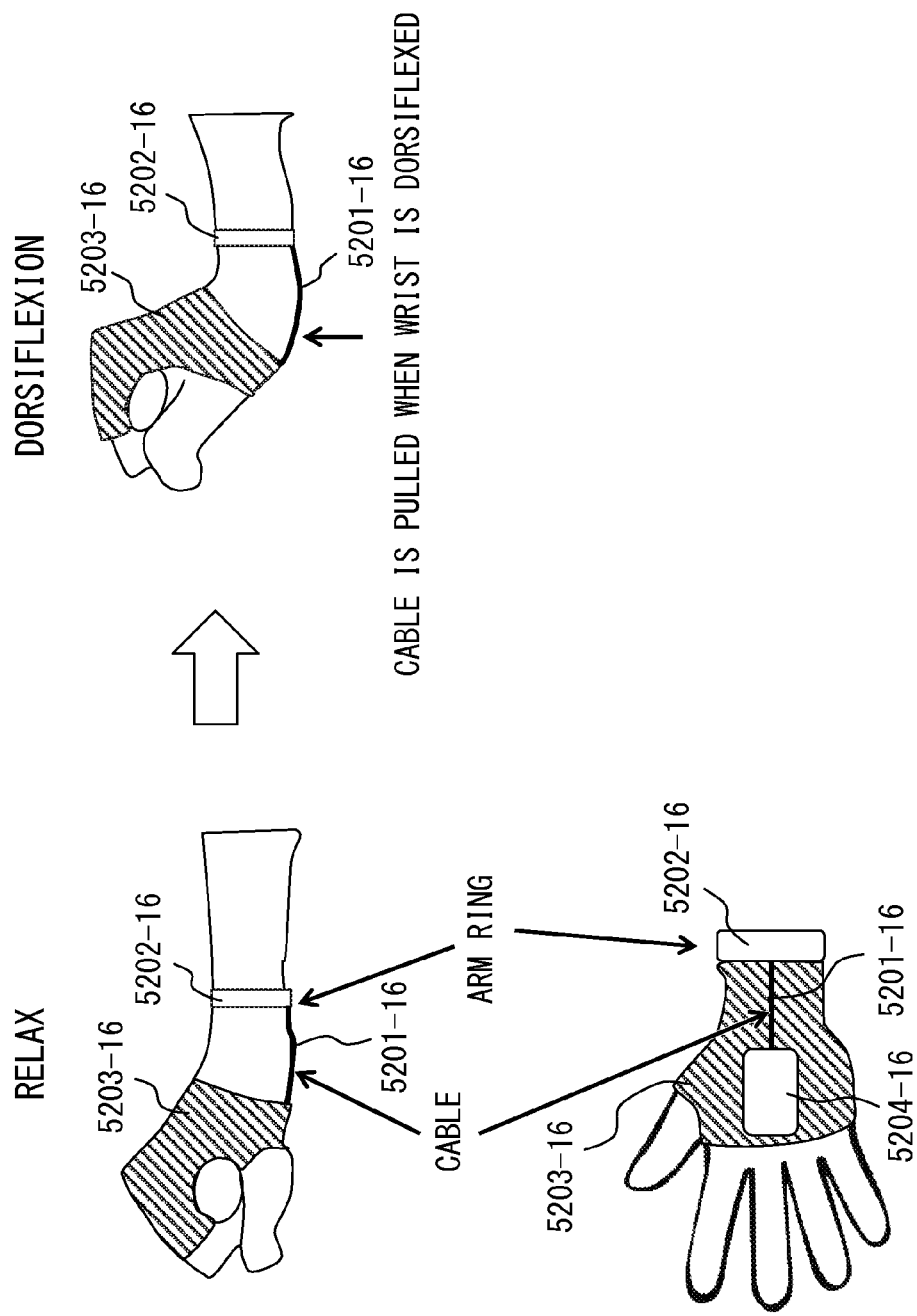
FIG. 34A illustrates a method for detecting a dorsiflexion state of the wrist (example 16)

FIG. 34A illustrates a method for detecting the dorsiflexion state of the wrist (example 16).

In FIG. 34A, the dorsiflexion state is detected using a cable 5201-16. One end of the cable 5201-16 is connected to an arm ring 5202-16 worn on the wrist, and another end is connected to a palm unit 5204-16 provided on a palm portion of a glove 5203-16. The user wears the glove 5203-16.

The cable 5201-16, the arm ring 5202-16, the glove 5203-16, and the palm unit 5204-16 correspond to the body state observing apparatus 201 in FIG. 1.

The lower portion of FIG. 34A depicts the glove 5203-16 as seen from the palm side.

As depicted in the lower portion of FIG. 34A, one end of the cable 5201-16 is connected to the palm side of the arm ring 5202-16, and another side is connected to the palm unit 5204-16.

The upper-left portion of FIG. 34A depicts the wrist at the time of relaxation, and the upper-right portion depicts the wrist at the time of dorsiflexion.

As depicted at the right-hand side of FIG. 34A, dorsiflexing the wrist pulls the cable 5201-16.

The dorsiflexion state is detected using the palm unit 5204-16 or the arm ring 5202-16, both of which will be described hereinafter.

Figure 34B:
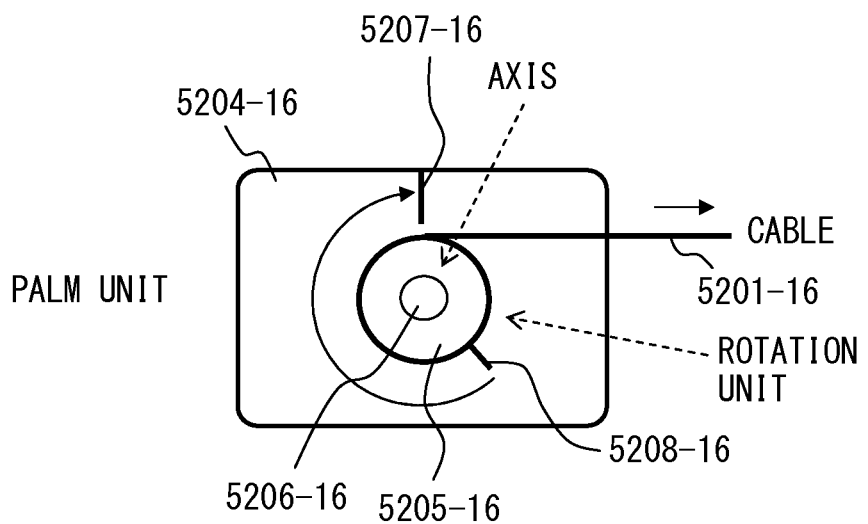
FIG. 34B is a configuration diagram of a palm unit.

FIG. 34B is a configuration diagram of a palm unit.

FIG. 34B depicts the internal configuration of the palm unit 5204-16.

The palm unit 5204-16 includes a rotation unit 5205-16. The cable 5201-16 is connected to the rotation unit 5205-16. Pulling the cable 5201-16 causes the rotation unit 5205-16 to rotate on an axis 5206-16. A terminal 5207-16 is connected to the palm unit 5204-16, and a terminal 5208-16 is connected to the rotation unit 5205-16. The rotation of the rotation unit 5205-16 caused by the pulling of the cable 5201-16 causes the terminal 5208-16 to rotate, with the result that the terminal 5208-16 comes into contact with the terminal 5207-16.

A microcomputer (not illustrated) of the palm unit 5204-16 detects that the terminal 5207-16 has come into contact with the terminal 5208-16, and puts a detection signal in an on state. The microcomputer of the palm unit 5204-16 outputs the detection signal to the flag determination unit 411 via the sensor information obtaining apparatus 301.

When the detection signal is in the on state, the flag determination unit 411 determines that the wrist is in the predetermined body state (i.e., dorsiflexion state).

In the case of the palm unit 5204-16 having a structure as illustrated in FIG. 34B, one end of the cable 5201-16 is simply fastened to the arm ring 5202-16.

Figure 34C:
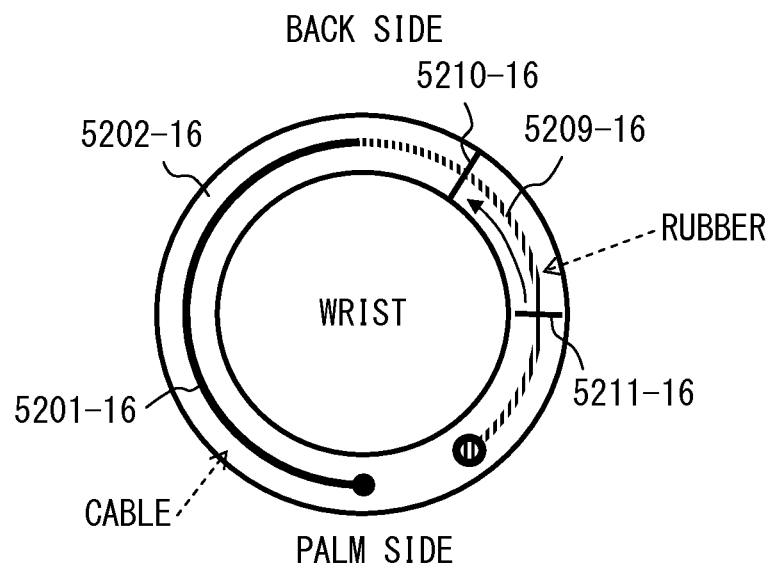
FIG. 34C is a cross-sectional view of an arm ring.

FIG. 34C is a cross-sectional view of an arm ring.

Referring to FIG. 34C, the arm ring 5202-16 includes an elastic rubber cord 5209-16. One end of the rubber cord 5209-16 is connected to the arm ring 5202-16, and another end is connected to the cable 5201-16. A terminal 5210-16 is attached to the arm ring 5202-16, and a terminal 5211-16 is attached to the rubber cord 5209-16. The cable 5201-16 pulls and extends the rubber cord 5209-16. Extending the rubber cord 5209-16 moves the terminal 5211-16, with the result that the terminal 5211-16 comes into contact with the terminal 5210-16.

A microcomputer (not illustrated) of the arm ring 5202-16 detects that the terminal 5210-16 has come into contact with the terminal 5211-16, and puts a detection signal in an on state. The microcomputer of the arm ring 5202-16 outputs the detection signal to the flag determination unit 411 via the sensor information obtaining apparatus 301.

When the detection signal is in the on state, the flag determination unit 411 determines that the wrist is in the predetermined body state (i.e., dorsiflexion state).

In the case of the arm ring 5202-16 having a structure as illustrated in FIG. 34C, one end of the cable 5201-16 is simply fastened to the palm unit 5204-16.

Figure 35:
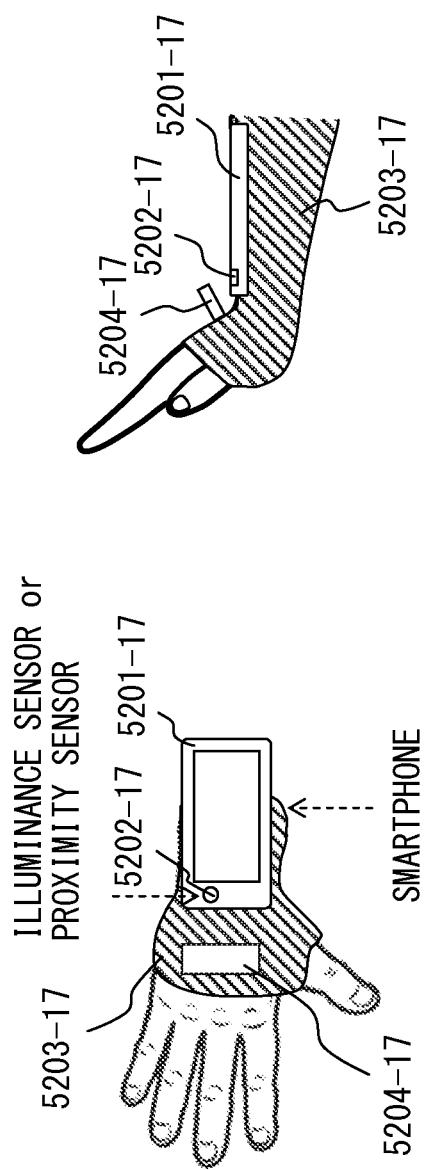
FIG. 35 illustrates a method for detecting a dorsiflexion state of the wrist (example 17)

FIG. 35 illustrates a method for detecting the dorsiflexion state of the wrist (example 17).

In FIG. 35, the dorsiflexion state is detected using a sensor 5202-17 mounted on a smartphone 5201-17. The smartphone 5201-17 is attached to a glove 5203-17, and the user wears the glove 5203-17. The smartphone 5201-17 and the glove 5203-17 correspond to the body state observing apparatus 201 in FIG. 1.

The left-hand side of FIG. 35 depicts the wrist at the time of relaxation, and the right-hand side depicts the wrist at the time of dorsiflexion.

The sensor 5202-17 is an illuminance sensor or a proximity sensor. A projection 5204-17 is provided on the back side of the glove 5203-17.

As depicted at the right-hand side of FIG. 35, dorsiflexing the wrist causes the projection 5204-17 to approach the sensor 5202-17, with the result that the projection 5204-17 is held over the sensor 5202-17.

In the case of the sensor 5202-17 that is an illuminance sensor, when the dorsiflexion angle becomes equal to or greater than a threshold, the projection 5204-17 is held over the sensor 5202-17. This decreases the illuminance measured by the sensor 5202-17, thereby putting a detection signal in the on state.

In the case of the sensor 5202-17 that is a proximity sensor, when the dorsiflexion angle becomes equal to or greater than the threshold, the projection 5204-17 approaches the sensor 5202-17, and hence, the sensor 5202-17 detects the projection 5204-17 and thus puts the detection signal in the on state.

The smartphone 5201-17 outputs the detection signal to the flag determination unit 411 via the sensor information obtaining apparatus 301.

When the detection signal is in the on state, the flag determination unit 411 determines that the wrist is in the predetermined body state (i.e., dorsiflexion state).

Figure 36:
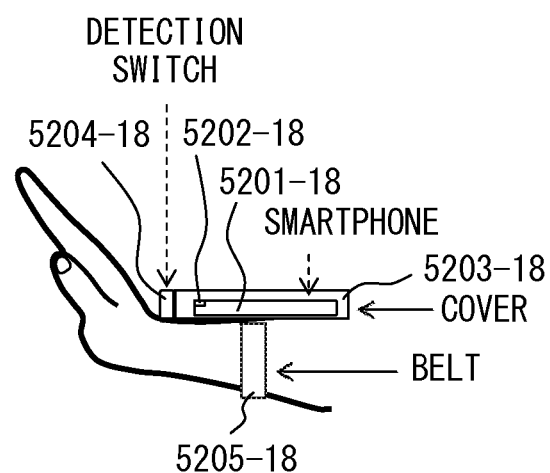
FIG. 36 illustrates a method for detecting a dorsiflexion state of the wrist (example 18)

FIG. 36 illustrates a method for detecting the dorsiflexion state of the wrist (example 18).

In FIG. 36, the dorsiflexion state is detected using a sensor 5202-18 mounted on a smartphone 5201-18 and a detection switch 5204-18 provided on a cover 5203-18 of the smartphone 5201-18.

The cover 5203-18 covers the smartphone 5201-18 equipped with the sensor. A belt 5205-18 fastens the cover 5203-18 to the arm.

The smartphone 5201-18, the cover 5203-18, and the belt 5205-18 correspond to the body state observing apparatus 201 in FIG. 1.

The sensor 5202-18 is an illuminance sensor or a proximity sensor.

The detection switch 5204-18 is provided on the cover 5203-18. Dorsiflexing the wrist causes the back of the hand to press the detection switch 5204-18.

In the case of the sensor 5202-18 that is an illuminance sensor, when the dorsiflexion angle becomes equal to or greater than a threshold, the detection switch 5204-18 is pressed and approaches the sensor 5202-18. Hence, the amount of light incident on the sensor 5202-17 decreases. This decreases the illuminance measured by the sensor 5202-18, thereby putting a detection signal in the on state.

In the case of the sensor 5202-18 that is a proximity sensor, when the dorsiflexion angle becomes equal to or greater than the threshold, the detection switch 5204-18 is pressed and approaches the sensor 5202-18, and hence, the sensor 5202-18 detects the detection switch 5204-18 and thus puts the detection signal in the on state.

The smartphone 5201-18 outputs the detection signal to the flag determination unit 411 via the sensor information obtaining apparatus 301.

When the detection signal is in the on state, the flag determination unit 411 determines that the wrist is in the predetermined body state (i.e., dorsiflexion state).

(1-2) Use of the State of the Wrist (Palmar Flexion State)

In a case where a flag is determined using the state of the wrist, a second method includes determining the flag in accordance with whether the wrist is in the palmar flexion state.

In an embodiment, the palmar flexion state indicates a situation in which the palmar flexion angle of the wrist is equal to or greater than a threshold. Palmar flexion refers to a motion to bend the wrist inward. A preset value is used as the threshold. The threshold may be a value corresponding to the flexibility of the user's wrist.

Figure 37:
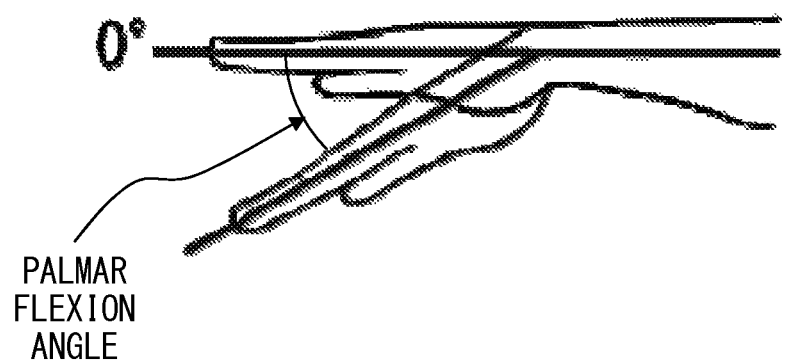
FIG. 37 illustrates a palmar flexion angle of the wrist.

FIG. 37 illustrates a palmar flexion angle of the wrist.

The palmar flexion angle is an angle formed by the back of the hand with the wrist in the palmar flexion state relative to the back of the hand with the wrist straightened. That is, the palmar flexion angle is 0° when the wrist is straightened.

Accordingly, there are large gaps between the palmar flexion angles at the time of relaxation and the palmar flexion angles at the time of voluntary movement, and hence a large palmar flexion angle may lead to the judgment that the user is intentionally putting the wrist in the palmar flexion state.

As long as the wrist is not intentionally put in the palmar flexion state, the wrist is not put in the palmar flexion state. Hence, the wrist is not put in the palmar flexion state by a daily-life movement such as the lowering of the arm when the user is tired or the scratching of the body due to itching. Accordingly, control of flags unintended by the user can be prevented, i.e., unintended processes can be prevented from being performed.

Even when the wrist is in the palmar flexion state, the arm can be freely moved so that gesture manipulations can be performed using arm movement with few limitations.

The palmar-flexion-based flag control provides the advantage that the range of movement or degree of freedom of the body sites other than the wrist is not limited.

Since the palmar flexion of the wrist is used to control flags without using a finger, the flags can be controlled while holding an object.

As in the case of the methods for detecting the dorsiflexion state described above with reference to FIGS. 19-33, a camera, a push switch, various switches, or the like may be used to determine whether the wrist is in the palmar flexion state.

The following will describe the use of the state of the ankle for a flag.

(2) Use of the State of the Ankle

In the case of determining a flag using the state of the ankle, the flag is determined in accordance with whether the ankle is in the plantar flexion state.

In an embodiment, the plantar flexion state indicates a situation in which the plantar flexion angle of the ankle is equal to or greater than a threshold. Plantar flexion refers to a motion to bend the ankle outward. In other words, plantar flexion indicates a motion to align the foot (=site from ankle to tip) and the lower leg (=shin) in a straight line. A preset value is used as the threshold. The threshold may be a value corresponding to the flexibility of the user's ankle.

FIG. 38 illustrates the plantar flexion angle of the ankle.

The plantar flexion angle is the angle formed by the line from the ankle to the lower leg and the line from the ankle to the tip of the toe with 90° subtracted from this angle. That is, the plantar flexion angle is 0° when a right angle is formed by the line from the ankle to the lower leg and the line from the ankle to the tiptoe.

FIG. 39 illustrates the states of the ankle at the time of relaxation and the time of voluntary movement.

The upper side in FIG. 39 depicts the state of the ankle at the time of relaxation, and the lower side depicts the state of the ankle intentionally put into the plantar flexion state up to the limit (voluntary movement).

At the time of relaxation, an average plantar flexion angle is 14°, and, at the time of voluntary movement, an average plantar flexion angle is 38°.

Accordingly, there are large gaps between the plantar flexion angles at the time of relaxation and the plantar flexion angles at the time of voluntary movement, and hence a large plantar flexion angle may lead to the judgment that the user is intentionally putting the ankle in the plantar flexion state.

As long as the ankle is not intentionally put in the plantar flexion state, the ankle is not put in the plantar flexion state. Hence, the ankle is not put in the plantar flexion state by a daily-life movement. Accordingly, control of flags unintended by the user can be prevented, i.e., unintended processes can be prevented from being performed.

Even when the ankle is in the plantar flexion state, the foot can be freely moved so that gesture manipulations can be performed using foot movements with few limitations. The plantar-flexion-based flag control provides the advantage that the range of movement or degree of freedom of body sites other than the ankle is not limited.

Figure 40:
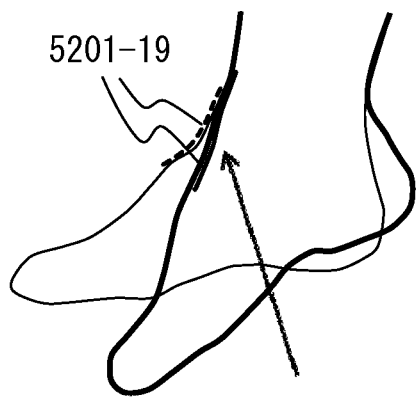
FIG. 40 illustrates a method for detecting a plantar flexion state of the ankle.

FIG. 40 illustrates a method for detecting the plantar flexion state of the ankle.

In FIG. 40, the dorsiflexion state is detected using a bend sensor 5201-19. The bend sensor 5201-19 corresponds to the body state observing apparatus 201 in FIG. 1.

The bend sensor 5201-19 is attached to the instep side of the ankle and indicates an ohmic value that changes according to plantar flexion of the ankle.

The bend sensor 5201-19 outputs the ohmic value to the flag determination unit 411 via the sensor information obtaining apparatus 301.

The flag determination unit 411 estimates a plantar flexion angle from the ohmic value. When the estimated plantar flexion angle is equal to or greater than a threshold, the flag determination unit 411 determines that the ankle is in the predetermined body state (i.e., the plantar flexion state).

The method for detecting the plantar flexion state is not limited to those described above. As in the case of the method for detecting the dorsiflexion state described above, the plantar flexion state may be detected using any method, e.g., a method that uses a camera, temperature sensor, or range sensor.

The following will describe the use of the state of the lips for a flag.

(3) Use of the State of the Lips

In the case of determining a flag using the state of the lips, the flag is determined in accordance with whether the lips are in the rolled inward state.

In an embodiment, the rolled inward state indicates a situation in which the upper lip and the lower lip are rolled into the mouth, i.e., the lips are not seen (or are almost invisible) from outside.

Figure 41:
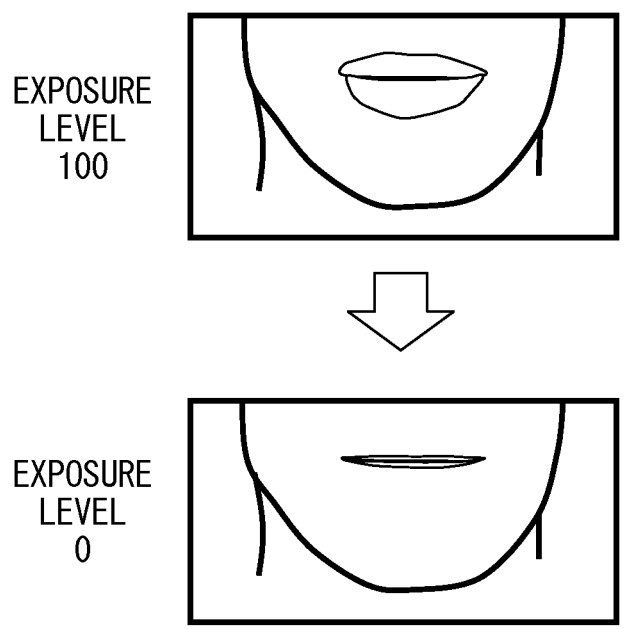
FIG. 41 illustrates a rolled inward state of the lips.

FIG. 41 illustrates the rolled inward state of the lips.

The upper side in FIG. 41 depicts the state of the lips at the time of relaxation, and the lower side depicts the lips intentionally rolled into the mouth.

In an embodiment, an exposure level is calculated according to the ratio of the area of the lips to an image. When the exposure level is equal to or less than a threshold, it is determined that the lips are in the rolled inward state.

The exposure level of the lips at the time of relaxation at the upper side in FIG. 41 is 100. The exposure level of the lips intentionally put in the rolled inward state at the lower side in FIG. 41 is 0.

As long as the lips are not intentionally rolled, the lips are not put in the rolled inward state. Hence, the lips are not put in the rolled inward state by a daily-life movement. Accordingly, control of flags unintended by the user can be prevented, i.e., unintended processes can be prevented from being performed.

Even when the lips are in the rolled inward state, the head can be freely moved so that gesture manipulations can be performed using head movements with few limitations. The lip-based flag control provides the advantage that the range of movement or degree of freedom of the body sites other than the lips is not limited.

Figure 42:
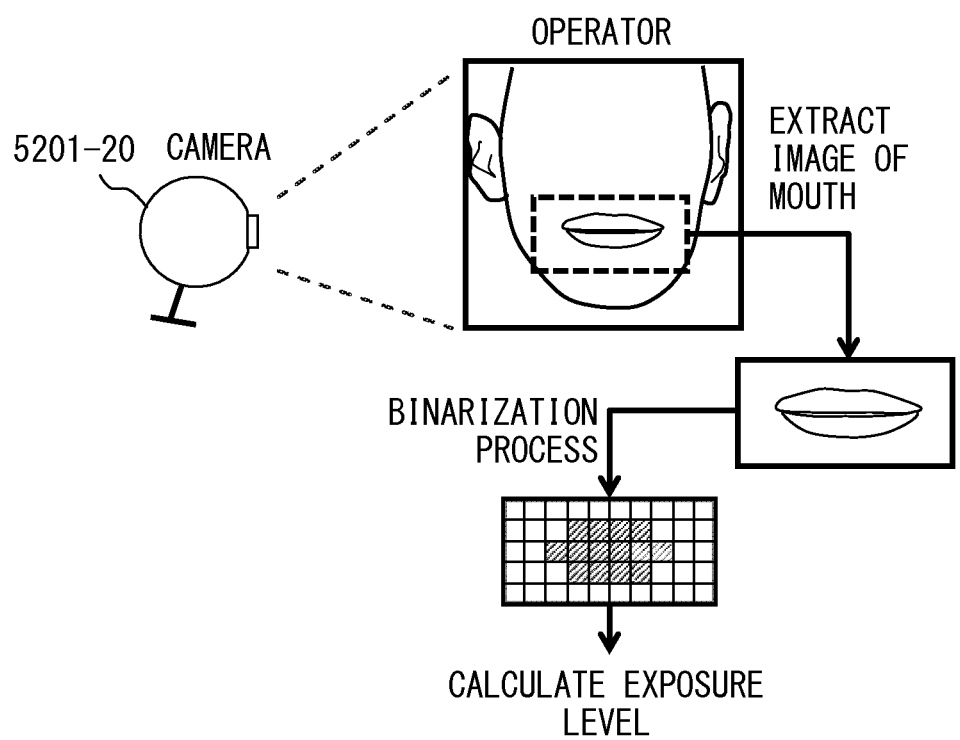
FIG. 42 illustrates a method for detecting a rolled inward state of the lips.

FIG. 42 illustrates a method for detecting the rolled inward state of the lips.

In FIG. 42, the rolled inward state is detected using a camera 5201-20. The camera 5201-20 corresponds to the body state observing apparatus 201 in FIG. 1.

The camera 5201-20 shoots an image of the user's (operator's) face and outputs the shot image (face image) to the flag determination unit 411 via the sensor information obtaining apparatus 301.

The flag determination unit 411 extracts an image of the mouth from the face image and performs a binarization process on the extracted image using a predetermined reference value. A black and white binary image is obtained as a result of the binarization process. Black pixels indicate the lips.

The flag determination unit 411 calculates the ratio of the black pixels within the binary image, and refers to a database (DB) so as to calculate an exposure level corresponding to the calculated ratio. The database stores exposure levels each corresponding to a ratio. The flag management apparatus 401 includes the database.

When the calculated exposure level is equal to or less than a threshold, the flag determination unit 411 determines that the lips are in the rolled inward state.

Figure 43:
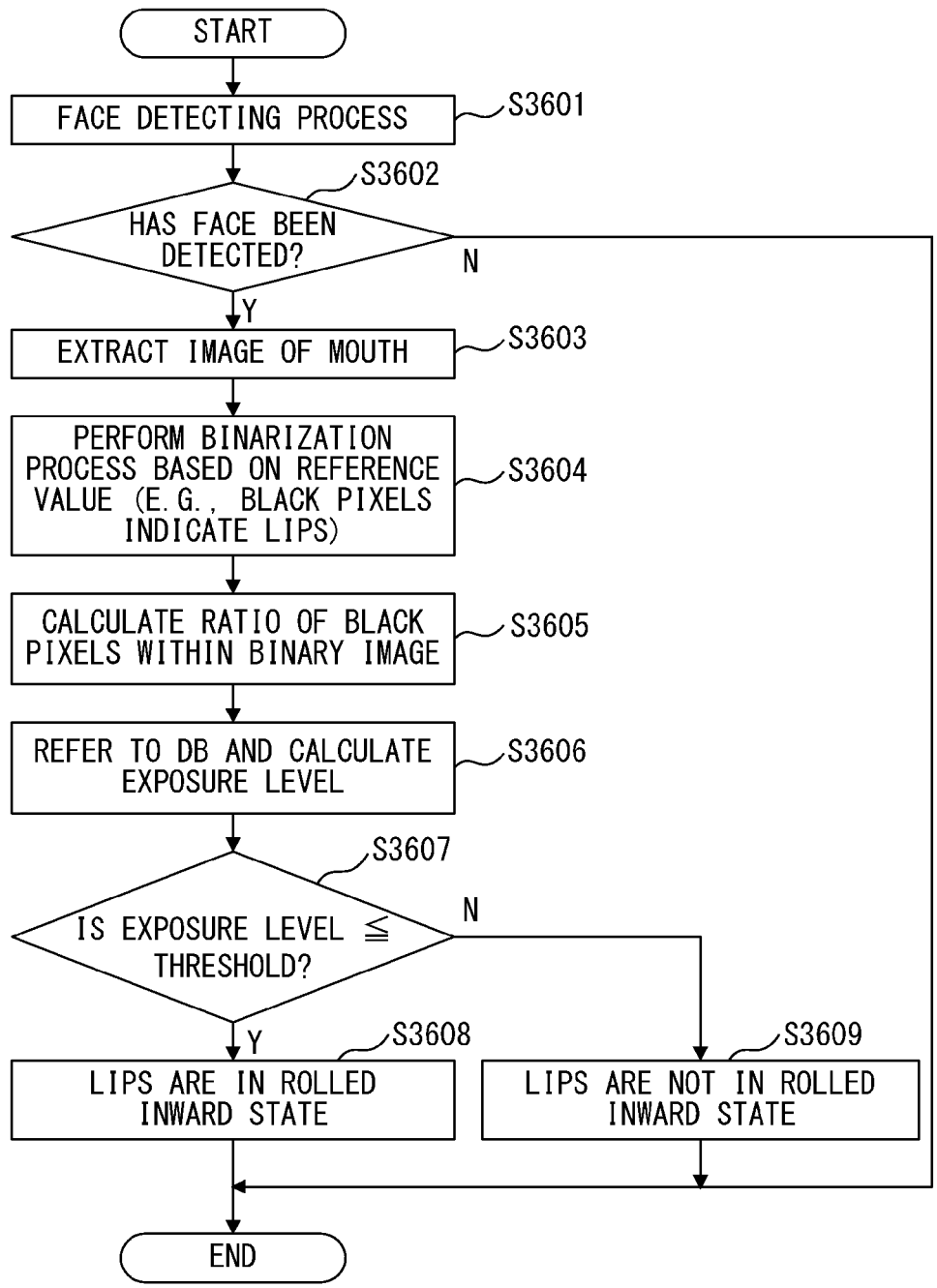
FIG. 43 is a flowchart of a process of detecting a rolled inward state in accordance with an embodiment.

FIG. 43 is a flowchart of a process of detecting the rolled inward state in accordance with an embodiment.

The process of FIG. 43 corresponds to step S604 in FIG. 6.

Next, descriptions will be given of a method for detecting the rolled inward state according to an exposure level. Assume that, as described above with reference to FIG. 42, the camera 5201-20 has shot the image of the face and that the shot image has been input to the flag determination unit 411.

In step S3601, the flag determination unit 411 performs a face detecting process on the shot image.

In step S3602, the flag determination unit 411 determines whether the face has been detected as a result of the face detecting process. When the face is detected, the flow shifts to step S3603, and, when the face is not detected, the flow ends.

In step S3603, the flag determination unit 411 extracts an image of the mouth from the face image.

In step S3604, the flag determination unit 411 extracts an image of the mouth from the face image and performs a binarization process on the extracted image using a predetermined reference value. A black and white binary image is obtained as a result of the binarization process. Black pixels indicate the lips.

In step S3605, the flag determination unit 411 calculates the ratio of the black pixels within the binary image.

In step S3606, the flag determination unit 411 refers to a database (DB) so as to calculate an exposure level corresponding to the calculated ratio. The database stores exposure levels each corresponding to a ratio. The flag management apparatus 401 includes the database.

In step S3607, the flag determination unit 411 determines whether the exposure level is equal to or less than a threshold. When the exposure level is equal to or less than the threshold, the flows shifts to step S3608, and, when the exposure level is greater than the threshold, the flow shifts to step S3609.

In step S3608, the flag determination unit 411 determines that the user is in the predetermined body state (the user's lips are in the rolled inward state).

In step S3609, the flag determination unit 411 determines that the user is not in the predetermined body state (the user's lips are not in the rolled inward state).

The following will describe the limiting of detection (determination) of a predetermined body state. Descriptions will be given of an example in which, under a particular condition, a user who is in a predetermined body state is judged to not be in that body state.

First, the limiting of detection of the dorsiflexion state will be described.

In daily life, the dorsiflexion angle does not become equal to or greater than a threshold. Meanwhile, depending on the posture of the arm or the state of the hand, the dorsiflexion angle may be unintentionally extended. Hence, an arrangement needs to be made to prevent the wrist from being judged to be in the dorsiflexion state when the dorsiflexion angle is unintentionally made to be equal to or greater than the threshold.

The following will describe a method for detecting the state of the hand and a situation in which the dorsiflexion angle easily becomes large. Using, for example, a sensor attached to the wrist or palm, it is determined whether the wrist is in a particular state wherein the wrist is easily put in the dorsiflexion state.

First, descriptions will be given of the limiting of determination of the dorsiflexion state while the hand assumes a predetermined posture.

FIG. 44 illustrates a method for detecting the state of the hand (example 1).

In FIG. 44, an acceleration sensor 5201-21 is attached to the wrist, and the acceleration sensor 5201-21 measures the posture of the hand. The acceleration sensor 5201-21 corresponds to the body state observing apparatus 201. The acceleration sensor 5201-21 outputs the measured value to the flag determination unit 411 via the sensor information obtaining apparatus 301. The measured value provided by the acceleration sensor 5201-21 is an example of another piece of the body state information.

In the limiting of detection of a predetermined body state, the flag determination unit 411 further receives another piece of body state information in step S603 in FIG. 6. In step S604, according to the body state information and the another piece of body state information, the flag determination unit 411 determines whether the user is in the predetermined body state (i.e., dorsiflexion state).

As an example, the wrist is easily put in the dorsiflexion state when the hand is raised. Thus, when the dorsiflexion angle is equal to or greater than the threshold while a measured value provided by the acceleration sensor 5201-21 indicates that the hand is located higher than a predetermined position, the flag determination unit 411 determines that the wrist is not in the dorsiflexion state.

Next, descriptions will be given of the limiting of determination of the dorsiflexion state while an external force is applied to the palm.

Figure 45:
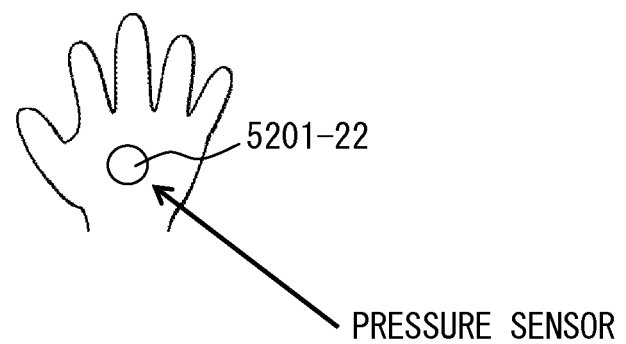
FIG. 45 illustrates a method for detecting the state of the hand (example 2)

FIG. 45 illustrates a method for detecting the state of the hand (example 2).

In FIG. 45, a pressure sensor 5201-22 is attached to the palm. The pressure sensor 5201-22 measures a pressure applied to the palm. The pressure sensor 5201-22 corresponds to the body state observing apparatus 201. The pressure sensor 5201-22 outputs the measured value to the flag determination unit 411 via the sensor information obtaining apparatus 301. The measured value provided by the pressure sensor 5201-22 is an example of another piece of the body state information.

The wrist is easily put in the dorsiflexion state while, for example, the palm presses an object. Pressing an object with the palm increases the measured value provided by the pressure sensor 5201-22. Thus, when the dorsiflexion angle is equal to or greater than the threshold while a measured value provided by the pressure sensor is higher than a certain value, the flag determination unit 411 determines that the wrist is not in the dorsiflexion state.

In the case of the limiting of detection of the plantar flexion state, the flag determination unit 411 determines whether the ankle is in the plantar flexion state according to body state information as well as according to a measured value (the another piece of the body state information) provided by, for example, a pressure sensor attached to the sole or an acceleration sensor attached to the instep. When, for example, the plantar flexion angle is equal to or greater than a threshold while the another piece of body state information indicates that the ankle is in a particular state wherein the ankle is easily put in the plantar flexion state, the flag determination unit 411 determines that the ankle is not in the plantar flexion state.

Similarly, in the detecting of the palmar flexion state of the wrist, when the wrist is in a particular state wherein the wrist is easily put in the palmar flexion state, the flag determination unit 411 determines, according to a measured value obtained from a sensor attached to the hand (the another piece of the body state information), that the wrist is not in the particular body state. For example, the wrist is easily put in the palmar flexion state while picking up an object with the tips of fingers, and hence, in such a case, the flag determination unit 411 determines that the wrist is not in the palmar flexion state even when the palmar flexion angle is equal to or greater than a threshold.

In the system in accordance with the embodiment, it is determined that a body site that is in a predetermined body state is not in that body state while the body is in a particular state, so that an unintended occurrence of apparatus malfunction can be prevented.

Next, descriptions will be given of the limiting of determination of the dorsiflexion state based on the number of times the wrist is put in the dorsiflexion state within a specific period of time.

Under a condition in which the processing apparatus 501 recognizes a gesture or performs a predetermined process when the dorsiflexion angle becomes equal to or greater than a threshold, increasing the threshold decreases the number of operations unintended by the user of the processing apparatus 501. Meanwhile, increasing the threshold increases the burden on the user.

Accordingly, an arrangement is made to determine that the wrist is in the predetermined body state (dorsiflexion state) only when the number of times the dorsiflexion angle becomes equal to or greater than the threshold (dorsiflexion state) becomes equal to or higher than a particular value within a specific period of time. In this case, the threshold used to determine whether the wrist is in the dorsiflexion state does not need to be a high value. A proper threshold is set in advance as the specific period of time.

For example, in step S604 in FIG. 6, when the wrist is put in the dorsiflexion angle twice during the specific period of time, the flag determination unit 411 determines that the wrist is in the predetermined body state (dorsiflexion state).

The following will describe an operation of the flag determination unit 411 under a condition in which the wrist is put in the dorsiflexion state (when the dorsiflexion angle becomes equal to or greater than the threshold) (first), then ceases to be in the dorsiflexion state (when the dorsiflexion angle becomes less than the threshold), and finally is put in the dorsiflexion state again (second).

When the first dorsiflexion state is detected (when the dorsiflexion angle becomes equal to or greater than the threshold), according to body state information, the flag determination unit 411 does not determine that the wrist is in the predetermined body state (dorsiflexion state). Assume that the wrist ceases to be in the dorsiflexion state and is then put in the second dorsiflexion state. Only when the second dorsiflexion state is detected within a specific period of time after the first dorsiflexion state has been detected does the flag determination unit 411 determine that the wrist is in the predetermined body state (dorsiflexion state).

A determination as to whether the wrist has been put in the dorsiflexion state twice within a specific period of time is made according to a timer that the flag management apparatus 401 includes (not illustrated) or according to the times at which the wrist is put in the dorsiflexion state. For example, the flag determination unit 411 starts the timer when the first dorsiflexion state is detected. When the second dorsiflexion state is detected and the timer indicates a value that is equal to or less than a specific period of time, the flag determination unit 411 determines that the wrist has been put in the dorsiflexion state twice within the specific period of time. The flag determination unit 411 may record a time when the first dorsiflexion state is detected, and may calculate the difference from the time when the second dorsiflexion state is detected. When the difference is equal to or less than a specific period of time, the flag determination unit 411 may determine that the wrist has been put in the dorsiflexion state twice within the specific period of time.

For the palmar flexion state of the wrist, the plantar flexion state of the ankle, and the rolled inward state of the lips, the flag determination unit 411 may respectively determine that the wrist, the ankle, and the lips have been put in the predetermined body states only when the numbers of times the wrist, the ankle, and the lips are put in the palmar flexion state, the plantar flexion state, and the rolled inward state within a specified period of time are each equal to or greater than a specified number. In the system in accordance with the embodiment, it is determined that a body site is in a particular body state only when the number of times the user is put in the predetermined body state within a specific period of time becomes equal to or greater than a specific number, thereby decreasing burdens on the user and preventing an occurrence of apparatus malfunction.

Next, descriptions will be given of a situation in which processes to be performed are changed in accordance with the configuration of the hand (configuration of the fingers) in the dorsiflexion state or the palmar flexion state or the configuration of the toes in the plantar flexion state.

FIGS. 46A-46D illustrate the configuration of the hand.

The processing apparatus 501 performs a process in accordance with the configuration of the hand assumed when the dorsiflexion state is detected.

Figure 46A:
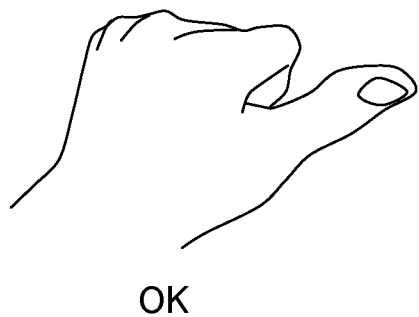
FIG. 46A illustrates a configuration of the hand.
Figure 46B:
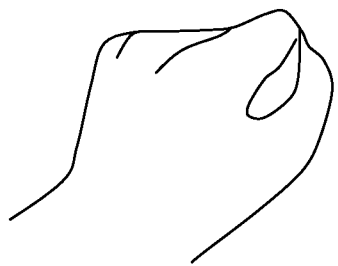
FIG. 46B illustrates a configuration of the hand.
Figure 46D:
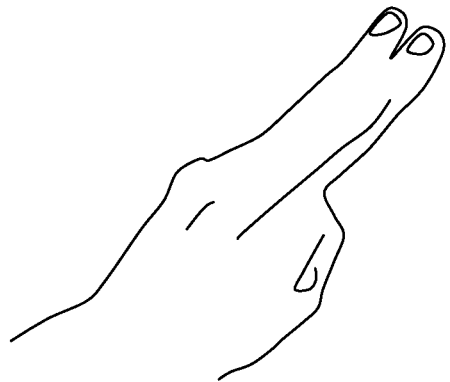
FIG. 46D illustrates a configuration of the hand.

For example, the processing apparatus 501 performs a process for "OK" when only the thumb is straightened during the dorsiflexion state (FIG. 46A); a process for "cancellation" when all of the fingers are bent (the hand is closed) during the dorsiflexion state (FIG. 46B); a process for "going to the next page" when only the forefinger is straightened during the dorsiflexion state (FIG. 46C); and a process for "going to the page two pages after" when only the forefinger and the middle finger are straightened during the dorsiflexion state (FIG. 46D).

The processing apparatus 501 changes a process corresponding to the same gesture in accordance with the configuration of the hand in the dorsiflexion state. Under a condition in which, for example, the processing apparatus 501 recognizes a gesture of lowering the hand in the dorsiflexion state, the processing apparatus 501 performs the process for "OK" when only the thumb is straightened (FIG. 46A); the process for "cancellation" when all of the fingers are bent (the hand is closed) (FIG. 46B); the process for "going to the next page" when only the forefinger is straightened (FIG. 46C); and the process for "going to the page two pages after" when only the forefinger and the middle finger are straightened (FIG. 46D).

The following will describe a method for detecting the configuration of the hand.

Figure 47:
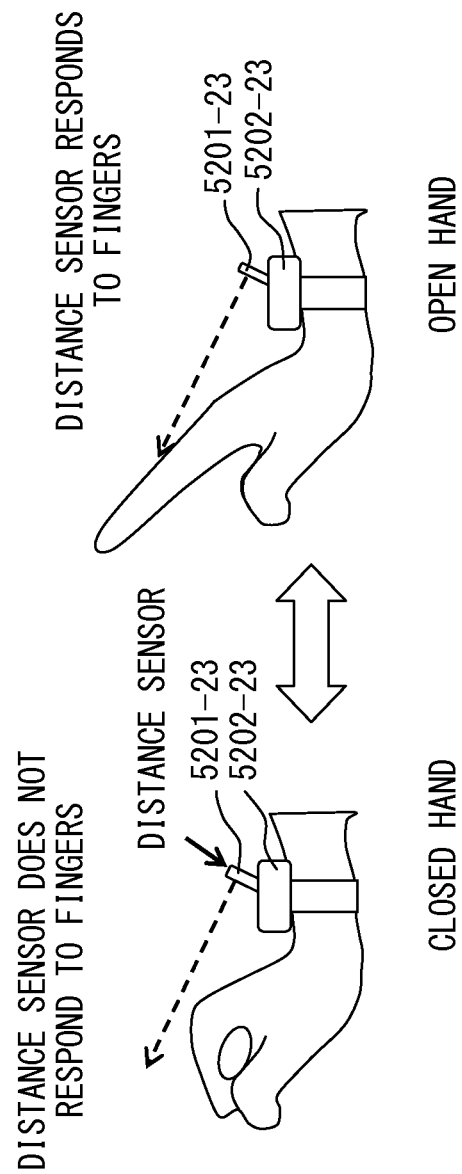
FIG. 47 illustrates a method for detecting the configuration of the hand (example 1)

FIG. 47 illustrates a method for detecting the configuration of the hand (example 1).

In FIG. 47, the configuration of the hand is detected using a distance sensor 5201-23. The distance sensor 5201-23 is provided on a worn-on-wrist type device 5202-23 to be mounted on the wrist.

The distance sensor 5201-23 is attached to the outer surface of the wrist and has a direction of measurement slightly upward from the direction of the fingertips. The distance sensor 5201-23 measures the distance to an object in the direction of measurement.

The left-hand side of FIG. 47 depicts the hand at the time of closing, and the right-hand side depicts the hand at the time of opening.

When the hand is closed (the fingers are bent), the distance sensor 5201-23, as illustrated at the left-hand side of FIG. 47, does not detect the fingers.

When the hand is open (the fingers are straightened) as depicted at the right-hand side of FIG. 47, the distance sensor 5201-23 detects the fingers, and the distance from the distance sensor 5201-23 to the fingers is measured as a measured value. The measured value is information indicating the configuration of the fingers (the configuration of the hand), i.e., information indicating whether the fingers are straightened. The measured value is an example of the configuration information indicating the configuration of the hand.

The worn-on-wrist type device 5202-5 outputs the measured value to the flag determination unit 411 via the sensor information obtaining apparatus 301.

When the measured value is equal to or lower than a threshold, the flag determination unit 411 determines that "the hand is open". A proper value is set as the threshold in advance.

Figure 48:
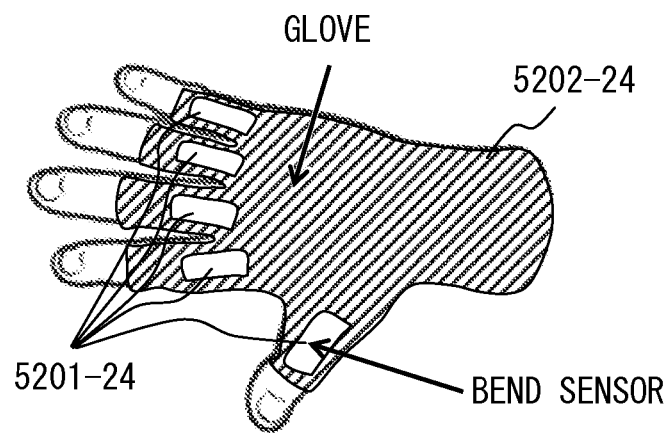
FIG. 48 illustrates a method for detecting the configuration of the hand (example 2)

FIG. 48 illustrates a method for detecting the configuration of the hand (example 2).

In FIG. 48, the configuration of the fingers is detected using bend sensors 5201-24. The bend sensors 5201-24 are each attached to an individual knuckle portion of a glove 5202-24. The user wears the glove 5202-24.

When the user closes the hand (bends the fingers), the bend sensors 5201-24 bend and a higher ohmic value is measured. The measured value is an example of the configuration information indicating the configuration of the hand.

The bend sensors 5201-24 output the ohmic value to the flag determination unit 411 via the sensor information obtaining apparatus 301.

When the ohmic value is equal to or lower than a threshold, the flag determination unit 411 determines that "the hand is open". When the ohmic value is higher than the threshold, the flag determination unit 411 determines that "the hand is closed". A proper value is set as the threshold in advance.

Figure 49:
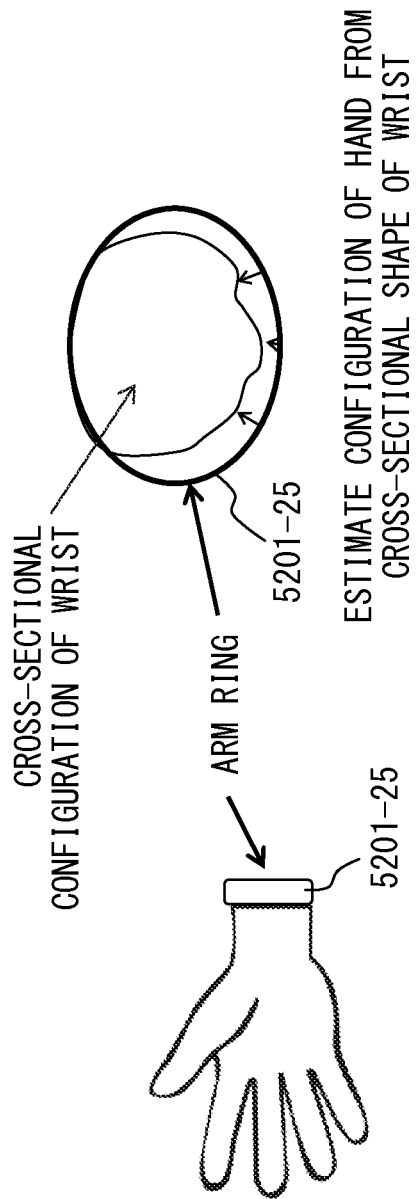
FIG. 49 illustrates a method for detecting the configuration of the hand (example 3)

FIG. 49 illustrates a method for detecting the configuration of the hand (example 3).

In FIG. 49, the configuration of the hand is detected using an arm ring 5201-25 equipped with a sensor to measure a distance. The arm ring 5201-25 corresponds to the body state observing apparatus 201 in FIG. 1. The arm ring 5201-25 is attached to the user's wrist.

The arm ring 5201-25 measures the distance from the arm ring 5201-25 to the wrist. The measured value is an example of the configuration information indicating the configuration of the hand. Measuring the distance from the arm ring 5201-25 to the wrist clarifies a cross-sectional configuration of the wrist from which the configuration of the hand is estimable.

The arm ring 5201-25 outputs the measured value to the flag determination unit 411 via the sensor information obtaining apparatus 301.

The flag determination unit 411 determines the configuration of the hand according to the measured value.

Figure 50:
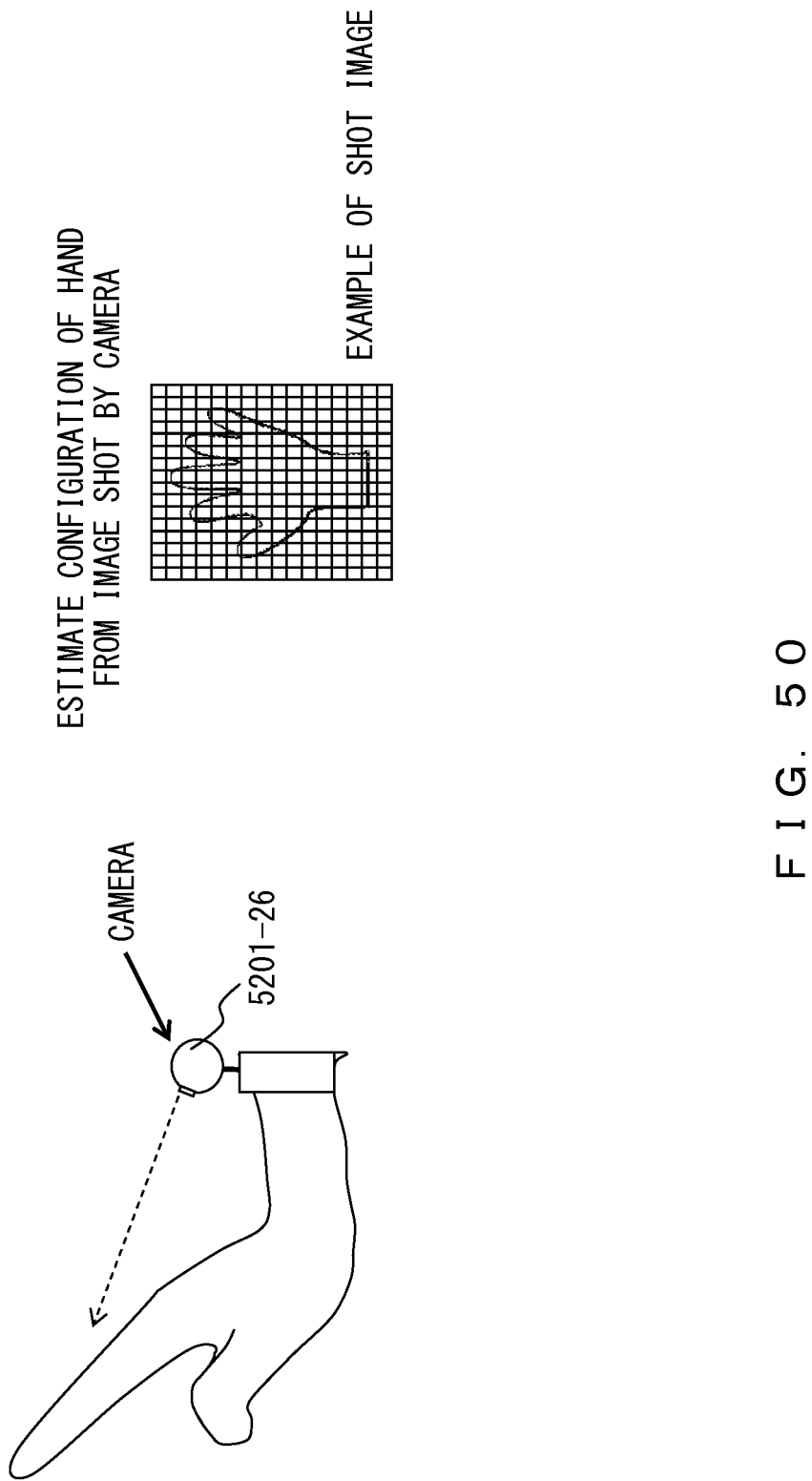
FIG. 50 illustrates a method for detecting the configuration of the hand (example 4)

FIG. 50 illustrates a method for detecting the configuration of the hand (example 4).

In FIG. 50, the configuration of the hand is determined using a camera 5201-26. The camera 5201-26 corresponds to the body state observing apparatus 201 in FIG. 1.

The camera 5201-26 is attached to the wrist and shoots an image of an area in the direction of the fingertips on the back side of the hand. Hence, the camera 5201-26 shoots an image of the hand (fingers) in the dorsiflexion state. The shot image is an example of the configuration information indicating the configuration of the hand.

The camera 5201-26 outputs the shot image to the flag determination unit 411 via the sensor information obtaining apparatus 301.

The flag determination unit 411 determines the configuration of the hand according to the shot image.

The following will describe the configuration of a system that changes a process to be performed in accordance with the configuration of the fingers in the dorsiflexion state.

FIG. 51 illustrates a fifth configuration example of a system in accordance with an embodiment.

A system 6101 includes a worn-on-wrist type device 6601 and a processing apparatus 6501.

The worn-on-wrist type device 6601 includes a dorsiflexion detection switch 6201-1, a distance sensor 6201-2, and a microprocessor 6602. The worn-on-wrist type device 6601 is an apparatus worn on the wrist when used.

The dorsiflexion detection switch 6201-1 is a switch for detecting dorsiflexion of the wrist. The dorsiflexion detection switch 6201-1 outputs a signal indicating whether the wrist is being dorsiflexed (body state information) to the microprocessor 6602. The dorsiflexion detection switch 6201-1 corresponds to the body state observing apparatus 201 in FIG. 1.

The distance sensor 6201-2 detects the closing and opening of the hand. The distance sensor 6201-1 has functions similar to those of the distance sensor 5201-23. The distance sensor 6201-2 outputs a measured value to a sensor value obtaining unit 6301-2. The distance sensor 6201-2 corresponds to the body state observing apparatus 201 in FIG. 1.

The microprocessor 6602 includes a switch change obtaining unit 6301-1, a sensor value obtaining unit 6301-2, a flag determination unit 6411, and a flag report unit 6421.

The switch change obtaining unit 6301-1 receives body state information from the dorsiflexion detection switch 6201-1 and transmits this information to the flag determination unit 6411. The switch change obtaining unit 6301-1 corresponds to the sensor information obtaining apparatus 301 in FIG. 1.

The sensor value obtaining unit 6301-2 receives a measured value from the distance sensor 6201-2 and transmits this measured value to the flag determination unit 6411. The sensor value obtaining unit 6301-2 corresponds to the sensor information obtaining apparatus 301 in FIG. 1.

The flag determination unit 6411 receives body state information and determines the state of a flag according to the body state information. The flag determination unit 6411 receives the measured value, determines the configuration of the fingers (configuration of the hand) according to the measured value, and sets an auxiliary ID. The auxiliary ID is information indicating the configuration of the fingers (configuration of the hand). The flag determination unit 6411 transmits the results of the determinations on the flag and the auxiliary ID to the flag report unit 6421. The flag determination unit 6411 corresponds to the flag determination unit 411 in FIG. 1.

The flag report unit 6421 receives the results of the determinations from the flag determination unit 6411 and reports the flag and the auxiliary ID to the processing apparatus 6501 according to the results of the determinations. The flag report unit 6421 corresponds to the flag report unit 421 in FIG. 1.

The processing apparatus 6501 receives the flag and the auxiliary ID from the flag report unit 6421 and performs a predetermined process according to the flag and the auxiliary ID. The processing apparatus 6501 corresponds to the processing apparatus 501 in FIG. 1.

FIG. 52 is a configuration diagram of a processing apparatus in accordance with the fifth exemplary configuration.

The processing apparatus 6501 includes a receiving unit 6511, a storage unit 6521, a gesture recognition state determining unit 6531, a gesture recognizing process unit 6541, and a state change report unit 6551.

The receiving unit 6511 receives and stores a flag 6522 and an auxiliary ID 6523 in the storage unit 6521. The receiving unit 6511 corresponds to the flag receiving unit 511 in FIG. 7.

The storage unit 6521 is a storage apparatus for storing store data. The storage unit 6521 is, for example, a Random Access Memory (RAM), a magnetic disk apparatus, or a nonvolatile memory.

The storage unit 6521 stores the flag 6522 and the auxiliary ID 6523. The storage unit 6521 corresponds to the storage unit 521 in FIG. 7.

The gesture recognition state determining unit 6531 determines according to the flag 6522 which of "start" or "end" the processing state corresponds to, and reports the processing state for which the determination has been made to the gesture recognizing process unit 6541 and the state change report unit 6551. The gesture recognition state determining unit 6531 determines an auxiliary state according to the auxiliary ID 6523 and reports the auxiliary state to the gesture recognizing process unit 6541 and the state change report unit 6551.

The gesture recognition state determining unit 6531 corresponds to the processing-state determining unit 531 in FIG. 7.

The gesture recognizing process unit 6541 recognizes a gesture according to the reported processing state and auxiliary state. The gesture recognizing process unit 6541 receives information indicating the configuration, state, and/or movement of a predetermined site of the body (gesture) from the body state observing apparatus 201 or another apparatus (not illustrated). Body state information transmitted from the body state observing apparatus 201 may be used as a gesture.

The gesture recognizing process unit 1541 corresponds to the processing performing unit 541 in FIG. 7.

The state change report unit 6551 corresponds to the state change report unit 551 in FIG. 7 and has functions similar to those of the state change report unit 551, and hence descriptions of the state change report unit 6551 are omitted herein.

Figure 53:
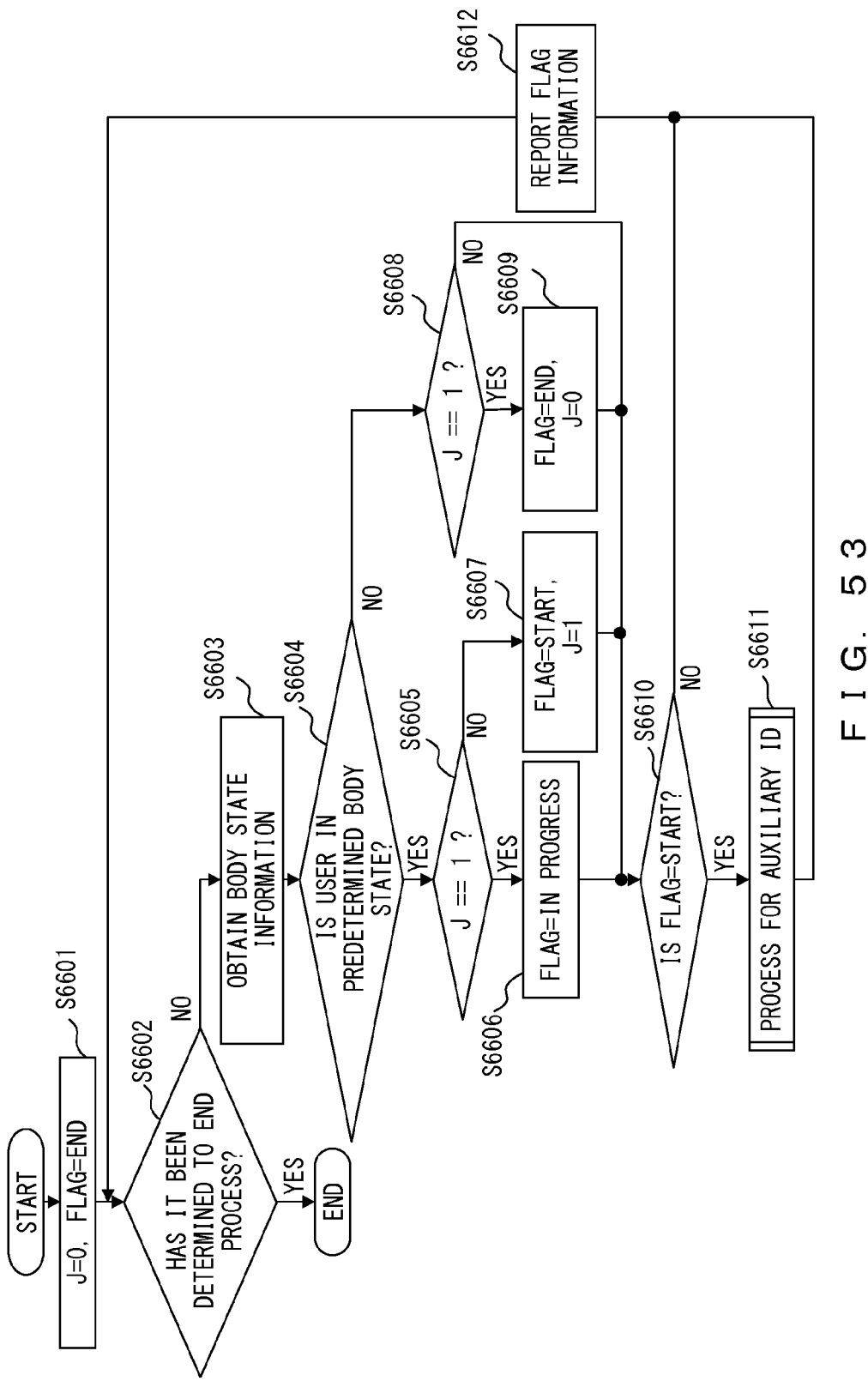
FIG. 53 is a flowchart of a flag management process performed by a system of the fifth configuration example.

FIG. 53 is a flowchart of a flag management process performed by a system of the fifth configuration example.

In step S6601, the flag determination unit 6411 sets variable j=0 and flag=end as initial values.

In step S6602, the flag management process may end; alternatively, the flow may shift to step S6603. As an example, the flag management process ends when an instruction to end the process is received from an external element or when the switch change obtaining unit 6301-1, the sensor value obtaining unit 6301-2, or the processing apparatus 6501 is turned off.

In step S6603, the flag determination unit 411 receives body state information from the switch change obtaining unit 6301-1.

In step S6604, the flag determination unit 6411 determines according to the body state information whether the user is in a predetermined body state. When the user is in the predetermined body state, the flow shifts to step S6605; when the user is not in the predetermined body state, the flow shifts to step S6608. When, for example, the user's wrist is in the dorsiflexion state, the flag determination unit 6411 determines that the user is in the predetermined body state.

In step S6605, the flag determination unit 6411 determines whether j=1. When j=1 is satisfied, the flow shifts to step S6606; when j=1 is not satisfied, the flow shifts to step S6607.

In step S6606, the flag determination unit 6411 sets flag=in-progress. The flag determination unit 6411 transmits the flag to the flag report unit 6421.

In step S6607, the flag determination unit 6411 sets flag=start and j=1. The flag determination unit 6411 transmits the flag to the flag report unit 6421.

In step S6608, the flag determination unit 6411 determines whether j=1. When j=1 is satisfied, the flow shifts to step S6609; when j=1 is not satisfied, the flow shifts to step S6610.

In step S6609, the flag determination unit 6411 sets flag=end and j=0. The flag determination unit 6411 transmits the flag to the flag report unit 6421.

In step S6610, the flag report unit 6421 performs processes for an auxiliary ID. Details of the processes for an auxiliary ID will be described hereinafter.

In step S6611, the flag report unit 6421 transmits the flag to the processing apparatus 501. Note that an arrangement may be made such that the flag report unit 6421 transmits a flag only when flag=start or flag=end.

FIG. 54 is a flowchart illustrating details of processes for an auxiliary ID.

FIG. 54 corresponds to step S6611 in FIG. 53.

In step S6621, the flag determination unit 6411 obtains configuration information, i.e., a measured value provided by the distance sensor 6201-2, from the sensor value obtaining unit 6301-2.

In step S6622, the flag determination unit 6411 determines the configuration of the fingers (configuration of the hand) according to the configuration information. In particular, when the measured value is equal to or lower than a threshold, the flag determination unit 6411 determines that "the hand is open", and the flow shifts to step S6623. When the measured value is higher than the threshold, the flag determination unit 6411 determines that "the hand is closed", and the flow shifts to step S6624.

In step S6623, the flag determination unit 6411 sets auxiliary ID=OPEN.

In step S6624, the flag determination unit 6411 sets auxiliary ID=CLOSE.

In step S6625, the flag report unit 6421 transmits the auxiliary ID to the processing apparatus 6501.

The following will describe processes performed by the processing apparatus 6501.

FIG. 55 is a flowchart of a flag controlling process performed by a processing apparatus of the fifth exemplary configuration.

In step S6631, the gesture recognition state determining unit 6531 initializes a processing state and an auxiliary state. The processing state and the auxiliary state are information used in the process described in the following.

In step S6632, the flag controlling process may end; alternatively, the flow may shift to step S6623. As an example, the flag controlling process ends when an instruction to end the process is received from an external element or when the worn-on-wrist type device 6601 is turned off.

In step S6633, the receiving unit 6511 receives and stores data in the storage unit 6521. The data is the flag 6522 or the auxiliary ID 6523.

In step S6634, when the data received in step S6633 is the flag 6522, the flow shifts to step S6635; otherwise, the flow shifts to step S6636.

In step S6635, the gesture recognition state determining unit 6531 and the gesture recognizing process unit 6541 perform a process of receiving a flag. Details of the process of receiving a flag will be described hereinafter.

In step S6636, when the data received in step S6633 is the auxiliary ID 6523, the flow shifts to step S6637; otherwise, the flow shifts to step S6636.

In step S6637, the gesture recognition state determining unit 6531 and the gesture recognizing process unit 6541 perform a process of receiving an auxiliary ID. Details of the process of receiving an auxiliary ID will be described hereinafter.

Figure 56:
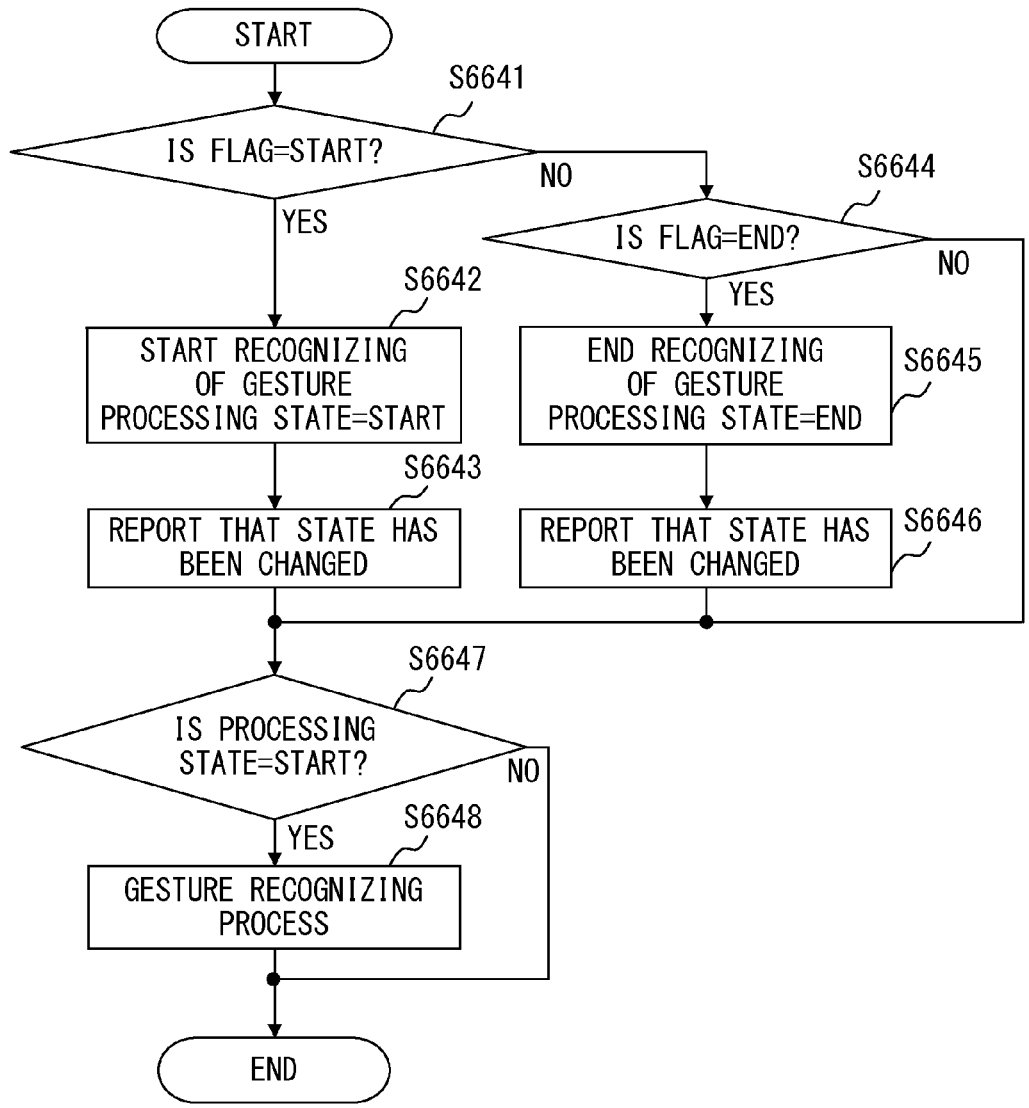
FIG. 56 is a flowchart illustrating details of a process of receiving a flag.

FIG. 56 is a flowchart illustrating details of a process of receiving a flag.

FIG. 56 corresponds to step S6635 in FIG. 54.

In step S6641, the gesture recognition state determining unit 6531 determines the state of the flag. When flag=start, the flow shifts to step S6642. When flag≠start, the flow shifts to step S6644.

In step S6642, the gesture recognition state determining unit 6531 sets processing state=start. The gesture recognition state determining unit 6531 reports the processing state to the gesture recognizing process unit 6541 and the state change report unit 6551. The gesture recognizing process unit 6541 starts a gesture recognizing process. The gesture recognizing process unit 6541 can recognize gestures until processing state=end is satisfied.

In step S6643, the state change report unit 6551 reports to the user that gestures can be recognized. For example, the state change report unit 6551 vibrates the processing apparatus 6501 or blinks the screen of a display apparatus (not illustrated) included in the processing apparatus 6501.

In step S6644, the gesture recognition state determining unit 6531 determines the state of the flag. When flag=end, the flow shifts to step S6645. When flag≠end, the flow shifts to step S6647.

In step S6645, the gesture recognition state determining unit 6531 sets processing state=end. The gesture recognition state determining unit 6531 reports the processing state to the gesture recognizing process unit 6541. The gesture recognition state determining unit 6531 may further report the processing state to the state change report unit 6551. Receiving the report, the state change report unit 6551 reports to the user that gestures cannot be recognized. The gesture recognizing process unit 6541 ends the gesture recognizing process.

In step S6647, when processing state=start, the flow shifts to step S6648, and when processing state≠start, the flow ends.

In step S6648, the gesture recognizing process unit 6541 performs the gesture recognizing process. That is, the gesture recognizing process unit 6541 recognizes the input gesture and performs a process corresponding to the result of the recognizing and an auxiliary state.

FIG. 57 is a flowchart illustrating details of a process of receiving an auxiliary ID.

FIG. 57 corresponds to step S6637 in FIG. 55.

In step S6651, the gesture recognition state determining unit 6531 determines the state of the auxiliary ID 6523. When auxiliary ID=OPEN, the flow shifts to step S6652, and when auxiliary ID≠OPEN, the flow shifts to step S6654.

In step S6652, the gesture recognition state determining unit 6531 sets auxiliary state=OPEN.

In step S6653, the gesture recognition state determining unit 6531 reports the auxiliary state to the gesture recognizing process unit 6541. The gesture recognition state determining unit 6531 also records the newly set auxiliary state in, for example, the storage unit 6521.

In step S6654, the gesture recognition state determining unit 6531 determines the state of the auxiliary ID 6523. When auxiliary ID=CLOSE, the flow shifts to step S6655, and when auxiliary ID≠CLOSE, the flow ends.

In step S6655, the gesture recognition state determining unit 6531 sets auxiliary state=CLOSE.

In step S6656, the gesture recognition state determining unit 6531 reports the auxiliary state to the gesture recognizing process unit 6541. The gesture recognition state determining unit 6531 also records the newly set auxiliary state in, for example, the storage unit 6521.

The following will describe an example in which the configuration of the hand is determined on the processing apparatus side.

Figure 58:
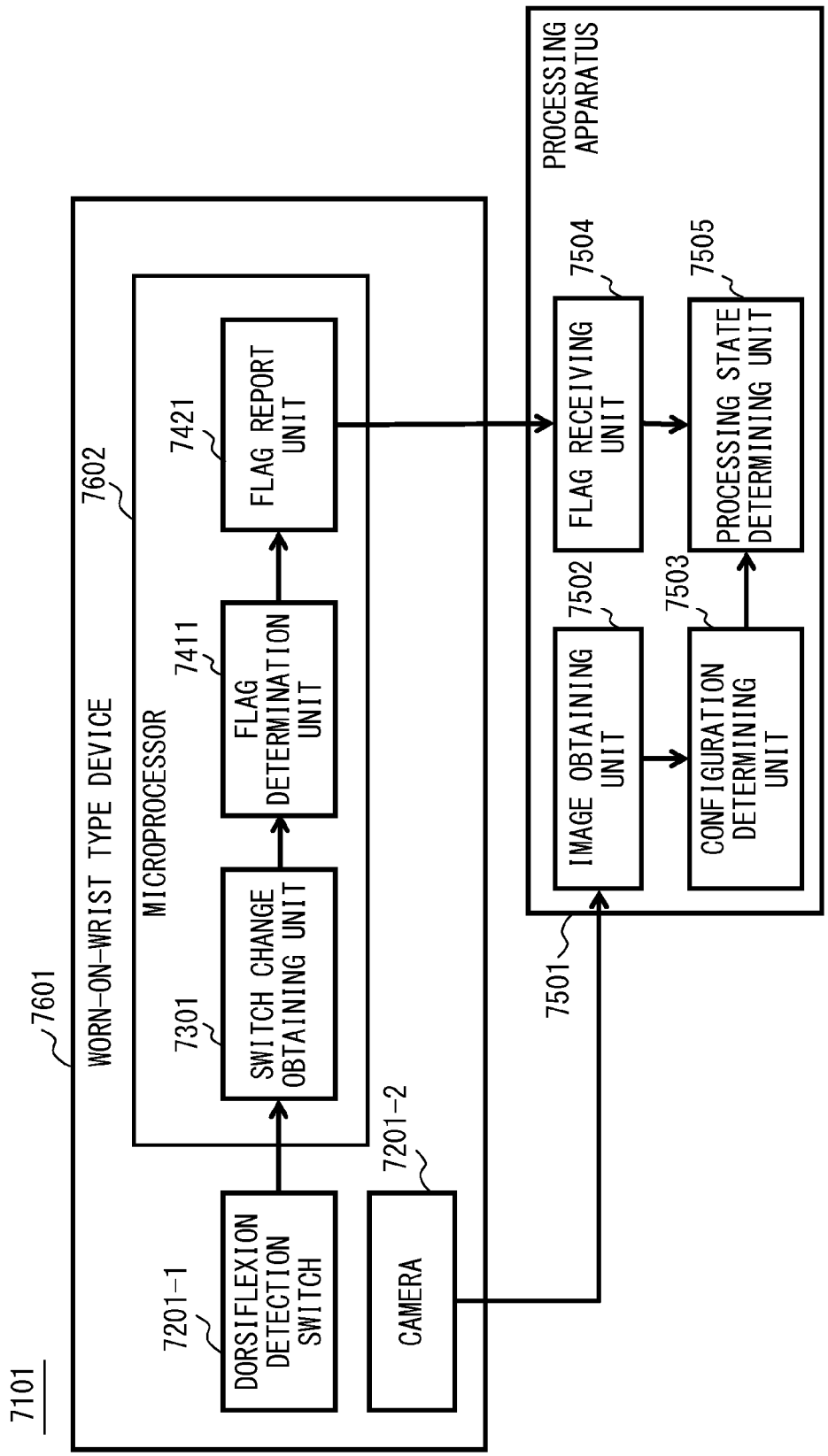
FIG. 58 illustrates a sixth exemplary configuration of a system in accordance with an embodiment.

FIG. 58 illustrates a sixth exemplary configuration of a system in accordance with an embodiment.

A system 7101 includes a worn-on-wrist type device 7601 and a processing apparatus 7501.

The worn-on-wrist type device 7601 includes a dorsiflexion detection switch 7201-1, a camera 7201-2, and a microprocessor 7602. The worn-on-wrist type device 7601 is an apparatus worn on the wrist when used.

The dorsiflexion detection switch 7201-1 is a switch for detecting dorsiflexion of the wrist. The dorsiflexion detection switch 7201-1 outputs a signal indicating whether the wrist is being dorsiflexed (body state information) to the microprocessor 7602. The dorsiflexion detection switch 7201-1 corresponds to the body state observing apparatus 201 in FIG. 1.

The camera 7201-2 shoots an image of the hand. The functions of the camera 7201-2 are similar to those of the camera 5201-26, and hence detailed descriptions thereof are omitted herein. The camera 7201-2 outputs the shot image to an image obtaining unit 7502. The camera 7201-2 corresponds to the body state observing apparatus 201 in FIG. 1.

The microprocessor 7602 includes a switch change obtaining unit 7301, a flag determination unit 7411, and a flag report unit 7421.

The switch change obtaining unit 7301 receives body state information from the dorsiflexion detection switch 7201-1 and transmits this information to the flag determination unit 7411. The switch change obtaining unit 7301 corresponds to the sensor information obtaining apparatus 301 in FIG. 1.

The flag determination unit 7411 receives the body state information and determines the state of a flag according to the body state information. The flag determination unit 7411 transmits the result of the determination on the flag to the flag report unit 7421. The flag determination unit 7411 corresponds to the flag determination unit 411 in FIG. 1.

The flag report unit 7421 receives the result of the determination from the flag determination unit 7411 and reports the flag to the processing apparatus 7501 in accordance with to the result of the determination. The flag report unit 7421 corresponds to the flag report unit 421 in FIG. 1.

The processing apparatus 7501 receives the flag from the flag report unit 7421. The processing apparatus 7501 performs a predetermined process in accordance with the flag and the configuration of the hand. The processing apparatus 7501 corresponds to the processing apparatus 501 in FIG. 1.

The processing apparatus 7501 includes the image obtaining unit 7502, a configuration determining unit 7503, a flag receiving unit 7504, and a processing unit 7505.

The image obtaining unit 7502 receives a shot image from the camera 7201-2 and outputs this image to the configuration determining unit 7503.

The configuration determining unit 7503 determines the configuration of the hand according to the shot image and sets an auxiliary state. The configuration determining unit 7503 reports the auxiliary state to the processing unit 7505.

The flag receiving unit 7504 receives a flag from the flag report unit 7421 and outputs this flag to the processing unit 7505.

The processing unit 7505 performs a predetermined process according to the flag and the auxiliary state.

FIG. 59 is a flowchart of a flag controlling process performed by the processing apparatus of the sixth exemplary configuration.

In step S7631, the processing unit 7505 initializes a processing state and an auxiliary state. The processing state and the auxiliary state are information used in the process described in the following.

In step S7632, the flag controlling process may end; alternatively, the flow may shift to step S7623. As an example, the flag controlling process ends when an instruction to end the process is received from an external element or when the worn-on-wrist type device 7601 is turned off.

In step S7633, the processing unit 7505 receives data. Note that the data is a flag or an auxiliary state.

In step S7634, when the data received in step S7633 is a flag, the flow shifts to step S7635; otherwise, the flow shifts to step S7636.

In step S7635, the processing unit 7505 performs a process of receiving a flag. The process of receiving a flag in step S7635 is similar to the process of step S6635 in FIG. 55, and hence descriptions thereof are omitted herein.

In step S7635, the configuration determining unit 7503 performs a process of determining a configuration. Details of the process of determining a configuration will be described hereinafter.

The system in accordance with the embodiment allows different processes to be performed in accordance with the configuration of the fingers, thereby improving convenience for the user.

Figure 60:
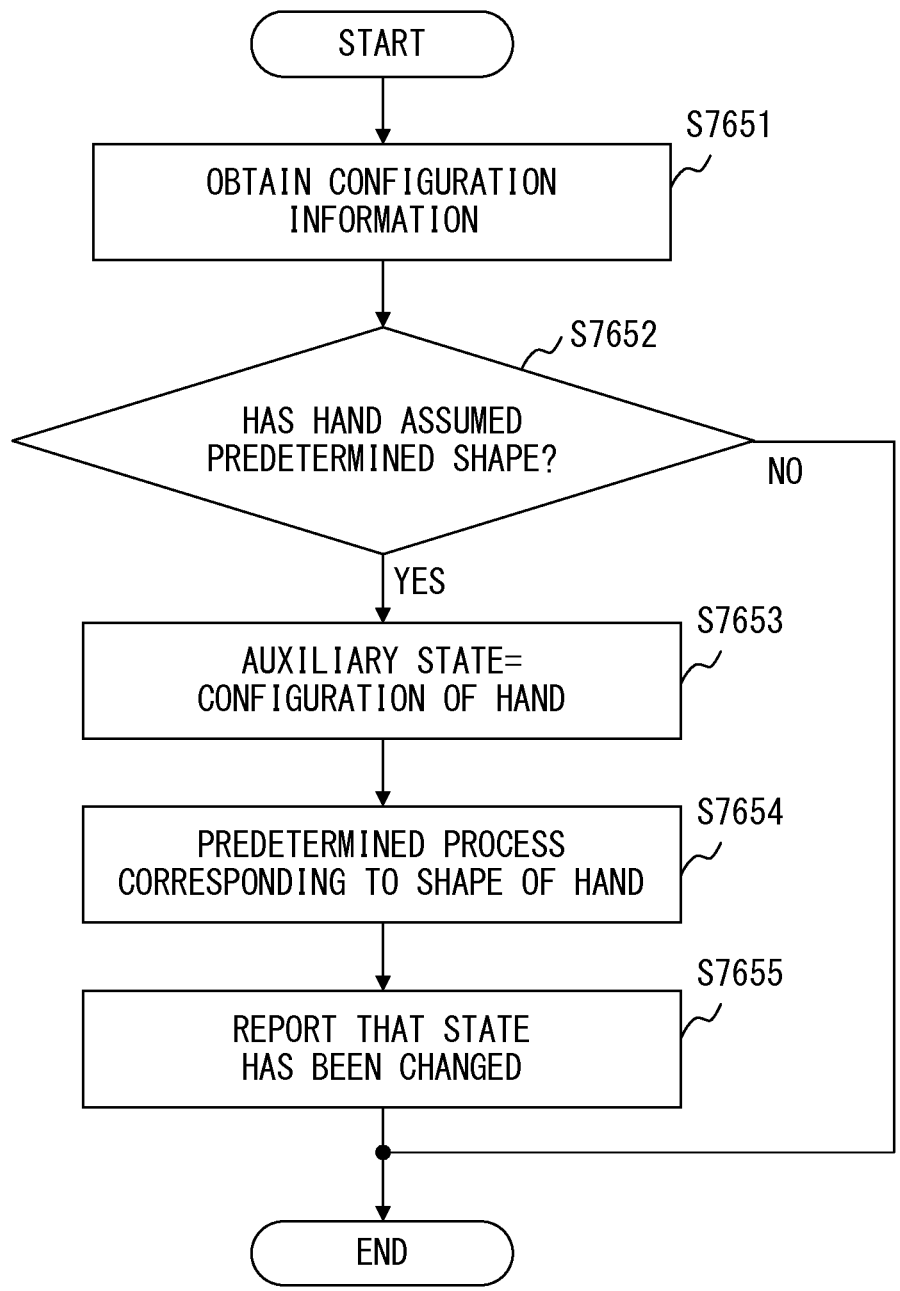
FIG. 60 is a flowchart illustrating details of a process of determining a configuration.

FIG. 60 is a flowchart illustrating details of a process of determining a configuration.

In step S7651, the configuration determining unit 7503 receives configuration information, i.e., a shot image provided by the camera 7201-2, from the image obtaining unit 7502.

In step S7652, the configuration determining unit 7503 determines the configuration of the hand according to the shot image. When the configuration of the hand is a predetermined configuration, the flow shifts to step S7652, and, when the configuration of the hand is not the predetermined configuration, the flow ends.

In step S7653, the configuration determining unit 7503 sets the configuration of the hand determined in step S7652 as an auxiliary state.

In step S7654, the configuration determining unit 7503 performs a predetermined process corresponding to the configuration of the hand. For example, the configuration determining unit 7503 saves the newly set auxiliary state.

In step S7655, the configuration determining unit 7503 reports the auxiliary state to the processing unit 7505.

Descriptions have been given of an example in which the processes are performed in accordance with the dorsiflexion state and the configuration of the fingers, but processes to be performed may change according to the plantar flexion state and the configuration of the toes.

For example, the processing apparatus 501 performs a process in accordance with the configuration of the toes assumed when the plantar flexion state is detected.

Or for example, the processing apparatus 501 performs a first process when the toes are straightened during the plantar flexion state, and performs a second state when the toes are bent during the plantar flexion state.

The processing apparatus 501 changes a process corresponding to the same gesture in accordance with the configuration of the toes in the plantar flexion state. Under a condition in which, for example, the processing apparatus 501 recognizes a gesture of lowering the foot in the plantar flexion state, the processing apparatus 501 performs the first process when the toes are straightened, and performs the second process when the toes are bent.

In the aforementioned example, a process to be performed changes with the configuration of the fingers. However, a process to be performed may change in accordance with the orientation of the wrist in the dorsiflexion state.

FIGS. 61A-61D illustrate orientations of the wrist.

Figure 61B:
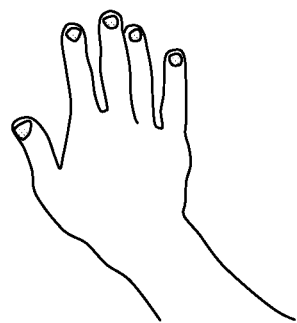
FIG. 61B illustrates an orientation of the wrist.
Figure 61C:
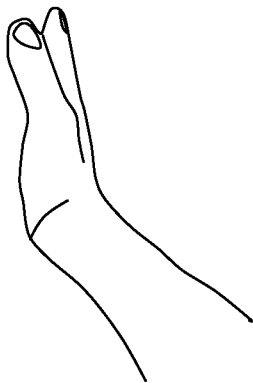
FIG. 61C illustrates an orientation of the wrist.
Figure 61D:
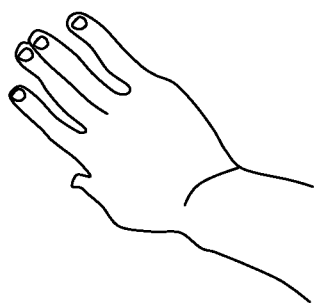
FIG. 61D illustrates an orientation of the wrist.

For example, the processing apparatus 501 performs a process for "OK" when the wrist faces upward during the dorsiflexion state (FIG. 61A); a process for "cancellation" when the wrist faces downward during the dorsiflexion state (FIG. 61B); a process for "going to the next page" when the wrist faces leftward during the dorsiflexion state (FIG. 61C); and a process for "going to the page two pages after" when the wrist faces rightward during the dorsiflexion state (FIG. 61D).

Descriptions have been given of an example in which processes are performed using any one of the dorsiflexion state, the palmar flexion state, the plantar flexion state, and the rolled inward state. The following will describe an example in which processes are performed using any combination of the dorsiflexion state, the palmar flexion state, the plantar flexion state, and the rolled inward state.

Figure 62:
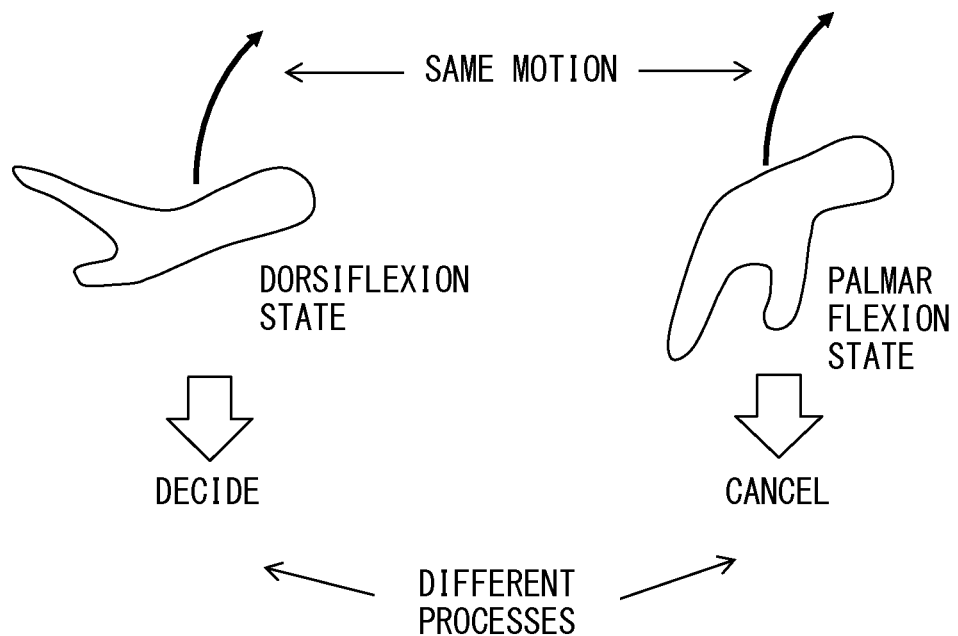
FIG. 62 illustrates processes corresponding to a dorsiflexion state and a palmar flexion state.

FIG. 62 illustrates processes corresponding to the dorsiflexion state and the palmar flexion state.

In a case where a gesture is recognized using the dorsiflexion state and the palmar flexion state, different processes are assigned to the same gesture in accordance with which of the dorsiflexion state or the palmar flexion state the wrist is in.

As illustrated at the left-hand side in FIG. 62, the processing apparatus 501 performs a process for "decide" in response to a gesture of raising the hand in the dorsiflexion state. As illustrated at the right-hand side in FIG. 62, the processing apparatus 501 performs a process for "cancel" in response to a gesture of raising the hand in the palmar flexion state.

As described above, in accordance with which of the dorsiflexion state or the palmar flexion state the wrist is in, different processes may be performed in response to a gesture of raising the hand.

Figure 63:
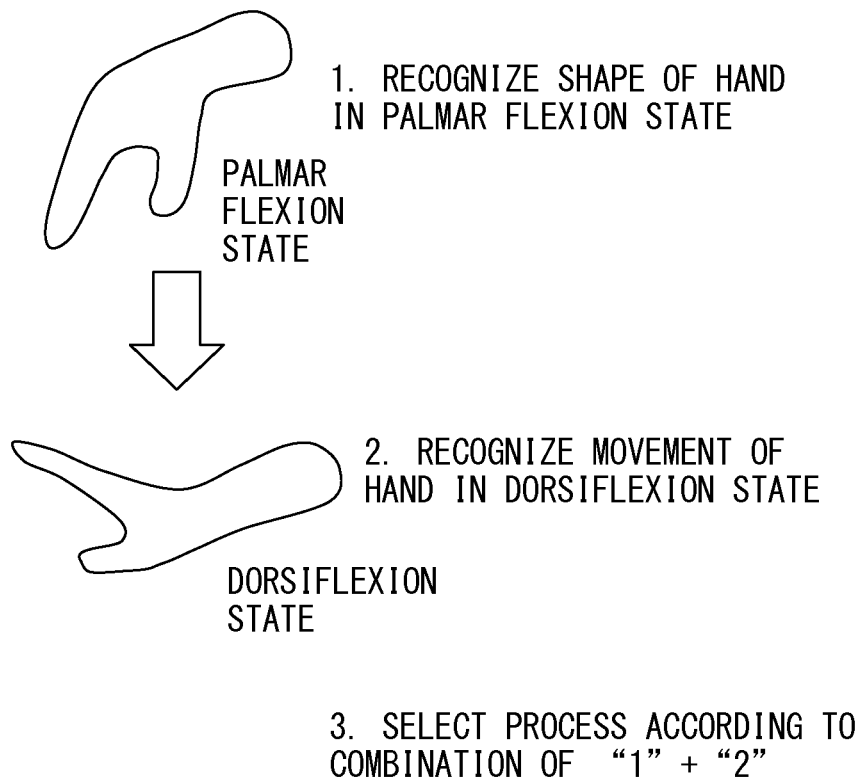
FIG. 63 illustrates a process corresponding to the configuration of the hand in a palmar flexion state and to a gesture under a dorsiflexion state.

FIG. 63 illustrates a process corresponding to the configuration of the hand in the palmar flexion state and to a gesture under the dorsiflexion state.

First, the processing apparatus 501 recognizes and stores the configuration of the hand in the palmar flexion state depicted at the upper side in FIG. 63.

When the state of the wrist changes from the palmar flexion state to the dorsiflexion state depicted at the lower side in FIG. 63, the processing apparatus 501 starts to recognize gestures.

The processing apparatus 501 selects a process corresponding to a recognized gesture in accordance with the configuration of the hand in the palmar flexion state. Assume, for example, that the processing apparatus 501 has recognized a predetermined gesture while the wrist is in the dorsiflexion state. In this case, the processing apparatus 501 performs a first process when the configuration of the hand in the palmar flexion state assumes a first configuration, and performs a second process when the configuration of the hand in the palmar flexion state assumes a second configuration.

Figure 64:
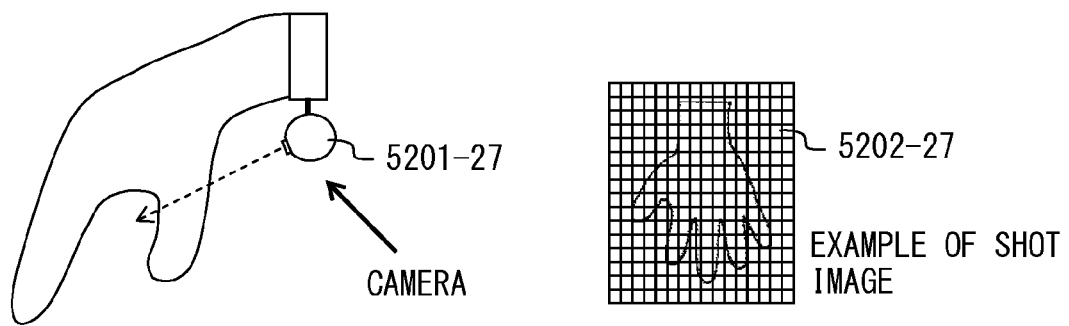
FIG. 64 illustrates a method for detecting the configuration of the hand in a palmar flexion state.

FIG. 64 illustrates a method for detecting the configuration of the hand in the palmar flexion state.

In FIG. 64, the configuration of the hand is determined using a camera 5201-27. The camera 5201-27 corresponds to the body state observing apparatus 201 in FIG. 1.

The camera 5201-27 is attached to the wrist and shoots an image of the palm side. The camera 5201-27 outputs a shot image 5202-27 to the flag determination unit 411 via the sensor information obtaining apparatus 301. The flag determination unit 411 determines the configuration of the hand according to the shot image 5202-27. The camera 5201-27 may transmit the shot image 5202-27 to the processing apparatus 501 so that the processing apparatus 501 can determine the configuration of the hand.

The following will describe detailed processes in the case of performing processes corresponding to the dorsiflexion state and the palmar flexion state as depicted in FIG. 62.

Figure 65:
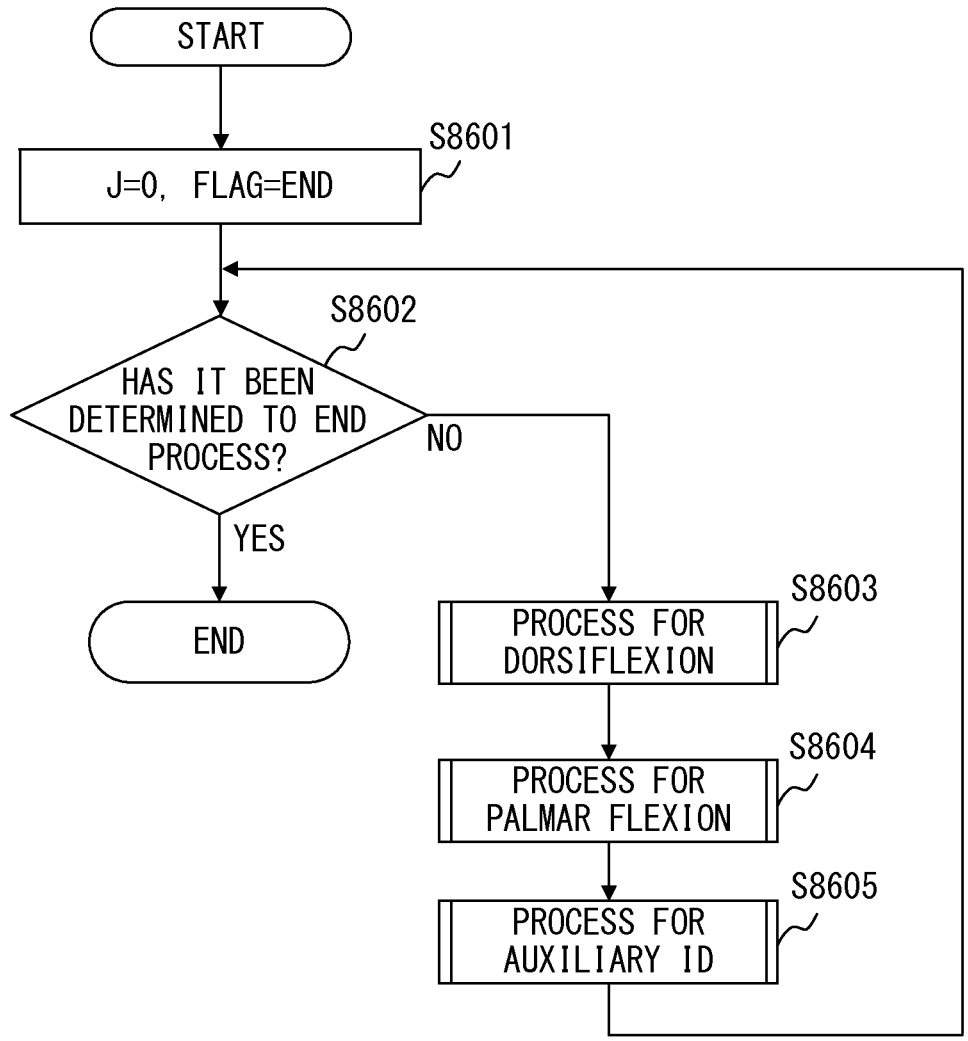
FIG. 65 is a flowchart illustrating a flag management process performed by a system using a dorsiflexion state and a palmar flexion state.

FIG. 65 is a flowchart illustrating a flag management process performed by a system using the dorsiflexion state and the palmar flexion state.

In step S8601, the flag determination unit 411 sets variable j=0 and flag=end as initial values.

In step S8602, the flag management process may end; alternatively, the flow may shift to step S8603. As an example, the flag management process ends when an instruction to end the process is received from an external element or when the sensor information obtaining apparatus 301 or the processing apparatus 501 is turned off.

In step S8603, the flag determination unit 411 and the flag report unit 421 perform a process for dorsiflexion. Details of the process for dorsiflexion will be described hereinafter.

In step S8604, the flag determination unit 411 and the flag report unit 421 perform a process for palmar flexion. Details of the process for palmar flexion will be described hereinafter.

In step S8605, the flag determination unit 411 and the flag report unit 421 perform a process for an auxiliary ID. The process for an auxiliary ID is similar to step S6611 in FIG. 53, and hence descriptions thereof are omitted herein.

Figure 66:
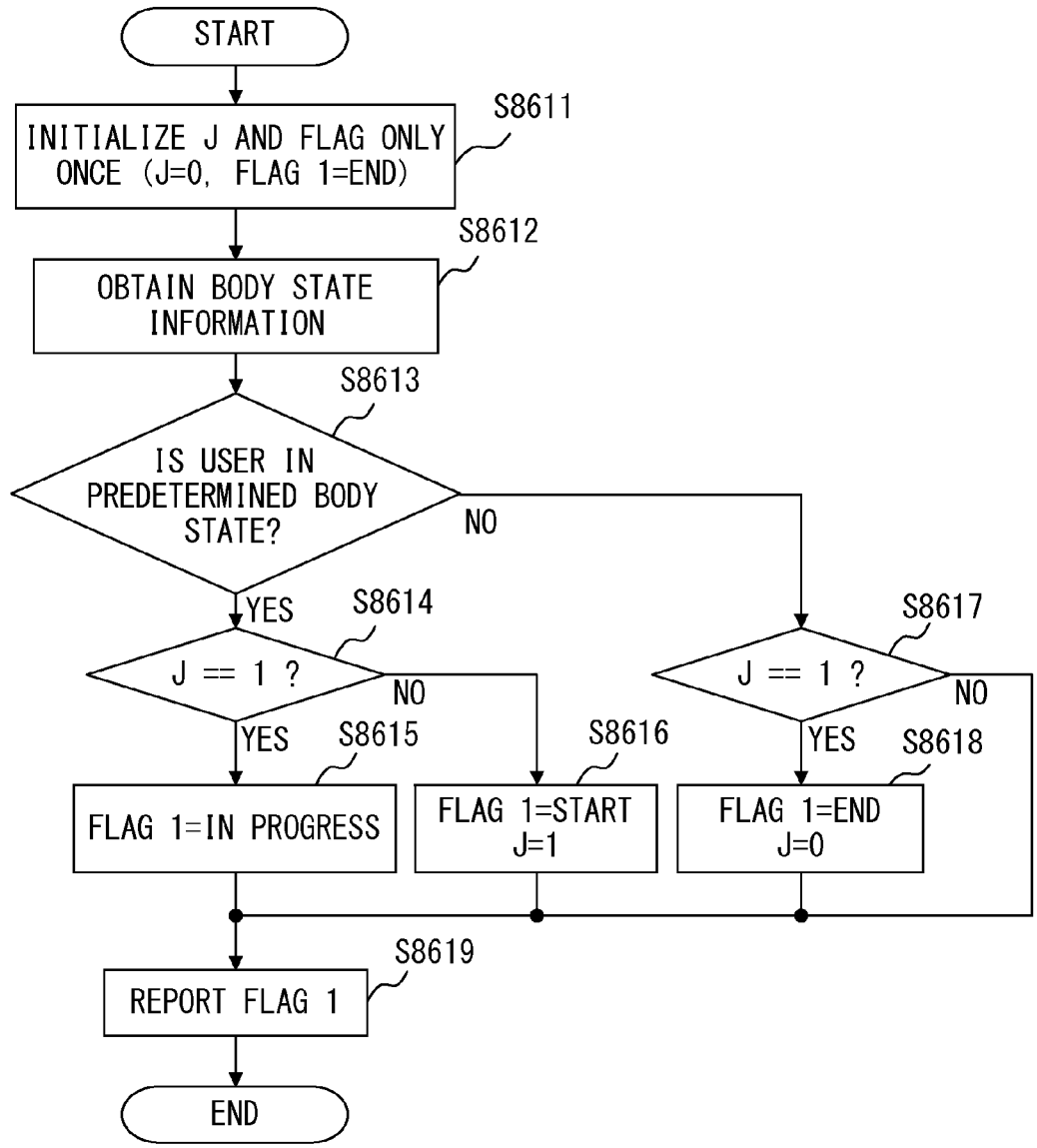
FIG. 66 is a flowchart illustrating details of processes for dorsiflexion.

FIG. 66 is a flowchart illustrating details of processes for dorsiflexion. FIG. 66 corresponds to step S8603 in FIG. 65.

In step S8611, the flag determination unit 411 initializes a variable j and a flag 1 only once, i.e., sets variable j=0 and flag 1=end only once.

In step S8612, the flag determination unit 411 receives body state information from the sensor information obtaining apparatus 301.

In step S8613, the flag determination unit 411 determines according to the body state information whether the user is in the dorsiflexion state. When the user is in the dorsiflexion state, the flow shifts to step S8614; otherwise, the flow shifts to step S8617.

In step S8614, the flag determination unit 411 determines whether j=1. When j=1 is satisfied, the flow shifts to step S8615; when j=1 is not satisfied, the flow shifts to step S8616.

In step S8615, the flag determination unit 411 sets flag 1=in-progress. The flag determination unit 411 transmits the flag 1 to the flag report unit 421.

In step S8616, the flag determination unit 411 sets flag 1=start and j=1. The flag determination unit 411 transmits the flag 1 to the flag report unit 421.

In step S8617, the flag determination unit 411 determines whether j=1. When j=1 is satisfied, the flow shifts to step S8618; when j=1 is not satisfied, the flow shifts to step S8619.

In step S8618, the flag determination unit 411 sets flag 1=end and j=0. The flag determination unit 411 transmits the flag 1 to the flag report unit 421.

In step S8619, the flag report unit 421 transmits the flag 1 to the processing apparatus 501. An arrangement may be made such that the flag report unit 421 transmits the flag 1 only when flag 1=start or flag 1=end.

FIG. 67 is a flowchart illustrating details of processes for palmar flexion.

FIG. 67 corresponds to step S8604 in FIG. 65.

In step S8621, the flag determination unit 411 initializes a variable k and a flag 2 only once, i.e., sets variable k=0 and flag 2=end only once.

In step S8622, the flag determination unit 411 receives body state information from the sensor information obtaining apparatus 301.

In step S8623, the flag determination unit 411 determines according to the body state information whether the user is in the palmar flexion state. When the user is in the palmar flexion state, the flow shifts to step S8624; otherwise, the flow shifts to step S8627.

In step S8624, the flag determination unit 411 determines whether k=1. When k=1 is satisfied, the flow shifts to step S8625; when k=1 is not satisfied, the flow shifts to step S8626.

In step S8625, the flag determination unit 411 sets flag 2=in-progress. The flag determination unit 411 transmits the flag 2 to the flag report unit 421.

In step S8626, the flag determination unit 411 sets flag 2=start and k=1. The flag determination unit 411 transmits the flag 2 to the flag report unit 421.

In step S8627, the flag determination unit 411 determines whether k=1. When k=1 is satisfied, the flow shifts to step S8628; when k=1 is not satisfied, the flow shifts to step S8629.

In step S8628, the flag determination unit 411 sets flag 2=end and k=0. The flag determination unit 411 transmits the flag 2 to the flag report unit 421.

In step S8629, the flag report unit 421 transmits the flag 2 to the processing apparatus 501. An arrangement may be made such that the flag report unit 421 transmits the flag 2 only when flag 2=start or flag 2=end.

FIG. 68 is a flowchart illustrating a flag management process performed by a system using the dorsiflexion state and the palmar flexion state. Note that the configuration of a processing apparatus in the system that uses the dorsiflexion state and the palmar flexion state is similar to the configuration of the processing apparatus 6501 of the fifth exemplary configuration.

In step S8631, the gesture recognition state determining unit 6531 initializes a processing state and an auxiliary state. The processing state and the auxiliary state are information used in the process described in the following.

In step S8632, the flag controlling process may end; alternatively, the flow may shift to step S8623. As an example, the flag controlling process ends when an instruction to end the process is received from an external element or when the worn-on-wrist type device 6601 is turned off.

In step S8633, the receiving unit 6511 receives and stores data in the storage unit 6521.

When the data received in step S8634 is the flag 1, the flow shifts to step S8635; otherwise, the flow shifts to step S8636.

In step S8635, the gesture recognition state determining unit 6531 and the gesture recognizing process unit 6541 perform a process of receiving the flag 1. The process of receiving the flag 1 is similar to step S6635 in FIG. 55, and hence detailed descriptions thereof are omitted herein.

In step S8636, when the received data is the flag 2, the flow shifts to step S8637; when the received data is not the flag 2, the flow shifts to step S6638.

In step S8637, the gesture recognition state determining unit 6531 and the gesture recognizing process unit 6541 perform a process of receiving the flag 2. The process of receiving the flag 2 is similar to step S6635 in FIG. 55, and hence descriptions thereof are omitted herein.

In step S8638, when the data received in step S8633 is an auxiliary ID, the flow shifts to step S8639; otherwise, the flow returns to step S8632.

In step S8639, the gesture recognition state determining unit 6531 and the gesture recognizing process unit 6541 perform a process of receiving an auxiliary ID. The process of receiving an auxiliary ID is similar to step S6637 in FIG. 55, and hence descriptions thereof are omitted herein.

Instead of the aforementioned combination of the dorsiflexion state and the palmar flexion state, the processes may be performed using the combinations described in the following.

Figure 69:
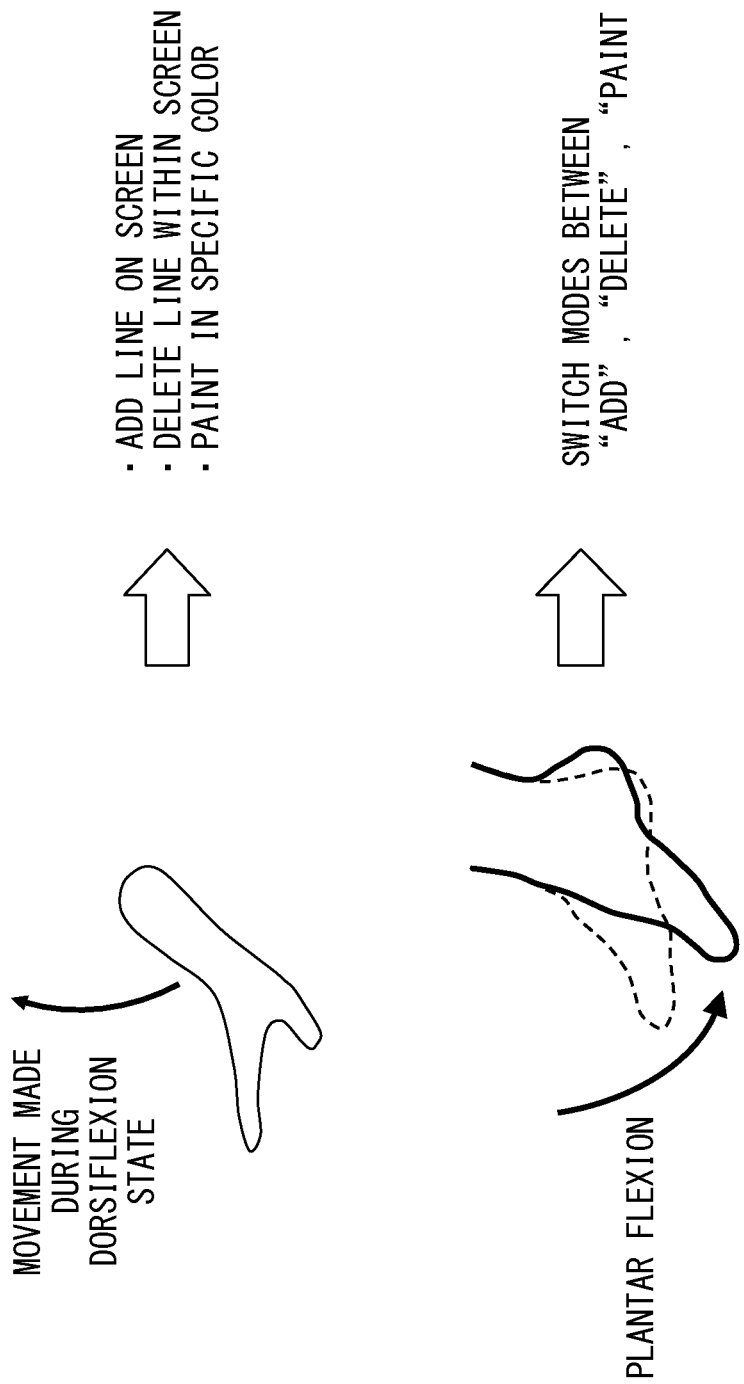
FIG. 69 illustrates processes corresponding to a dorsiflexion state and a plantar flexion state.

FIG. 69 illustrates processes corresponding to the dorsiflexion state and the plantar flexion state.

The processing apparatus 501 detects the plantar flexion state and, every time the ankle is put in the plantar flexion state as depicted at the lower side in FIG. 69, the processing apparatus 501 switches sequentially between modes such as "add", "delete", and "paint over".

When recognizing a gesture of raising the hand in the dorsiflexion state as depicted at the upper side in FIG. 69, the processing apparatus 501 performs a process of adding a line on a screen during the "add" mode, a process of deleting a line within the screen during the "delete" mode, and a process of painting in a specific color during the "paint over" mode.

Figure 70:
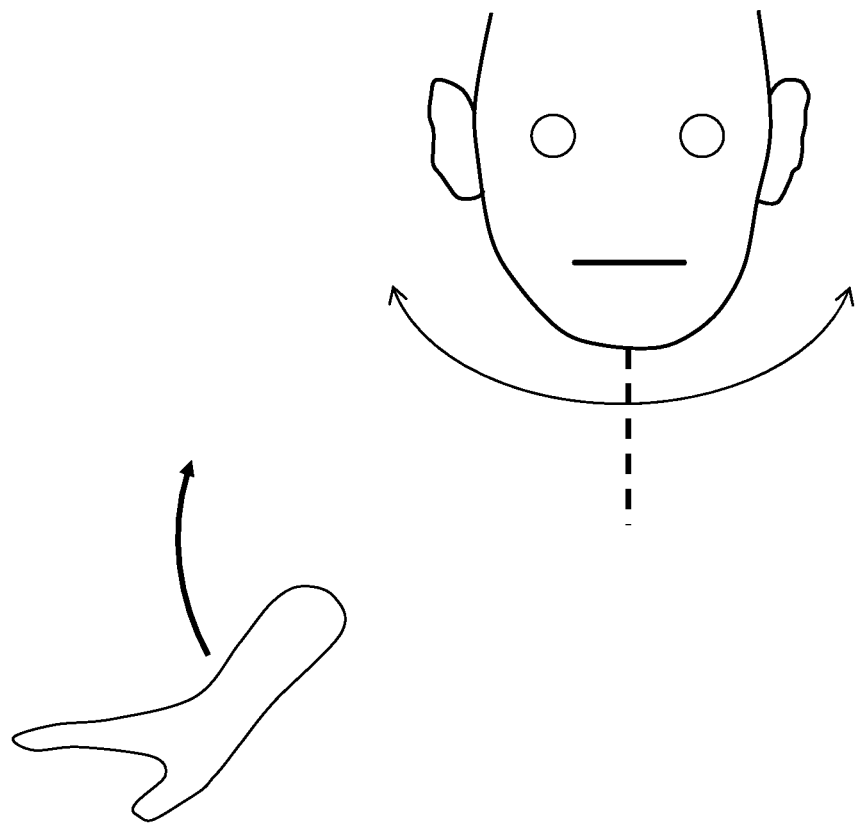
FIG. 70 illustrates processes corresponding to a dorsiflexion state and a rolled inward state.

FIG. 70 illustrates processes corresponding to the dorsiflexion state and the rolled inward state.

The processing apparatus 501 detects the rolled inward state of the lips and the orientation of the face and, in accordance with the orientation of the face with the lips being in the rolled inward state as depicted at the upper side in FIG. 70, changes an apparatus to be operated.

In accordance with a gesture made with the hand in the dorsiflexion state as depicted at the lower side in FIG. 70, the processing apparatus 501 operates an apparatus to be operated.

Any combination of the dorsiflexion state, the palmar flexion state, the plantar flexion state, and the rolled inward state may be used. Processes may be performed in accordance with the combination of the configuration of the fingers in the dorsiflexion state or the palmar flexion state, the configuration of the toes in the plantar flexion state, or the orientation of the face (head) with the lips being in the rolled inward state with the dorsiflexion state, the palmar flexion state, the plantar flexion state, or the rolled inward state.

Just after a body site is put in the dorsiflexion state, the palmar flexion state, the plantar flexion state, or the rolled inward state, a process corresponding to the dorsiflexion state, the palmar flexion state, the plantar flexion state, or the rolled inward state may be performed according to the configuration of the fingers in the dorsiflexion state or the palmar flexion state, the configuration of the toes in the plantar flexion state, or the orientation of the face (head) with the lips being in the rolled inward state.

In the system in accordance with an embodiment, flags are controlled according to the dorsiflexion state or palmar flexion state of the wrist, the plantar flexion state of the ankle, or the rolled inward state of the lips, so that an unintended occurrence of an apparatus malfunction can be prevented.

In the system in accordance with an embodiment, flags can be controlled without limiting the posture or range of movement of an end of a body site or the position thereof within a three-dimensional space.

In the system in accordance with an embodiment, the user can sensuously recognize the current flag state without relying on a sound or an image and without seeing a body site to control a flag.

In the system in accordance with an embodiment, the user does not need to hold a specialized apparatus with the hand or foot or to operate such an apparatus with the fingers, thereby achieving the advantage of decreasing the burden on the user.

In the system in accordance with an embodiment, the degree of freedom of the head, line of sight, fingers, or toes is not limited, thereby achieving the advantage of decreasing the burden on the user.

In the system in accordance with an embodiment, the user receives a report in accordance with the state of a flag so that the user can recognize whether the flag is valid.

Figure 71:
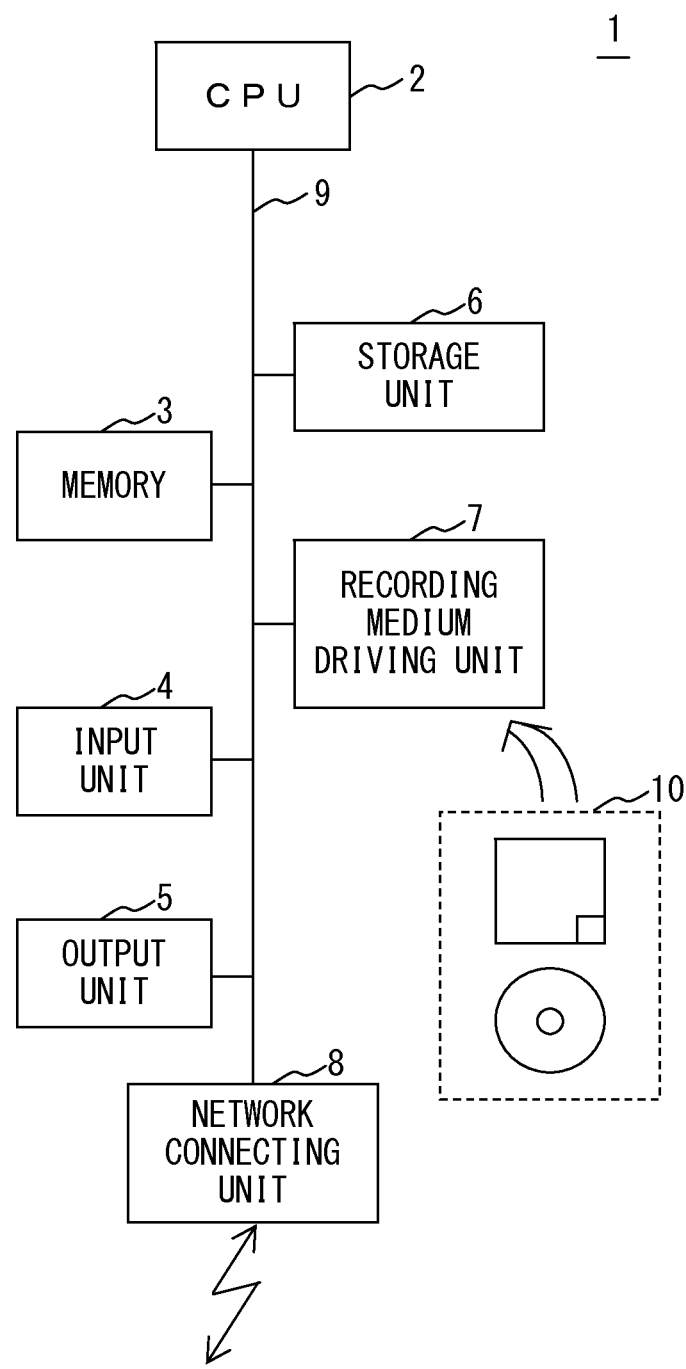
FIG. 71 is a configuration diagram of an information processing apparatus (computer).

FIG. 71 is a configuration diagram of an information processing apparatus (computer).

The system 101, the body state observing apparatus 201, the sensor information obtaining apparatus 301, the flag management apparatus 401, and the processing apparatus 501 in accordance with an embodiment is achieved by, for example, an information processing apparatus depicted in FIG. 71.

The information processing apparatus 1 includes a Central Processing Unit (CPU) 2, a memory 3, an input unit 4, an output unit 5, a storage unit 6, a recording medium driving unit 7, and a network connecting unit 8, all of which are connected to each other by a bus 9.

The CPU 2 is a central processing apparatus that controls the entirety of the information processing apparatus 1. The CPU 2 corresponds to the flag determination unit 411, the flag report unit 421, the flag determination unit 411, the processing-state determining unit 531, the processing performing unit 541, and the state change report unit 551.

The memory 3 is, for example, a Read Only Memory (ROM) or Random Access Memory (RAM) that temporarily stores a program or data stored in the storage unit 6 (or portable recording medium 10) during execution of the program. The CPU 2 performs the aforementioned various processes by executing a program using the memory 3.

In this case, a program code itself read from, for example, the portable recording medium 10 achieves the functions of the embodiments.

The input unit 4 is, for example, a keyboard, mouse, or touch panel.

The output unit 5 is, for example, a display or printer.

The storage unit 6 is, for example, a magnetic disk apparatus, optical disk apparatus, tape apparatus, or non-volatile memory. The information processing apparatus 1 saves the program and the data in the storage unit 6 and loads them into the memory 3 on an as-needed basis.

The storage unit 6 corresponds to the storage unit 521.

The recording medium driving unit 7 drives the portable recording medium 10 and accesses data recorded therein. The portable recording medium may be an arbitrary computer-readable recording medium such as a memory card, flexible disk, Compact Disk Read Only Memory (CD-ROM), optical disk, or magnetic optical disk. The user stores the program and the data in the portable recording medium 10 and loads them into the memory 3 on an as-needed basis.

The network connecting unit 8 is connected to an arbitrary communication network such as a LAN or WAN and converts data in accordance with a communication. The network connecting unit 8 corresponds to communication units 1171, 2172, and 3171.

All examples and conditional language provided herein are intended for pedagogical purposes to aiding the reader in understanding the invention and the concepts contributed by the inventor to further the art, and are not to be construed as being limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A gesture input method comprising:
   observing a wrist;
   outputting state information indicating a state of the wrist;
   determining, by a processor, according to the state information whether the wrist is in a dorsiflexion state; and
   performing, by the processor, a predetermined process only when the wrist is in the dorsiflexion state, wherein the dorsiflexion state is a state in which the wrist is bent outward.

2. The gesture input method according to claim 1, further comprising:
   receiving, by the processor, a gesture of a hand including the wrist; and
   performing, by the processor, a control corresponding to the gesture when the wrist is in the dorsiflexion state.

3. The gesture input method according to claim 2, further comprising:
   when the wrist is in the dorsiflexion state, making a report that the wrist is in the dorsiflexion state.

4. The gesture input method according to claim 1, further comprising:
   observing a hand; and
   outputting configuration information indicating a configuration of the hand, wherein
   the determining determines the configuration of the hand according to the configuration information, and
   the performing of the predetermined process performs the predetermined process according to the configuration of the hand and according to whether the wrist is in the dorsiflexion state.

5. The gesture input method according to claim 1, wherein
   the determining determines according to the state information whether the wrist is in a palmar flexion state, and
   the performing of the predetermined process performs the predetermined process according to whether the wrist is in the dorsiflexion state and whether the wrist is in the palmar flexion state.

6. The gesture input method according to claim 1, further comprising:
   measuring a posture of a hand or an external force applied to the hand; and
   outputting limitation information indicating the posture or the external force, wherein the determining determines according to the limitation information whether the wrist is in the dorsiflexion state.

7. A gesture input method comprising:

observing a wrist;

outputting state information indicating a state of the wrist;

determining, by a processor, according to the state information whether the wrist is in a palmar flexion state; and performing, by the processor, a predetermined process only when the wrist is in the palmar flexion state, wherein the palmar flexion state is a state in which the wrist is bent inward.

8. A gesture input method comprising:

observing an ankle;

outputting state information indicating a state of the ankle;

determining, by a processor, according to the state information whether the ankle is in a plantar flexion state; and performing, by the processor, a predetermined process only when the ankle is in the plantar flexion state, wherein the plantar flexion state is a state in which the ankle is bent outward.

9. A gesture input method comprising:

observing lips;

outputting state information indicating a state of the lips;

determining, by a processor, according to the state information whether the lips are in a rolled inward state; and performing, by the processor, a predetermined process only when the lips are in the rolled inward state, wherein the rolled inward state is a state in which an upper lip and a lower lip of the lips are rolled into a mouth.

* * * * *